US011682084B1

(12) United States Patent
Chen et al.

(10) Patent No.: US 11,682,084 B1
(45) Date of Patent: Jun. 20, 2023

(54) SYSTEM AND METHOD FOR NODE PRESENTATION OF FINANCIAL DATA WITH MULTIMODE GRAPHICAL VIEWS

(71) Applicant: Runway Financial, Inc., Brisbane, CA (US)

(72) Inventors: Siqi Chen, Brisbane, CA (US); Arya Asemanfar, San Francisco, CA (US)

(73) Assignee: Runway Financial, Inc., Walnut, CA (US)

( * ) Notice: Subject to any disclaimer, the term of this patent is extended or adjusted under 35 U.S.C. 154(b) by 23 days.

(21) Appl. No.: 17/135,681

(22) Filed: Dec. 28, 2020

Related U.S. Application Data

(63) Continuation-in-part of application No. 17/060,625, filed on Oct. 1, 2020.

(51) Int. Cl.
| | |
|---|---|
| *G06Q 40/00* | (2023.01) |
| *G06Q 40/12* | (2023.01) |
| *G06F 40/154* | (2020.01) |
| *G06T 11/20* | (2006.01) |
| *G06F 16/16* | (2019.01) |
| *G06F 40/18* | (2020.01) |

(52) U.S. Cl.
CPC .......... *G06Q 40/12* (2013.12); *G06F 16/168* (2019.01); *G06F 40/154* (2020.01); *G06F 40/18* (2020.01); *G06T 11/206* (2013.01)

(58) Field of Classification Search
None
See application file for complete search history.

(56) References Cited

U.S. PATENT DOCUMENTS

| | | | | |
|---|---|---|---|---|
| 8,781,952 | B1* | 7/2014 | Biase | G06Q 20/405 |
| | | | | 705/38 |
| 8,949,270 | B2* | 2/2015 | Newton | G06Q 30/02 |
| | | | | 707/774 |
| 9,105,064 | B2* | 8/2015 | Posch | G06Q 40/02 |
| 9,218,502 | B1* | 12/2015 | Doermann | H04L 63/10 |
| 9,244,899 | B1* | 1/2016 | Greenbaum | G06F 16/9024 |
| 10,331,778 | B1* | 6/2019 | Greenbaum | G06F 16/9024 |
| 10,372,807 | B1* | 8/2019 | Greenbaum | G06F 40/18 |
| 10,460,379 | B1 | 10/2019 | Diggdon et al. | |
| 10,540,434 | B2 | 1/2020 | Migeon et al. | |
| 10,732,810 | B1* | 8/2020 | Cohen | G06T 11/206 |
| 11,068,131 | B1* | 7/2021 | Atallah | G06F 16/26 |
| 11,108,788 | B1* | 8/2021 | Dixon | H04L 63/1416 |
| D935,474 | S * | 11/2021 | Candelas | D14/485 |
| 11,256,748 | B2 | 2/2022 | Harris et al. | |
| 11,443,390 | B1* | 9/2022 | Caligaris | G06Q 40/125 |
| 2001/0039500 | A1* | 11/2001 | Johnson | G06Q 40/04 |
| | | | | 705/35 |
| 2002/0184140 | A1 | 12/2002 | Quaile et al. | |
| 2004/0215661 | A1* | 10/2004 | Zhang | G06F 21/10 |

(Continued)

*Primary Examiner* — Fateh M Obaid
(74) *Attorney, Agent, or Firm* — Jeffrey Schox; Diana Lin

(57) ABSTRACT

A computer-implemented system and method for managing and visualizing financial transaction data is disclosed. Rows of financial data are managed as data objects with a reorganizable node tree hierarchy. A user interface visualization system supports an interactive user interface with a client device. In some implementations, a user may reorganize the node hierarchy, define dimension, communicate on a node-based basis, and assign directly responsible individuals to nodes.

14 Claims, 58 Drawing Sheets

(56) References Cited

U.S. PATENT DOCUMENTS

| | | | |
|---|---|---|---|
| 2007/0061487 A1 | 3/2007 | Moore et al. | |
| 2007/0260595 A1* | 11/2007 | Beatty | G06F 16/907 707/999.005 |
| 2009/0040080 A1* | 2/2009 | Hwang | H04N 19/176 341/51 |
| 2009/0327240 A1 | 12/2009 | Meehan et al. | |
| 2010/0118738 A1* | 5/2010 | Koide | H04L 45/123 370/256 |
| 2011/0052063 A1* | 3/2011 | McAuley | G06V 10/809 382/224 |
| 2011/0081074 A1* | 4/2011 | Rousson | G06K 9/6215 382/160 |
| 2011/0087985 A1 | 4/2011 | Buchanan et al. | |
| 2013/0073939 A1* | 3/2013 | Honsowetz | H04L 63/083 715/212 |
| 2013/0073940 A1* | 3/2013 | Honsowetz | G06F 40/18 715/220 |
| 2013/0138597 A1* | 5/2013 | Kyle | G06F 40/154 706/48 |
| 2013/0166600 A1* | 6/2013 | Snyder, II | G06F 16/2246 707/798 |
| 2014/0040182 A1 | 2/2014 | Gilder et al. | |
| 2015/0026075 A1* | 1/2015 | Mondri | G06F 16/27 705/304 |
| 2015/0120502 A1 | 4/2015 | Jung et al. | |
| 2015/0161626 A1* | 6/2015 | Chu | G06Q 30/0201 705/7.29 |
| 2015/0378979 A1* | 12/2015 | Hirzel | G06F 40/18 715/220 |
| 2016/0267056 A1* | 9/2016 | Hertzog | G06F 3/04842 |
| 2018/0096060 A1 | 4/2018 | Peled et al. | |
| 2019/0303484 A1* | 10/2019 | Baskinger | G06F 16/24553 |
| 2019/0362290 A1 | 11/2019 | Rogynskyy et al. | |
| 2019/0364131 A1 | 11/2019 | Rogynskyy et al. | |
| 2020/0372400 A1* | 11/2020 | Carreira-Perpiñán | G06N 5/003 |
| 2020/0372502 A1* | 11/2020 | Blankstein | G06F 16/1824 |
| 2022/0172075 A1* | 6/2022 | Abelha Ferreira | G06K 9/6296 |

* cited by examiner

+ Income

- Expenses

Fig. 3A

+ Income

| Cell 1 | Cell 2 | Cell 3 | Cell 4 | o o o | Row 1 data cells, Node hierarchy attributes, Node dimensions, Optional Node DRI, Optional Node Annotation, Optional Social Data Attributes |

| Cell 1 | Cell 2 | Cell 3 | Cell 4 | o o o | Row 2 data cells, Node hierarchy attributes, Node dimensions, Optional Node DRI, Optional Node Annotation, Optional Social Data Attributes |

| Cell 1 | Cell 2 | Cell 3 | Cell 4 | o o o | Row 3 data cells, Node hierarchy attributes, Node dimensions, Optional Node DRI, Optional Node Annotation, Optional Social Data Attributes | o
o
o
o

| Cell 1 | Cell 2 | Cell 3 | Cell 4 | o o o | Row M attributes, Node hierarchy attributes, Node dimensions, Optional Node DRI, and Optional Node Annotation, Optional Social Data Attributes |

Fig. 3B

+ Income

User Category Dimension 1

| Cell 1 | Cell 2 | Cell 3 | Cell 4 | o o o | Row 1 data cells, Node hierarchy attributes, Node dimensions, Optional Node DRI, Optional Node Annotation,, Optional Social Data Attributes |

| Cell 1 | Cell 2 | Cell 3 | Cell 4 | o o o | Row 4 data cells, Node hierarchy attributes, Node dimensions, Optional Node DRI, Optional Node Annotation |

User Category Dimension 2

| Cell 1 | Cell 2 | Cell 3 | Cell 4 | o o o | Row 2 data cells, Node hierarchy attributes, Node dimensions, Optional Node DRI, Optional Node Annotation, Optional Social Data Attributes |

| Cell 1 | Cell 2 | Cell 3 | Cell 4 | o o o | Row 3 data cells, Node hierarchy attributes, Node dimensions, Optional Node DRI, Optional Node Annotation, Optional Social Data Attributes |

| Cell 1 | Cell 2 | Cell 3 | Cell 4 | o o o | Row 10 data cells, Node hierarchy attributes, Node dimensions, Optional Node DRI, Optional Node Annotation, Optional Social Data Attributes |

Fig. 3C

| Aa Name | ☑ Owner | ☑ Admin | ☑ Contrib... | ☑ Viewer |
|---|---|---|---|---|
| —— NODE MANAGEMENT —— ✎ OPEN | ☐ | ☐ | ☐ | ☐ |
| View unprotected nodes | ☒ | ☒ | ☒ | ☒ |
| View protected nodes | ☒ | ☒ | ☐ | ☐ |
| Edit nodes | ☒ | ☒ | ☒ | ☐ |
| Delete nodes | ☒ | ☒ | ☒ | ☐ |
| Protect nodes | ☒ | ☒ | ☐ | ☐ |
| Edit views | ☒ | ☒ | ☒ | ☒ |
| Save views | ☒ | ☒ | ☒ | ☐ |
| Export as file | ☒ | ☒ | ☒ | ☐ |
| External sharing | ☒ | ☒ | ☐ | ☐ |
| Internal sharing | ☒ | ☒ | ☒ | ☐ |
| —— USER MANAGEMENT —— | ☐ | ☐ | ☐ | ☐ |
| Invite users | ☒ | ☒ | ☐ | ☐ |
| Edit users | ☒ | ☒ | ☐ | ☐ |
| Remove users | ☒ | ☒ | ☐ | ☐ |
| Promote owners | ☒ | ☐ | ☐ | ☐ |
| Demote owners | ☒ | ☐ | ☐ | ☐ |
| Promote admins | ☒ | ☐ | ☐ | ☐ |
| Demote admins | ☒ | ☐ | ☐ | ☐ |

Fig. 5

+ Income
User Category Dimension 1
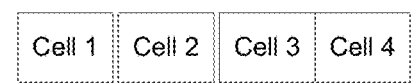
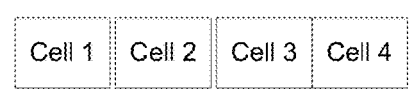
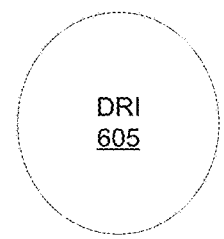
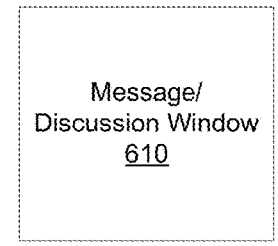
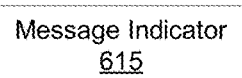
Associated Node Access and Permissions 620
Communication Rules and Permissions 625
Messaging/Communication Contact/Communication Support 630
Fig. 6

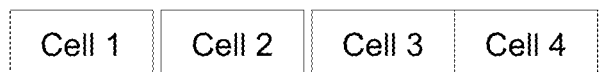
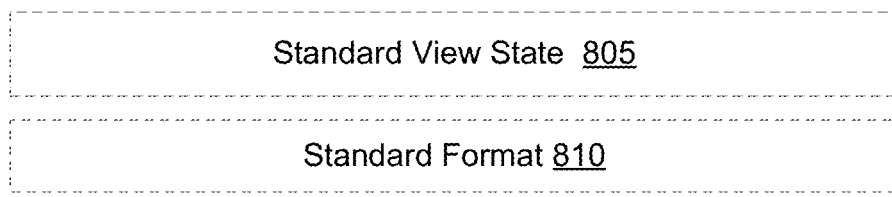
Fig. 8A
User Category Dimension 1
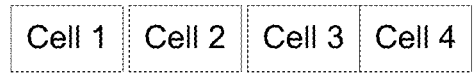
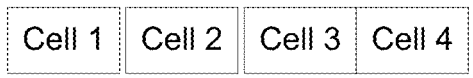
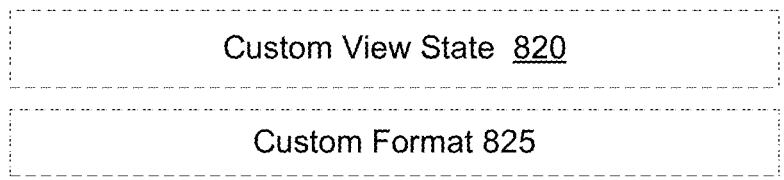
Fig. 8B \+ Income User Category Dimension 1

| Cell 1 | Cell 2 | Cell 3 | Cell 4 |

| Cell 1 | Cell 2 | Cell 3 | Cell 4 |

Annotation 1 (e.g., currency Conversion Rate) 905

Annotation 2 (e.g., Budget Forecast) 910

Annotation 3 (Average Order Value) 915

Custom Annotation N 920

Library Annotation M 925

Fig. 9

Displaying rows of financial transaction data that include at least one of expense transaction data and row of revenue transaction data, the rows have an associated data structure with data attributes describing a reorganizable tree hierarchy  1705

In response to a user input related to a selected row, generating an annotation, wherein the annotation implements at least one mathematical operation on a row of cell data  1710

Fig. 17

Displaying rows of financial transaction data that include at least one of expense transaction and row of revenue transaction, the rows have an associated data structure with data attributes describing a reorganizable tree hierarchy  1805

In response to a user input related to a selected row, selecting an annotation to implement a budget forecast or a budget variation, wherein the annotation implements at least one mathematical operation on a row of cell data  1810

Fig. 18

\+ Income

\+ Expenses

\+ Balance Sheet (Cash Value)

- Cash Balance
  Checking Account(s)
  Department 1
  Department 2

- Assets
- Liabilities

Fig. 37A

+ Profit (Net Income)
- Income (Revenue)

- Expenses

+ Balance Sheet (Cash Value)
- Cash Balance
Checking Account(s)
Department 1
Department 2

- Assets
- Liabilities

Fig. 37B

+ Profit (Net Income)
   - Income (Revenue)
      - Chart of Accounts Revenue Node Row Hierarchy
   - Expenses
      - Chart of Accounts Expense Node Row Hierarchy + Balance Sheet (Cash Value)
   - Cash Balance
      - Chart of Accounts Cash Balance Node Hierarchy
   - Assets
      - Chart of Accounts Asset Node Hierarchy
   - Liabilities
      - Chart of Accounts Liability Node Hierarchy

Fig. 37C

+ Profit (Net Income)
   - Income (Revenue)
      - User Customizable Revenue Node Row Hierarchy
   - Expenses
      - User Customizable Expense Node Row Hierarchy + Balance Sheet (Cash Value)
   - Cash Balance
      - User Customizable Cash Node Hierarchy
   - Assets
      - User Customizable Asset Node Hierarchy
   - Liabilities
      - User Customizable Liability Node Hierarchy

Fig. 37D

Expense-Revenue-Net Income Visualization Window

+ Profit (Net Income)
   - Income (Revenue)

- Expenses

+ Balance Sheet (Cash Value)
   - Cash Balance
      Checking Account(s)
         Department 1
         Department 2

- Assets
   - Liabilities

SYSTEM AND METHOD FOR NODE PRESENTATION OF FINANCIAL DATA WITH MULTIMODE GRAPHICAL VIEWS

CROSS-REFERENCE TO RELATED APPLICATIONS

This application is a continuation-in-part of U.S. application Ser. No. 17/060,625, entitled "System and Method for Reorganizable Node Presentation of Financial Data", filed Oct. 1, 2020, the entire contents of which are incorporated herein by reference. This application is also related to U.S. Application No. 17,060,618, entitled "Customizable System and Method for Reorganizable Node Presentation and Visualization of Financial Data", filed Oct. 1, 2020 and U.S. Application No. 17,060,587, entitled "System and Method for Reorganizable Node Presentation of Financial Data with Node Annotations", filed Oct. 1, 2020, the entire contents of each of which are incorporated herein by reference.

FIELD OF THE INVENTION

The present disclosure generally relates to the management and display of financial information, including accounting information. More particularly, implementations of this disclosure are related to reorganizing the presentation of financial data in new ways.

BACKGROUND

Financial accounting data is typically presented in only a limited number of common formats chosen by a company's finance team. Financial data is commonly organized in a company's accounting system in a chart of accounts (COA) format setup by a company's finance team based on historical financial reporting norms. The COA is a created list of the accounts 08874 used by a company or organization. It defines classes of items for which money or equivalents thereof are spent or received. It's a way to organize expenditures, revenue, assets and liabilities.

Typically, income and expense statements have fairly standard ways that financial data is presented by financial accounting systems that is based on the needs and preferences of a company's finance team. This commonly includes standard ways of presenting an income statement, balance sheet, cashflow statements, and the use of negative numbers that are familiar to accountants. And typically the accountants at a company perform the limited types of customization supported by conventional financial accounting systems.

But the problem is that most people in a typical company aren't accountants. Many people who aren't accountants find the conventional accounting presentations of financial data to be hard to read and confusing.

It's difficult and awkward to significantly reformat or reorganize conventional financial data. The raw data is organized by the financial team and the accounting software typically manages financial data as individual transaction within the COA framework.

Embodiments of the disclosure were developed in view of some of these shortcoming and problems in the way financial data is conventionally managed and visualized.

SUMMARY

The present disclosure relates to systems and methods for managing and visualizing financial data. The user can regroup financial data and present it in way that matches their own "mental map" of preferences instead of being limited to conventional accounting formats. According to one innovative aspect of the subject matter in this disclosure, financial data is receive and organized into nodes, in which each node is a data object including at least one row of a sequence of cells of financial transaction data and having a data structure with data attributes describing a reorganizable tree hierarchy of nodes; and in response to a user input, modifying an initial node tree hierarchy to a reorganized node tree hierarchy.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 3A illustrates an initial presentation of financial data as an income category and expenses category in accordance with an implementation.

FIG. 3B illustrates zooming into the income category and associated rows of financial transaction data in accordance with an implementation.

FIG. 3C illustrates a regrouping of the rows of financial transaction data of the income data into new sub-categories in accordance with an implementation.

FIG. 5 illustrate an example of a user interface for node management and user management in accordance with an implementation.

FIG. 6 illustrates aspects of controlling social interactions on nodes in accordance with an implementation.

FIG. 8A illustrates a UI with a standard view state and a standard format in accordance with an implementation.

FIG. 8B illustrates a UI with a custom view state and custom format in accordance with an implementation.

FIG. 9 illustrates an example of using annotations in accordance with an implementation.

FIG. 17 is a flow chart of a method displaying rows of financial transaction data into rows and applying annotations to at least one row in accordance with an implementation.

FIG. 18 is a flow chart of a method displaying rows of financial transaction data into rows and applying annotations to at least one row in accordance with an implementation.

FIG. 37A illustrates an example of a balance sheet view in accordance with an implementation.

FIG. 37B illustrates an example of a balance sheet view including a view of a profit in accordance with an implementation.

FIG. 37C illustrates an example of a balance sheet view with a default node hierarchy in accordance with an implementation.

FIG. 37D illustrates an example of a balance sheet view and profit view with a default node hierarchy in accordance with an implementation.

FIG. 37E illustrates an example of a balance sheet view with customizable node hierarchies in accordance with an implementation.

DETAILED DESCRIPTION

The present disclosure describes systems and methods for organizing and visualizing financial data associated with financial transactions.

Example Node Management System

Figure 1:
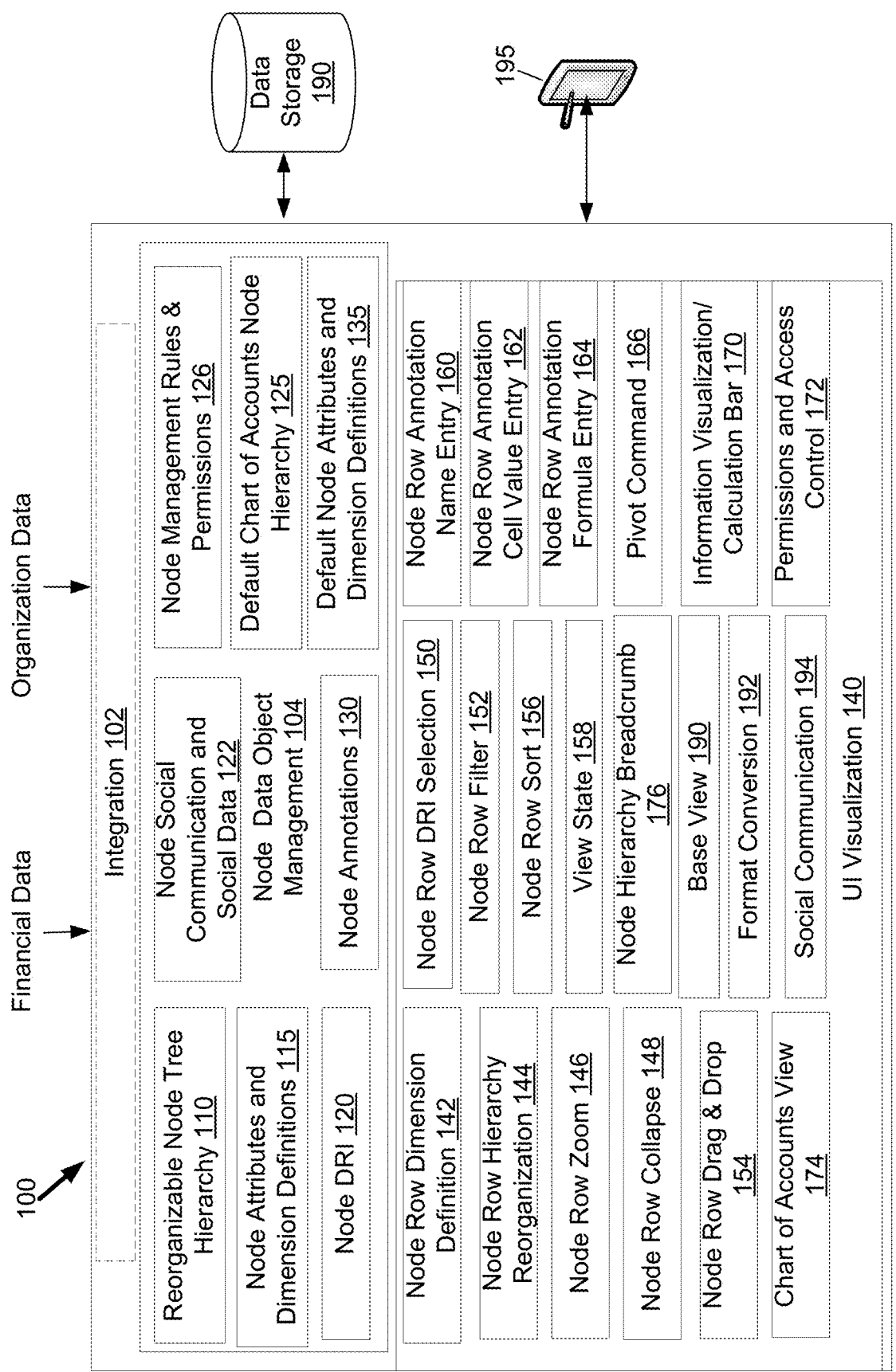
FIG. 1 is a block diagram of a financial data management system in accordance with an implementation.

Referring to FIG. 1, a financial data management system 100 receives financial data and organization data in accordance with an implementation. The financial data may be conventional financial transaction data such an financial data for income and expenses. More generally the financial data may include other common forms of financial data such as data on assets, equities, and liabilities. The financial data may, for example, be generated from an Enterprise Resource Planning (ERP) system or other source of financial data for an entity. Organization data may come from a source of organizational information and include, for example, human resource information on employees and managers; information on company/entity structure such departments, subsidiaries, etc.

An integration layer 102 may be provided to integrate different sources of financial data and organization data. For example, an integration layer 102 may have interfaces or APIs to import data from different sources and integrate it into a pre-selected format. The integration layer may, for example, include tools to import financial data such as balance sheets, cash flow statements, etc. For example, the integration layer 102 may interface with an ERP, HR software, payroll software, or other sources of company/entity data, including cloud-based data sources. The integration layer 102 may more generally be extended to integrate any source of financial data and organization data. This integration layer 102 may include a capability to drill into external data sources, extract relevant data, and format the data. The integration layer may be extended to access a variety of data services.

In one implementation, the data management system 100 manages financial data and organization data as higher-level data objects. The data objects may follow basic principle of the object-oriented language paradigm in which an object is an agent that maintains an internal state, performs actions, interact with other objects, and in which an object may represent information that is hierarchical in nature.

In one implementation, financial data is represented by nodes, where each node is a data object corresponding to at least one row of a sequence of cell data (e.g., a sequence of cells of financial data over time, such as financial data on a monthly basis or some other time periodicity) and node attributes. The nodes may be managed by a node data object management system 104 that manages data structures underlying the nodes. An interface may be provided with a data storage unit 190 to store financial data and metadata. The node data object management system 104 communicates with a user interface (UI) visualization system 140 to generate interactive financial visualizations for one or more client devices 195.

While an example of a node data object management system 104 and UI visualization system 140 are described below in detail, it will be understood that embodiments of the disclosure do not necessarily have to include all of the feature or module described.

Example Node Data Object Management System

The nodes have an associated hierarchical tree structure. That is, there is a collection of nodes, with the hierarchical tree structure defining a root node, parent nodes, and children nodes. However, the nodes have a reorganizable node tree hierarchy 110. This means that the organization of the tree structure may be modified. A default hierarchy 125 may be provided, which may be in the form of a default chart of accounts node hierarchy.

The node tree hierarchy may define financial categories and dimensions such as income (revenue) and expenses associated with determining profits and losses. More generally, the node hierarchy may describe asset accounts, liability accounts, equity accounts, profit and loss accounts. In a conventional chart of accounts representations, there are standards ways to represent the different categories and dimensions. For example, income/revenue is often represented in terms of common representation such as rental income, sales income, interest income, and other income. Expenses are represented by a sequence of common representations for categories such as rent, utilities, salaries and wages, office expenses, and so on. The conventional chart of accounts hierarchy doesn't permit a user to regroup financial information into a different hierarchy, such as regrouping information by department as one example The node tree hierarchy be implemented as an abstract data type representing a hierarchical tree structure that has parent nodes and children nodes. The hierarchical node tree may, for example start at a root node with each node in the tree may having zero or more child nodes below it in the tree.

The node tree has an associated data structure, which may be implemented in different way. For example, the node tree hierarchy may, for example be described by data structure having a set of node references to represent the hierarchy. However a major difference of the reorganizable node tree hierarchy 110 over a conventional chart of accounts node tree hierarchy 125 is that the hierarchy of the reorganizable node tree hierarchy 110 is modifiable by users to help them regroup financial data into an organization that reflects their tastes and preferences.

However, in some implementations, the user is free to return to the original default chart of accounts node hierarchy 125. In other implementations, a user may save a particular version of a reorganized node tree hierarchy 110. Thus, a set of references may be persisted to implement the default chart of accounts node hierarchy 125 and one or more different versions of the node tree hierarchy.

A node attributes and dimension definitions module 115 may be included to aid keeping track of node attributes and node dimensions and making modifications to node attributes and node definitions. For example, an individual node may have an associated data structure with node attributes describing the node hierarchy and node dimensions, such as node descriptors (e.g., imported, implied, pre-defined, or modifiable node dimensions). A default set of node attributes and definitions 135 may be persisted. More generally, different versions of the node attribute and dimension definitions may be persisted to support different views of the financial data.

In some implementations, a node may include an arbitrary number of dimensions. For example, a node may include dimensions for a business unit, department, a subsidiary, etc. Some dimensions of a node may be imported dimensions (e.g., common flat dimensions may be imported from an original financial data source, such as department, customer, location, project, subsidiary, etc.). Some dimensions may be user created, custom dimensions. For example, a user may name a new dimension (e.g., a category name) to describe a grouping of nodes in terms of a new user-defined dimension. Some dimension of a node may be automatically inferred by the node management system 104. For example, dimensions may be inferred based on the values of the transaction, trending of values of the node, or correlations between a node and other nodes. As examples of inferred dimensions, recurring vs. non-recurring expenses may be based on the frequency of occurrence of transactions. As another example, variable vs. fixed costs may be inferred based on a correlation between revenue and expense.

Having a set of node dimensions that includes custom dimensions permits, for example, searching by node dimensions and segmenting a node by a variety of different dimensions.

In some implementations, one or more directly responsible individuals (DRIs) are associated with a node by a node DRI module 120. That is, a node data attribute field is provided that can be defined to include one or more directly responsible individuals. A corresponding UI display may, for example, show a node owner's name/initials, photo and profile data, such as name contact information, title, department, bio, etc. As an illustrative examples, organization data may be used to generate a listing of people in an organization that be assigned to a node as a DRI. One or more rules may also be applied to assign ownership of child nodes. For example, if a parent node is assigned a DRI, a default rule may be that child nodes with no explicitly assigned owner are assigned to the parent node's owner by default.

A node social communication and social data module 122 may be provided to support social communication such as email, text, phone calls, or video calls associated with a node. As another example, in some implementations, a user can initiate a conversation about a node. Support for node communication module 122 may, for example, include access to, or a copy of, contact information in an organization, as well as support for accessing a communication tool, such as an email or text messaging server. A corresponding user interface for the node conversation may support, for example, a visual indicator for a node showing the people involved in a conversation on the node. Other features may be supported, such as a listing of unread messages on a conversation. Notifications may be provided of new message to users following a node.

In some implementations, a node includes social data attributes to support communication. Some examples of social data include an owner, followers (i.e., people who follow the node), posts (e.g., threads, thread messages, and thread authors).

In some implementations, a node management rules and permissions module 126 may also have associated permission or access privileges 126 defining individual user permissions and access privileges for node communication or other operations.

The node management rules and permissions module 126 may be provided to enforce rules on operation to avoid undercounting or overcounting financial data. For example, in some implementations, one rule that is applied is that every node that's part of the same parent node should always add up to the correct financial total. That is, depending on implementation details, rules may be included to prevent reorganization that would result in financial errors. This may include, for example, rules on the use of pivot tables. For example, the pivoting on a table may be limited so that numbers aren't double counted. As an example of this, a rule may be included to forbid pivoting the same node by two different dimensions at the same time in order to prevent double-counting.

A node annotations module 130 supports generating optional mathematical operations on rows of node data. This may include mathematical equations, budget calculations, etc. As examples, a node annotation may include formula calculations, forecasts, projections, budgeting, budge proposals, margin calculations, running totals, forecasting, and financial modeling. A user interface may, for example, support a user selecting calculations or equations from a library or composing their own calculations or equations.

An annotation may include annotation formulas with variables, such as variables based on node references, annotation references, or cell references. An annotation may also include operations and functions (e.g., sum, average, or other mathematical operators).

In one implementation may also define an annotation name, although more generally a default name could be suggested or implied from actions like selecting a budgeting calculation from a library.

One aspect of an annotation is that it may be attached to nodes/rows of a reorganized node tree hierarchy. For example, a reorganized node tree hierarchy may group one or more nodes. For example, a user may regroup a set of rows of financial data for a department or a subsidiary. The node annotation applies to a node (e.g., one or more rows) with the annotation performing optional operations or formulas on one or more of the nodes in the group. Thus the user can use node annotations to generate highly customized financial calculations. For example, a department head may want to explore budget issues for an individual department for some or all of the row data available for the department. The use of node annotations supports tremendous flexibility for users to obtain useful financial data customized for their needs and for their mental map of what financial data is relevant to their needs.

Example UI Visualization System

The node data management object management system 104 communicates with a user interface (UI) visualization system 140. The UI visualization system 140 is responsible for generating interactive financial visualizations for a client device 195.

The visualization is interactive in that a user at a client device 195 can enter inputs via various UI means. The user interface is updated, and any corresponding node attribute changes are generated by node data object management system 104 to support the changes to the visualization.

In some implementations, a row node drag & drop module 154 may be provided to support a user to use a UI for dragging and dropping one or more rows of financial data to a different order, which in turn is interpreted as a request to modify the node hierarchy in node data object management system 104.

A node row zoom module 146 and a node row collapse module 148 may be provided for a user to use a UI to zoom in or out of nodes, expanding or collapsing a view of nodes. This permits, for example, a user to obtain a view of node data that is at a useful level of detail for navigating and exploring financial data.

More generally, the UI may include a node row dimension module 142 for a user to redefine a node dimension, such as a node category name.

A node row hierarchy reorganization module 144 may be provided to support reorganizing a node hierarchy, which may include dragging and dropping nodes but more generally may include a variety of UI features to achieve the same general objective of regrouping rows of financial data and reorganizing a node hierarchy.

The UI may include a chart of accounts view 174. For example, in some implementations, a user may start with a chart of accounts view or have an option to return to a chart of accounts view of financial data.

A node row DRI selection module 150 may support a user using a UI to enter or modify a directly responsible individual for at least one node. For example, a menu or a selection of individuals may be provided, along with other associated information, such as photos, bios, work titles, or other organization information.

A node row filter module 152 may support a UI for a user to filter rows by different criteria, such as sort by time, transaction, memo, or dimension. A node row sort module 156 may support a UI for a user to aid in sorting rows, that is to sort the rows in a preferred order by one or more parameters.

A view state module 158 may support a UI recording view states to define, for example, different user views. For example, a view state may include a combination of a specific view of a particular organization and a display of a hierarchy of nodes. The view state may be viewable and shareable. In some implementations, a current view state may be saved as a new view. Saving the view state as a new view permits, for example, different visualization modes of the financial data. This may include, for example a default visualization for an entire organization, visualization modes for smaller groups of users (e.g., a department visualization mode), and individual visualization mode).

A node hierarchy breadcrumb module 176 UI feature may be included to aid a user to understand the current organization of the node hierarchy. It is thus a visual aid to provide contextual information, such as illustration showing which dimensions the user has seen/interacted with, or other information helpful for the user to understand how they have navigated to a current view from earlier views.

A base view module 190 may support a base view UI. That is the base view may define an initial view and background UI features and controls that have been configured.

A format conversion module 192 may be provided to convert the format of tables or other data formats. For example, various formats in the presentation of data may be supported as options.

A node row annotation name entry module 160 may support a UI for a user to enter an annotation name of an annotation for one or more rows of financial data. For example, an annotation could be or a budgeting, projection, forecasting, or modeling instance and a user could define a name that reflects the application of the annotation.

A node row annotation cell value entry module and a node row annotation formula entry 164 support a UI for a user to enter an annotation value and/or formulas to be entered for an annotation. For example, an annotation may include cell values that are numbers, percentages, or a formula. For example, consider a budgeting or projection example. An annotation could, for example, include numbers corresponding to a simple mathematical adjustment to row data, such as forecasting with a 10% change in row values as one example. However more generally, an annotation could include a formula, such as a formula to perform a budget projection based on row cell values. An annotation formula can have variables that include node references (e.g., to specific nodes the annotation is attached to and drawing data from), and cell references. An annotation formula may include operations and functions such as SUM, AVERAGE, or other standard mathematical operators. The annotation may generally support performing a wide variety of financial calculation based on the data of a node the annotation is associated with (e.g., the cell data of its rows of financial data) and other sources of numerical data as inputs (e.g., a currency conversion), and a mathematical operation or function. More generally, an annotation could also in theory draw upon data from other annotations (e.g., a budgeting annotation drawing information from a currency conversion annotation) or even from other nodes (e.g., to compare the performance of one department to another department).

A pivoting command module 166 supports pivoting of financial data in response user input. In some implementations, a user can create a pivot table view to quickly create, move, group, and rename nodes. As illustrative examples, pivoting on department, subsidiary, or other dimension may be supported.

An information visualization calculation bar 170 supports a UI to display financial data, such as profit and loss data or margin data, for a group of one or more rows of financial data. The information visualization calculation bar 170 may generate contextual information about a current selection of nodes, such a calculation one or more of a total revenue, total expense, net gross margin, revenue/expense per employee, recurring vs. non-recurring totals, or operating leverage. More generally, the information visualization calculation bar 170 may support a variety of different common financial calculations upon a current selection of nodes. For example, in some implementation, the calculations may be performed on a selected group of nodes.

A permissions and access control module 172 supports a UI to regulate access and permissions. For example, tiers of different users may be defined to limit the amount of financial data visible to different tiers of users and impose limitations on node communication privileges. For example, some types of financial information may not be necessary for certain types of employees. There may also be some types of information that are more sensitive than others in certain time periods of a company, such as during audits or as may be prudent to prevent unauthorized viewing of financial data by lower-level employees. Additionally, there may be business reasons to regulate the communication around a node. For example, it may be possible that it's useful for a particular individual to be allowed to view a particular node but block them from seeing internal messages a group of users have access to. An organization may, for example have users at the level of high-level company officers, department heads, department managers, department employees, and so on. Some higher level-users may be given authority to define access privileges and permissions governing what types of node information is visible to different users, what access privileges they have.

In some implementations, nodes (and their children) can be protected from access based on criteria related to a need to know certain types of financial information, the benefit to a company in having a user being given access to financial data, and the potential risks to having a user being given access to financial data. The node protection may be based on factors such as a user's position in a company (e.g., fiduciary responsibility as an officer, responsibility as a manager or department head, mid-level or lower-level employee, etc.), a user's department, workgroup, or work project. For example, a department head of a subsidiary company many require access to only a tiny portion of an organization's financial data in order to prepare a budget for their department.

A social communication module 194 supports a UI to perform social communication and social interactions based on nodes, such as text, email, voice, or other communication modalities such as posting information summaries or pages. In some implementations, social communication may also be limited based on access control and permissions. At one level, a user may be initially limited to nodes they can view and/or access. However, additional access control and permissions may also optionally be applied to node communications. This may include, for example, read/write privileges defining a user's communication privileges for a node. This may, for example, define whether a user can read/write messages associated with a node. However, more generally, there could be a hierarchy of read/write privileges in which some types of node communication are permitted to some tiers of users but not others.

Example Server/SAAS Implementations

Figure 2:
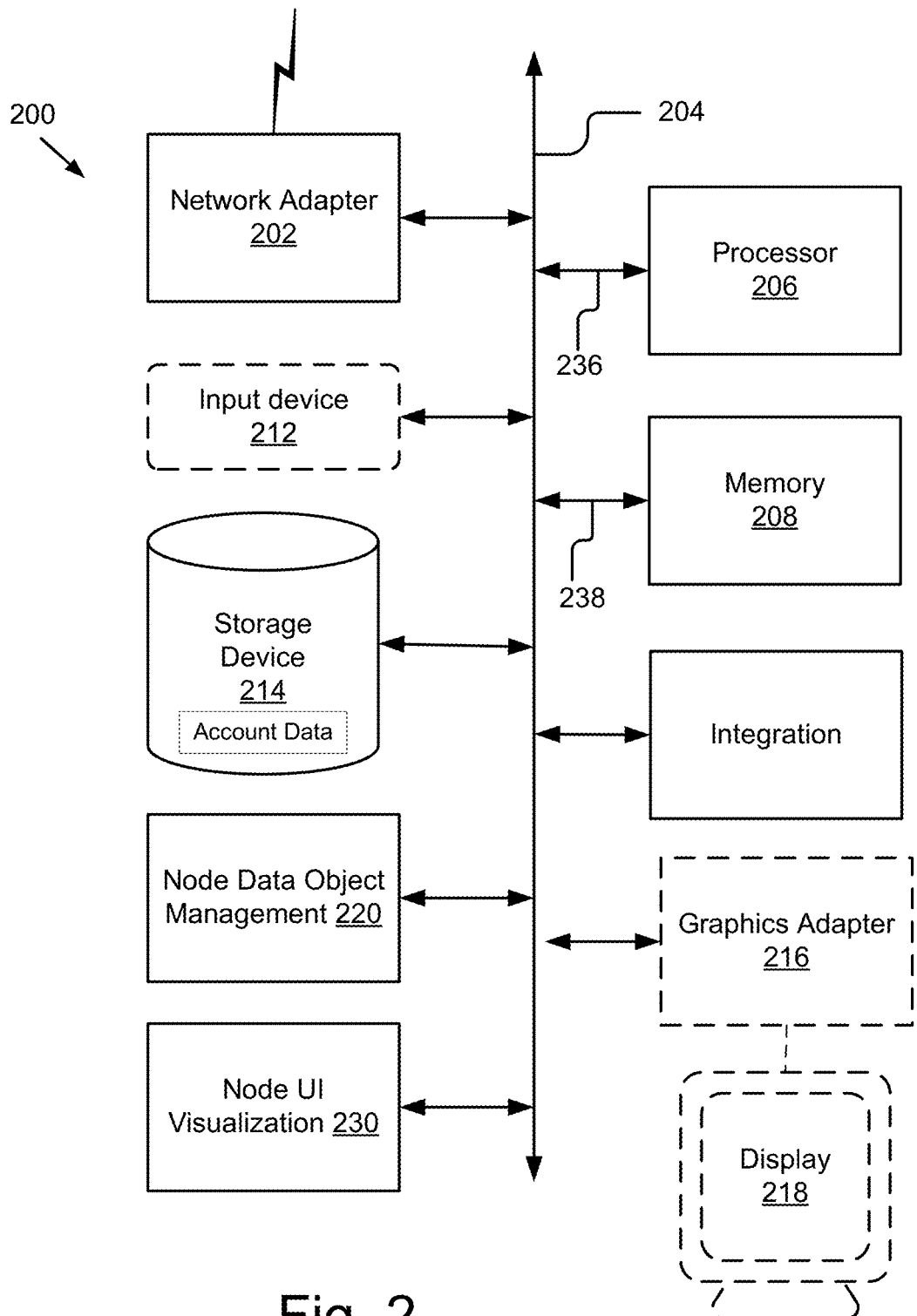
FIG. 2 is a block diagram illustrating a server based implementation of a server-based implementation of a financial data management system in accordance with an implementation.

The system 100 may be implemented in different ways, such as a network service, cloud-based service, SAAS etc. Individual modules, engines, units, methods, and UI implementation may be implemented as computer program instructions and APIs, with the computer program instructions stored on a non-transient computer readable storage medium executable by one or more processors. An exemplary server-based implementation 200 is illustrated in FIG. 2. An internal communication bus 204 connects other components. A network adapter 202 supports network communication with, for example, client devices. An input device 212 may be provided to input commands. A storage device 214 may be provided to store financial account data and metadata. A processor 206 executes computer program instructions from the other modules and has an associated memory 206. An optional graphics adapter 216 and display may be provided to generate a user interface for the server 200. Modules with computer program instructions for an integration layer 240, a node data object management system 220, and a node UI visualization module 230 may be provided.

Example Of Node Reorganization

FIGS. 3A, 3B, and 3C provide a high level illustrative example of node reorganization/regrouping. FIG. 3A illustrates how an initial view of financial data may be collapsed. In the example of FIG. 3A, the initial view is collapsed into an initial simple view of income and expenses. In FIG. 3B, a sequence of node rows 1 to M are illustrated. Each node is row of cell data with each row having associated node attributes, such as node hierarchy attributes, node dimensions, optional node DRI, option node annotation, and optional social data attributes.

The node hierarchy attributes may also implicitly or explicitly define node inheritance attributes. For example, when a DRI is assigned to a node, a default rule may be invoked regarding whether or not children of the node inherit the DRI. Additional implicit or explicit rules may apply to determine what node attributes are inherited after a node tree is reorganized.

In FIG. 3C, the rows have been reorganized into a different hierarchical order. That is, the rows have been regrouped. For the purposes of illustration, the original set of rows had been regrouped into two groups, although more generally many regroupings are possible. In the example, of FIG. 3C, user category dimensions may be added for each group.

FIGS. 3A, 3B, and 3C illustrate, at a high level, how nodes corresponding to rows of cell data may be reorganized. This reorganization in how groups of rows are displayed also corresponds to a reorganization of a node hierarchy.

Figure 4:
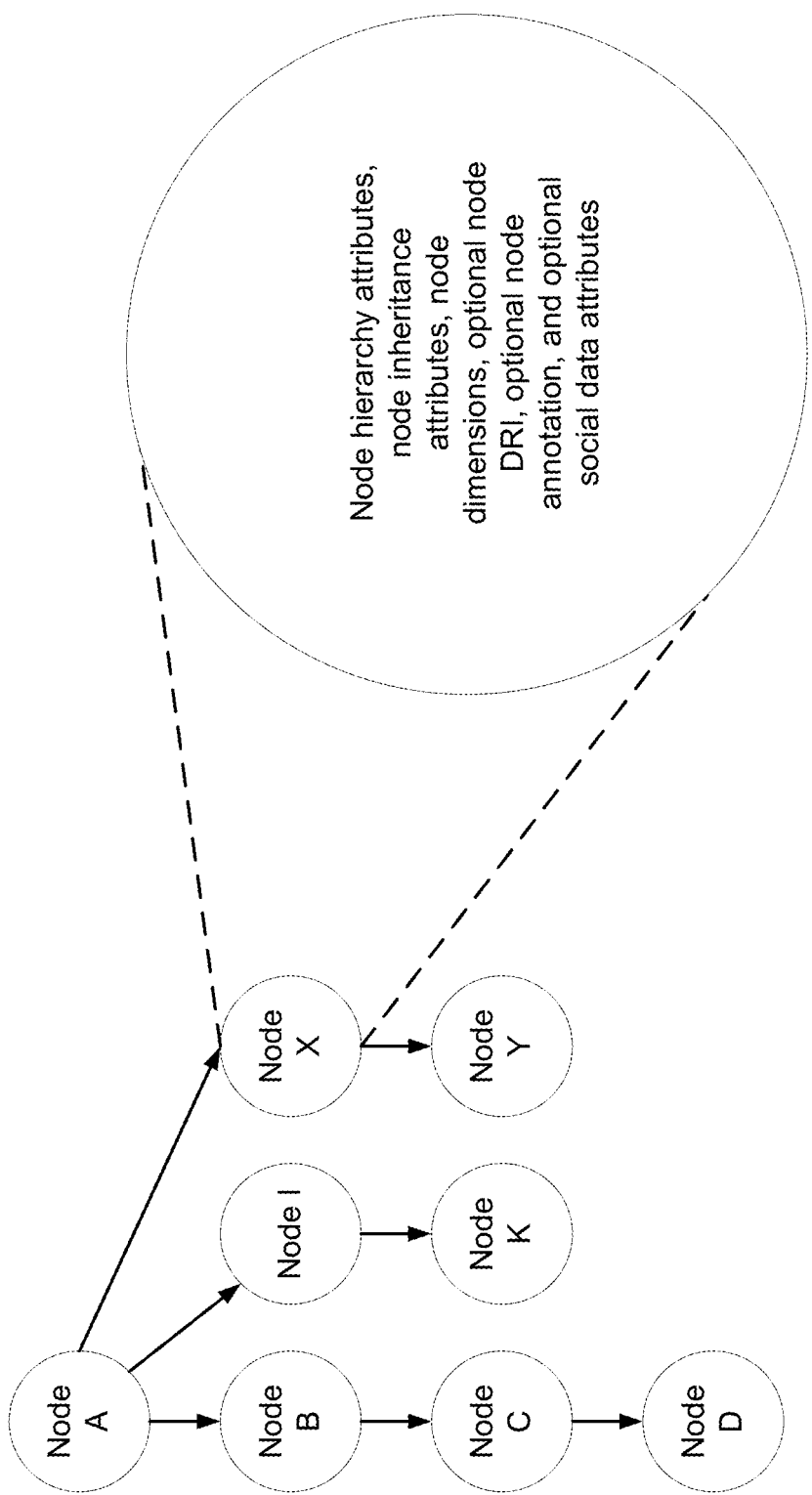
FIG. 4 illustrates an example of a node tree hierarchy and an example of attributes of an individual node in accordance with an implementation.

FIG. 4 illustrates an example of a node hierarchy and an example of node attributes associated with an individual node. In this example, there is a root node and a node and child nodes. In this example, a reorganized node hierarchy may include individual nodes and node branches not present in an original node hierarchy.

One aspect illustrated by FIGS. 3A, 3B, and 3C and FIG. 4 is that the nodes are flexible and composable units for visualization of financial data. Also, a user may reorganize the nodes to provide a powerful way to group a set of transactions together. The reorganization may, for example, be performed for a node to provide a complete representation of the financial data of a department, a product, a company, or a portfolio of companies. The user has the freedom no regroup rows of financial data for their needs. They can also do things like assign a DRI to a node, create annotations for a node, and perform social/communication and social interactions about a node.

Node Management And Node Communication

FIG. 5 illustrates an example administrative user interface for setting node management permissions and access controls for nodes. Additionally, user management may also be supported to invite user, edit users, promote users, demote users, promote administrators, and demote administrators.

The access control can, for example, assign users different authority levels. Users can be assigned authority levels for individual nodes based, for example, on various attributes such as the department the user belongs to, the teams a user belongs to, work projects the user is working, etc.

Node management can also include controlling how views of nodes shared. For example, in some implementations, a view of financial data (e.g., a particular node hierarchy and selections on how the node data is presented) may be shareable at different levels of granularity, such as to an entire company, to specific groups, to specific internal or external users, to a domain, or to a public URL (e.g., with optional password protection. Shareable views may further have different levels of authority for user to edit, view, or comment on a view.

For example, a node can have permissions and access control settings that are different for node owners (e.g., DRIs), administrators, contributors, and viewers. In some implementations, the administrative user interface determines which users can view unprotected nodes, view protected nodes, edit nodes, delete nodes, protect nodes, edit views, save views, export node data as a file, perform external sharing, or perform internal sharing. Additional user management may include privileges to invite users, edit users, remove user, promote owners, demote owners, promote administrators, and demote administrators.

Additionally, permissions may be set for actions a user can take, such as controls on whether or not a user can edit a view, edit comments in a node communication, etc.

Access control and permissions may be set at both gross and fine levels of control. Additionally, the access control and permissions may be varied to provide the level of node access and node communication required by individual users based on factors such as their job description, teams, department, and projects.

It will be understood that the administrative user interface may have fewer or more features than that illustrated in FIG. 5 to control access to nodes and control node communication.

In one implementation, every node has associated visibility and editing permissions. In one implementation, every node has an allowed read/write list for users and groups. Thus a node can allow read or write operations for all users but specific read/write operations may be limited to specific users and specific groups.

Other details about node communication may also be set by an administrative user interface or by individual users. This may include, for example, notification preferences for how (and who) new communications on a node are communicated. Some examples include visual indicators on a user interface display of a node, rules for user communication on a node triggering user notifications as a node follower, etc.

Some examples of node permissions include node states (e.g., protected or unprotected), node access (read or access privileged), node actions (e.g., create; zoom; edit to rename, move, delete, or group; share, unshare, protect, unprotect); social communication tags (tag access or tag actions to create, edit, archive, or delete communication tags), view read/write access, view actions (to save, revert, rename, edit, share, public, or export), view sharing & publishing actions.

FIG. 6 illustrates, as a high level, some of these aspects at a user level. A user viewing a visualization of financial data is provided with a view of financial data consistent with the associated node access control parameters and permissions 620. Their ability to use nodes to communicate is also dependent on communication rules and permissions 625. However, assuming a user is granted access to view and communicate about a node, they may, for example be provided a visualization showing a DRI 605 and/or information on other people having discussions about a node. A message indictor 615 may provide notification of new messages. A message/discussion window 610 may, for example, be accessed in different ways, such, as in a side bar, pop=up, or opened from a menu, or in response to a command key entry. Underlying the ability to engage in messages and discussions are features, such as an API, to interact with support software 630 to access contact information and support messaging discussion using tools like email, text, voice, or video communication.

Figure 7:
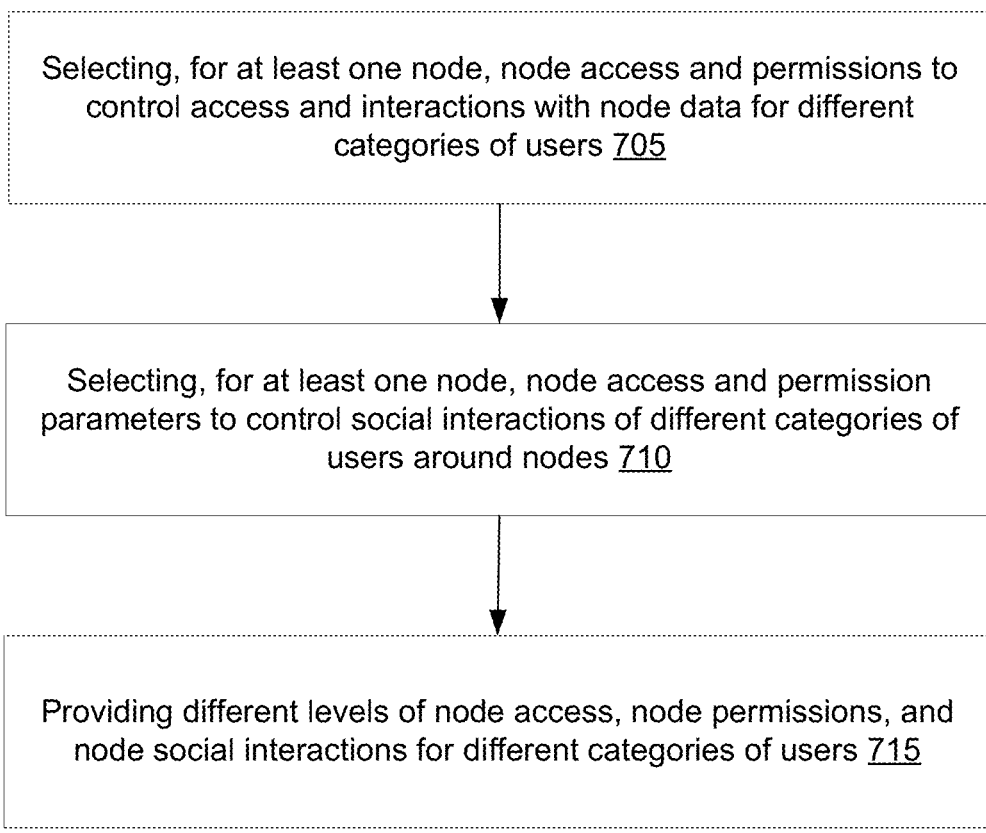
FIG. 7 is flowchart of an example of controlling social interaction on a node in accordance with an implementation.

FIG. 7 is a flowchart of an example method of using node access controls and privileges. In block 705, node accesses and permissions for a node are selected to control access and interactions with node data for different categories of users. In block 710, node access and permission parameters are selected to control social interactions of different categories of user around nodes. In block 715, different levels of node access, node permissions, and node social interactions are provided for different categories of users.

Customization Example

A view state generally corresponds to data describe a state associated with a decisions a user made to navigate a UI, regroup rows of financial data, add dimensions, and perform other UI operations to regroup and view data. There may (or may not) also be additional data on visualization format choices of the use. For example, an individual user may, in some implementations, be able to configure a variety of generic options for the presentation and display of data.

Referring to FIG. 8A, the user interface may support a default visualization of financial data, which may correspond to a chart of accounts view. This may include a standard view state 805 and a standard format 810 for presenting financial data similar, for example, to the ways accountants or CFO might present financial data.

However, as illustrated in FIG. 8B, the financial data can be reorganized by a user into rows of data into a different grouping in user-defined categories. A custom view state 820 may be created. A custom data presentation format 825 may also be created. This may also be described as having a custom visualization mode.

The customization in hierarchical groupings, view state, and format presentation allows a user to view financial data according to their own mental map of how they want to see the data presented. And different users in the same business entity can view financial data in different ways. For example, data describing the the standard view state, standard format, and standard hierarchy may be persisted as a default. Data for different user-defined hierarchical representations, view states, and format presentation may be maintained by a system so that different users get different presentations of data and can customize the presentation based on their preferences.

In some implementations, view states are persisted and a view state may define a combination of a specific node hierarchy, node dimension, filtering/zooming, etc. In some implementation, a view state is shareable (e.g., via unique links). In some implementation, a view state may be designated as a default view for one or more users.

In some implementation, a visualization similar to a sparkline (showing a variation over time) or a recurrence grid is generated for each row of a node to visually indicates trending and frequency behavior for a node.

In some implementations, a base dashboard view is supported that permits a user to drill down individual categories as desired to created expanded views. Rules may be included to sort child nodes in the base view by parameters such as the total amount of revenue or spending. Base view controls may be provided to filter on nodes, transactions, or dimensions. Time filters may be provided. An information bar may be provided in a portion of a display to provide contextual information about a current selection of nodes. A capability to focus or zoom in on a node may be provided to make a selected node the root node. In some implementations, a "breadcrumb" visualization is provided to indicate a current position in a node hierarchy. In some implementations, pivot tables are supported to pivot rows based on node dimensions.

One aspect is that a user has tremendous freedom to have data presented by any dimension possible and in a format that matches a user's mental model about what type of financial data is important and how it is to be presented.

Annotation Example

FIG. 9 is a high level diagram of a user interface showing a node having a grouping of rows of financial data according to a user defined hierarchy. For the purposes of illustration, the node may be for income data. In one implementation, a user can associate an arbitrary number of different annotations to a node (e.g., 1, 2, 3 . . . . N). An annotation may be used to provide data or formulas that can be applied to the row data of a node. The user can define a custom annotation, which could optionally be saved for reuse by the user. However, more generally a library of annotations (e.g., 1, 2, 3 . . . M) can be persisted for a user or for an organization as a library annotation 925. For example, an annotation applying a value to rows of cell data 905, such as a number or percentage for a currency conversion 905 could be applied. As another example, an annotation could include a budget for a budget forecast or projection 910. For example, a variance of the actual income versus budget projections and forecasts of income maybe generated 910. As another example, an annotation may apply a financial calculation, such as determining a specific average value 915 as an example. Other custom annotations 920 may be used, based on well-known financial formulas or custom formulas created by a user.

In some implementations, a user may selected whether annotations are visible or invisible. Additionally, in implementations, an annotation may interact with a user when select (e.g., pop-up or open-up when scrolled over or otherwise selected).

In one implementation, an annotation is treated as a child of the node it is associated with.

The user interface may, for example, apply and display the different annotations attached to a node. However, the annotation may be also be expandable/collapsible. Also, while an individual annotation may perform operations separate from the other annotations, more generally, one annotation may use the results of another annotation. For example, an annotation may be used to apply a currency conversion that is, in turn, used in a budget forecast. Additionally, as previously discussed, in theory an annotation could draw in information from a node it is not directly associated with, such as drawing in information from a different department for a comparison of department performance.

Additional Method Flowchart Examples

Figure 10:
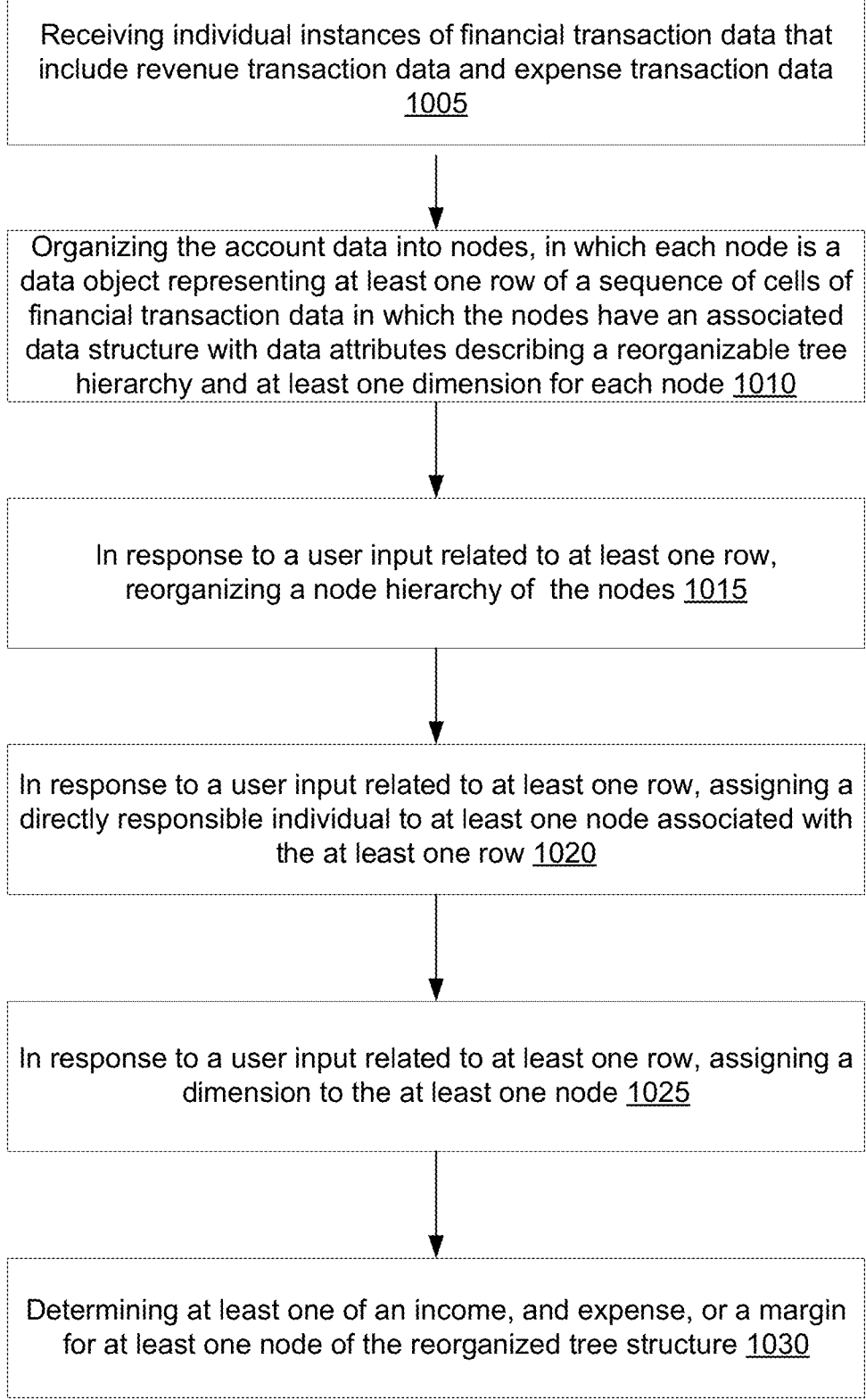
FIG. 10 is a flow chart of a method of reorganizing nodes of financial transaction data and performing additional optional operations to the reorganized nodes in accordance with an implementation.

FIG. 10 is a flowchart of an example of a method of reorganizing row node data and performing one or more other operations on the reorganized node data. In block 1005, individual instances of financial transaction data are received that includes revenue transaction data and expense transaction data. In block 1010, the account data is organized into nodes in which each node is a data object representing at least one row of a sequence of cells of financial transaction data in which the nodes have an associated data structure describing a reorganizable tree hierarchy and at least one dimension for each node. In block 1015, in response to a user input related to at least one node, the node hierarchy is reorganized. As some examples, the nodes may be regrouped to have an order of the rows different than an original order.

One or more other operations may be performed on the reorganized node data. In block 1020, a directly responsible individual is assigned to at least one row of the reorganized tree hierarchy in response to a user input. In block 1020, a dimension is assigned to at least one row of the reorganized tree hierarchy in response to a user input. In block 1025, a determination is made of at least one of an income, expense, or a margin for at least one node of the reorganized tree hierarchy.

Figure 11:
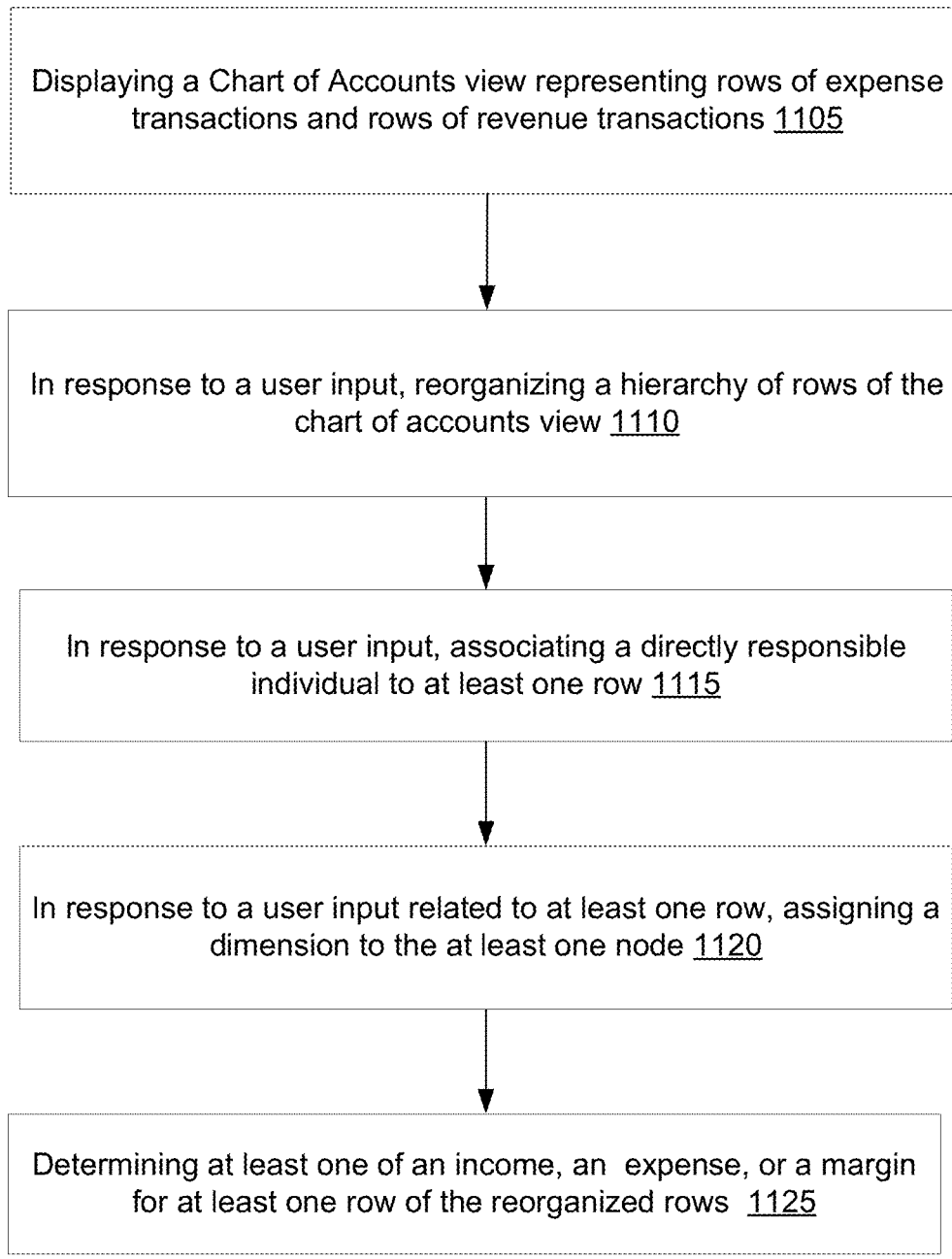
FIG. 11 is a flow chart of a method of reorganizing rows of data of a chart of accounts view of financial data into a different organization having a different hierarchy of financial data and performing optional operations on reorganized rows of data. in accordance with an implementation

FIG. 11 is a flowchart of an example of a method of reorganizing row node data starting from a chart of accounts view and performing one or more other operations on the reorganized node data. In block 1105, a chart of accounts view of financial data is displayed to represent rows of expense transactions and rows of revenue transactions. In block 1110, a hierarchy of rows of the chart of accounts view is reorganized in response to a user input. As examples, the user interface many support dragging and dropping of rows in new locations, keyboard shortcuts, or menu commands to aid in the reorganization via the UI. In block 1115, a directly responsible individual is assigned to at least one node in response to a user input. For example, a pop-up window or menu may be provided for a user to assign a DRI to a node. In block 1120, a dimension is assigned to at least one node in response to a user input. In block 1125, a determination is made of at least one of an income, an expense, or a margin for at least one row of the reorganized rows.

Figure 12:
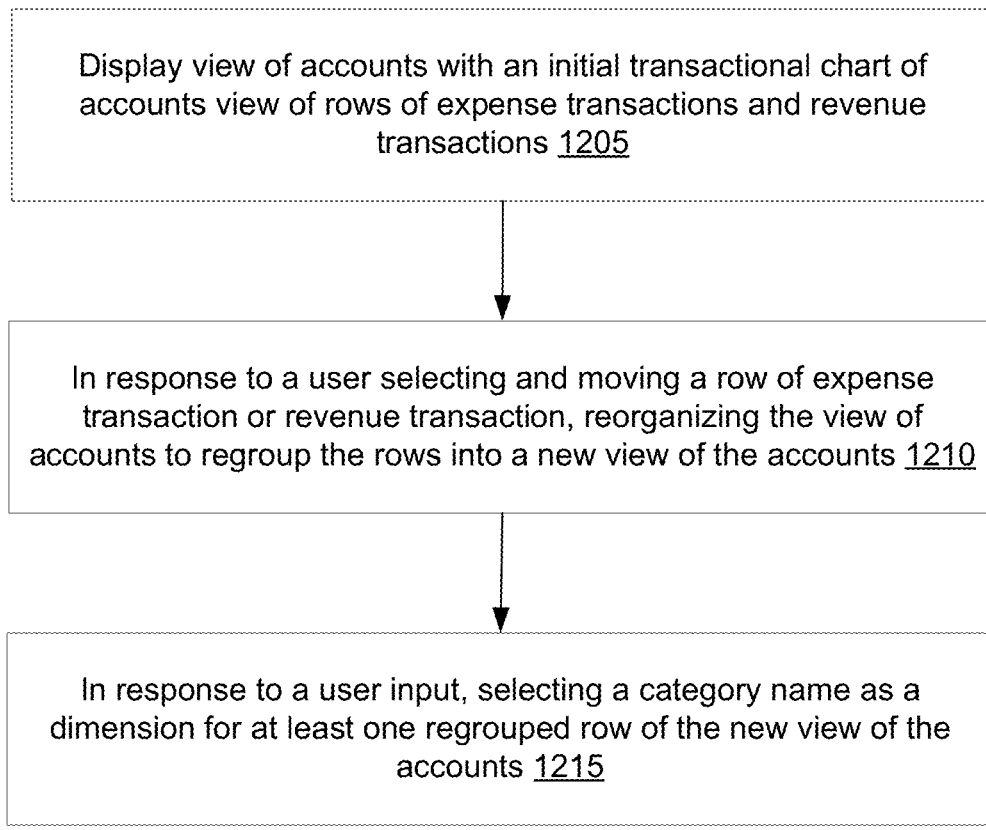
FIG. 12 is a flow chart of a method of changing a chart of accounts view of rows of financial transaction data into a different view of the rows of financial data having a different grouping of the rows of financial transaction data in accordance with an implementation.

FIG. 12 is a flowchart of an example of a method for starting with an initial chart of accounts view of financial data and regrouping rows of financial data based on user inputs. In block 1205, an initial chart of accounts view is displayed of rows of expense transactions and revenue transactions. In block 1210, the view of accounted is reorganized to regroup the rows into a new view of the accounts in response to a user selecting and moving a row of expense transactions or revenue transactions. For example, the user may drag and drop a row via the UI. In block 1215, category name is selected as a dimension for at least one regrouped row of the new view of accounts in response to a user input. For example, the user interface may include a shortcut key, menu, or other user interface feature to enter a dimension.

Figure 13:
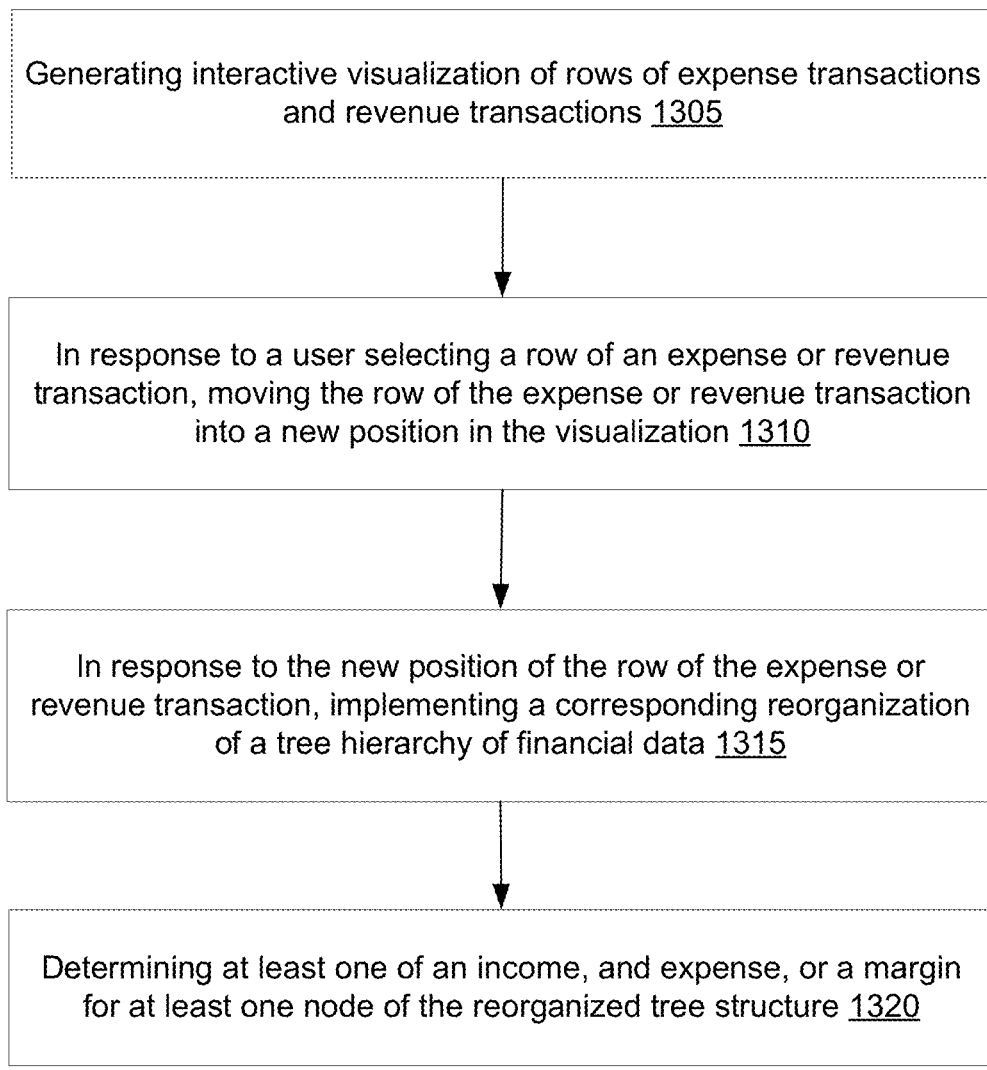
FIG. 13 is a flow chart of a method of reorganizing rows of financial transaction data in an interactive visualization in accordance with an implementation.

FIG. 13 is a flowchart illustrating an example of a method of starting with an initial visualization of financial data, regrouping rows of financial data based on user input, updating the corresponding tree hierarchy, and optionally performing at least one other operation. In block 1305, an interactive visualization is generated having interactive rows of expense transactions and revenue transactions. In block 1310, a row of an expense or revenue transaction is moved into a new position in the visualization in response to a user selecting the row. The selection may, for example, be implemented as a drag and drop operation, but may also be implemented in other ways, such as via command shortcuts, UI menus, etc. In block 1315, a corresponding reorganization of the node tree hierarchy of the financial data is implemented in response to the new position of the row of expense or revenue transaction data by node data object management system 104. Other optional operations may be performed after the reorganization. For example, block 1320 illustrates determining at least one of an income, expense, or a margin for at least one node of the reorganized tree structure.

Figure 14:
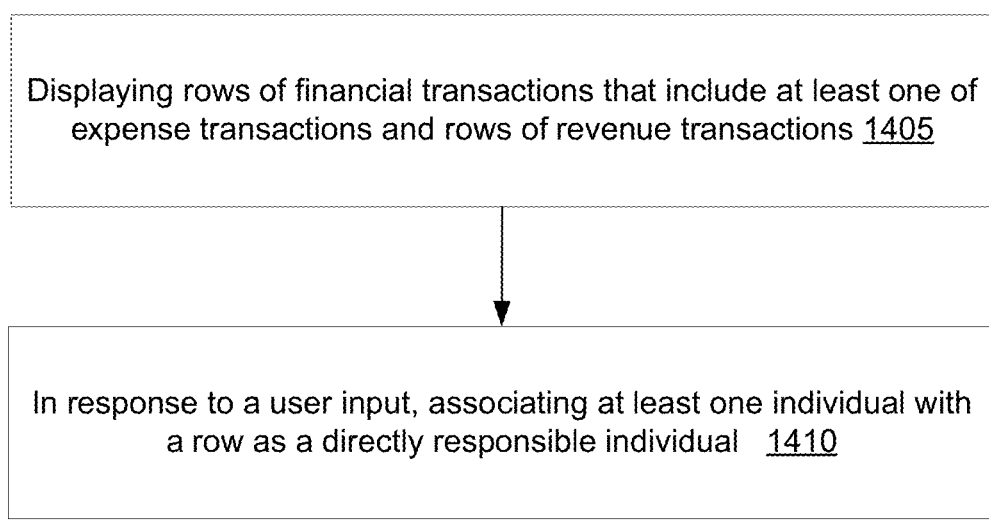
FIG. 14 is a flow chart of a method of associating an individual with one or more rows of financial transaction data in accordance with an implementation.

FIG. 14 is a flowchart of a method of assigning a DRI to a node. In block 1405, rows of financial transaction data are displayed that include at least one of rows of expense transactions and revenue transactions. In block 1410, at least one individual is associated with a row as a directly responsible individual in response to a user input. In some implementation, only one person is assigned as a DRI to a row. However, more generally, more than one individual may be assigned as a DRI to a row. For example, a node that includes a grouping of several rows of financial transaction data may have a DRI assigned to the node and additional DRIs assigned to the same node or to individual nodes or rows grouped within the node.

Figure 15:
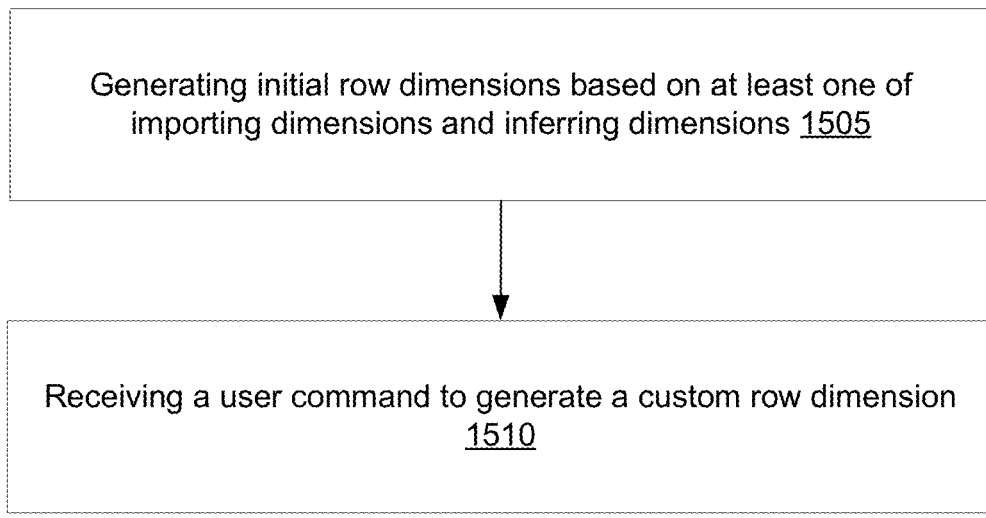
FIG. 15 is a flow chart of a method of implementing row dimensions in accordance with an implementation.

FIG. 15 is a flowchart of an example of generating a custom row dimension. In block 1505, initial row dimensions are generated. The generation may be based on importing dimensions or inferring dimensions from the financial data, as some examples. In block 1510 a custom row dimension is generated based on a user command. For example, a user may generate a custom row dimension based on their own naming preferences, such as to describe a regrouping of row data.

Figure 16:
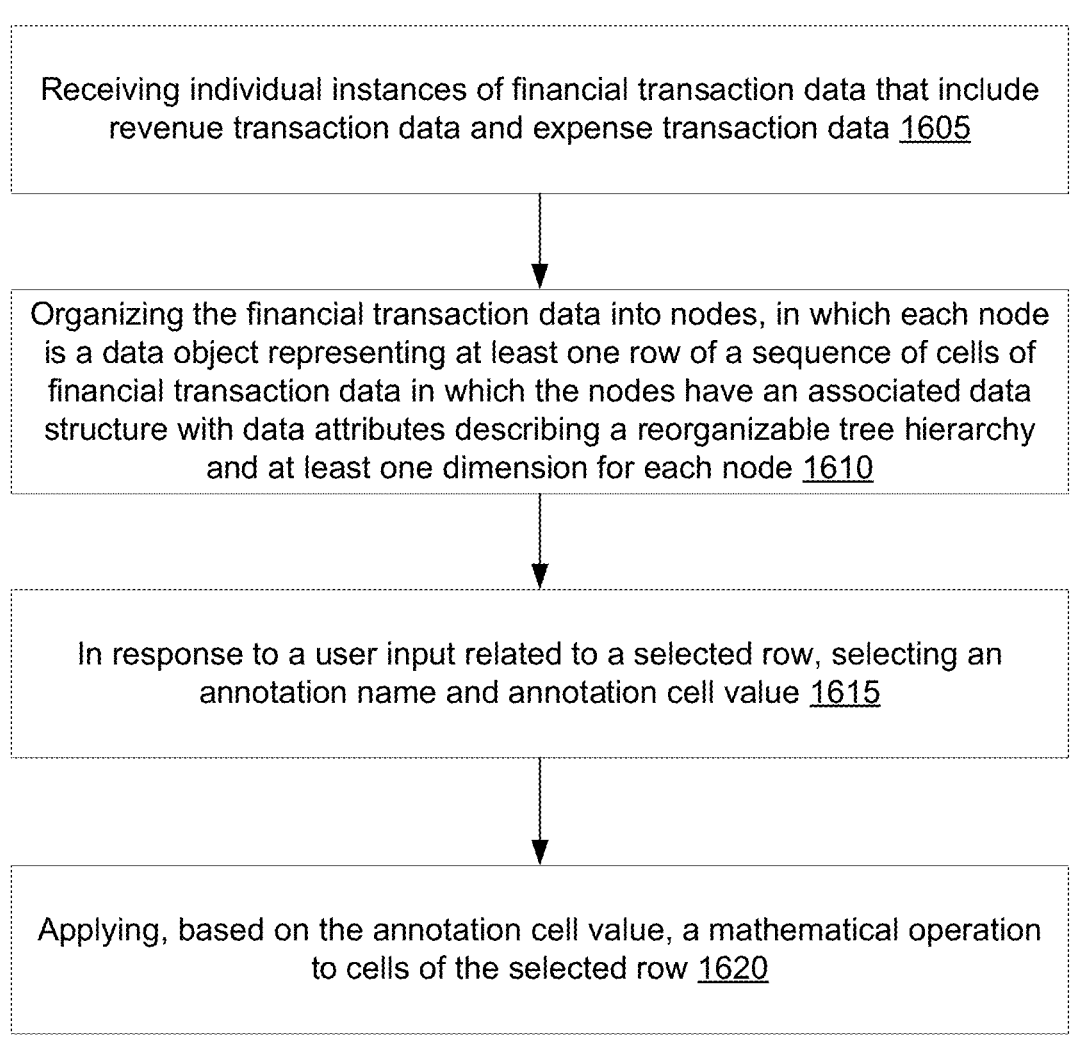
FIG. 16 is a flow chart of a method organizing rows of financial transaction data into rows and applying annotations to at least one row in accordance with an implementation.

FIG. 16 is a flowchart of an example of a method of creating annotations In block 1605, individual instances of financial transaction data are received that include revenue transaction data and expense transaction data. In block 1610, the financial transaction data is organized into nodes, in which each node is a data object representing at least one row of a sequence of cells of financial transaction data in which the nodes have an associated data structure with data attributes describing a reorganizable tree hierarchy and at least one dimension for each node. In block 1615, a selection of a node annotation name and cell value is selection in response to a user input related to a selected row. In block 1620, a mathematical operation is applied on cells of the selected row based on the annotation cell values. For example, the annotation may describe a currency conversion, budget forecast, budget variance, or other formula using values of the cell data of the selected row. The annotation may be attached to the selected row.

FIG. 17 is a flow chart of an example of a method of using annotations. In block 1705, rows of financial transaction data are displayed that include at least one of rows of expense transaction data and rows of revenue transaction data. The rows have an associated data structure with data attributes describing a reorganizable tree hierarchy. In block 1710, an annotation is generated for a selected row in response to a user input, wherein the annotation implements at least one mathematical operation on a row of cell data.

FIG. 18 is flowchart of an example of a method of using annotations for budget calculations. In block 1805, rows of financial transaction data are displayed that include at least one of rows of expense transaction data and rows of revenue transaction data. In block 1810, an annotation is generated in response to a user input to implement a budge forecast or a budget variation, wherein the annotation implements at least one mathematical operation on a row of cell data.

Figure 19:
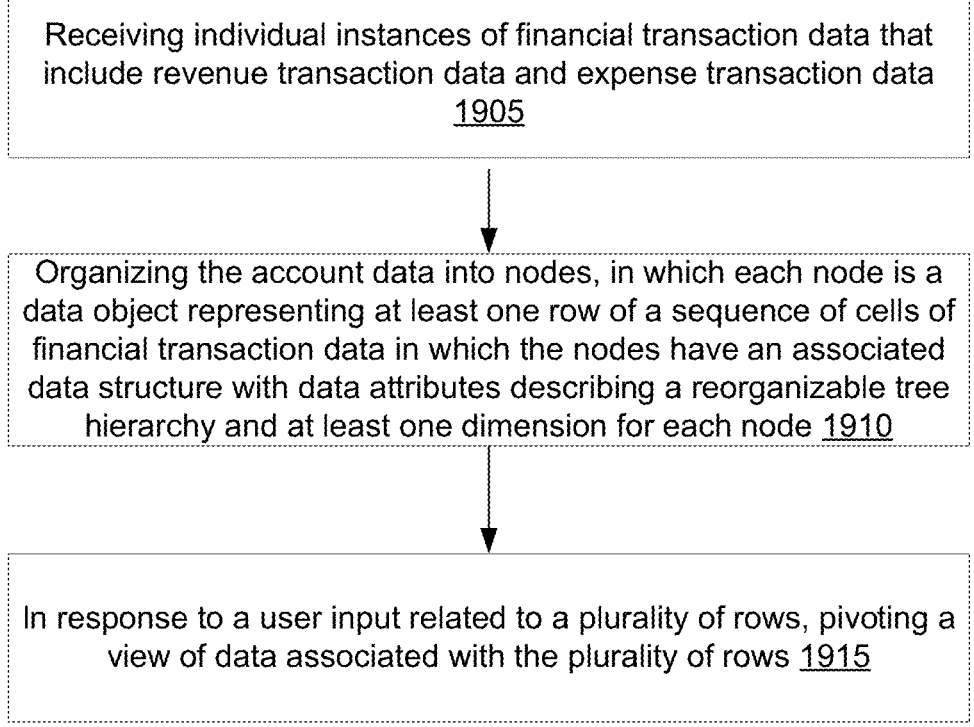
FIG. 19 is a flow chart of a method of pivoting a view of data associated with rows of financial transaction data in accordance with an implementation.
Figure 20:
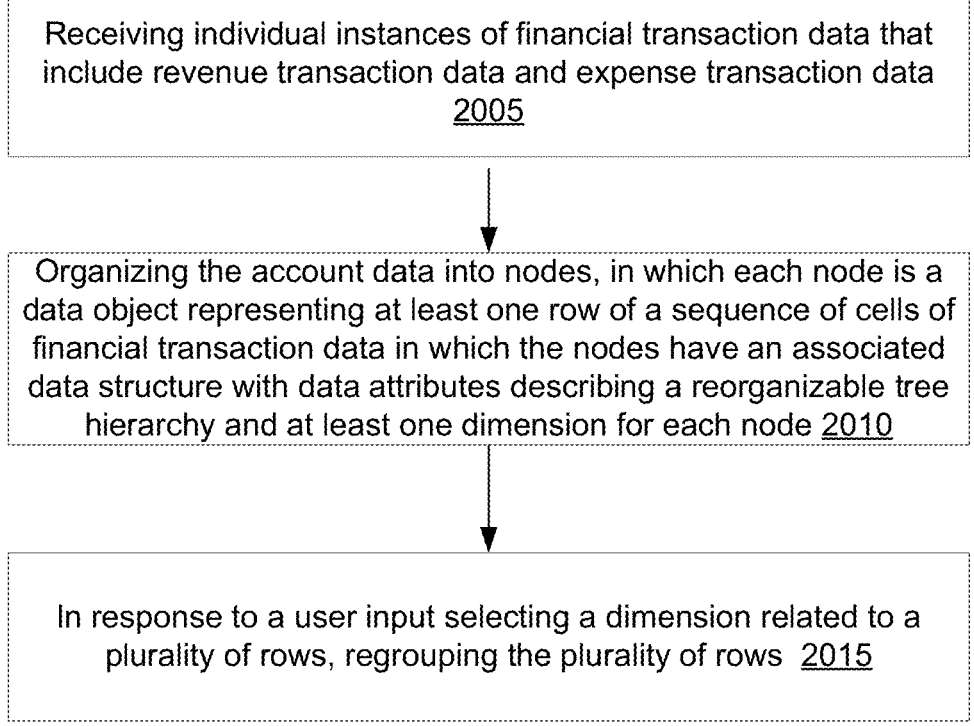
FIG. 20 is a flow chart of a method of regrouping a plurality of rows of financial transaction data in response to a user input in accordance with an implementation.

FIG. 19 is a flowchart of an example of a method of pivoting data. In block 1905, financial transaction data is received that includes instances of revenue transaction data and expense transaction data. In block 1910, the financial transaction data is organized into nodes, in which each node is a data object representing at least one row of a sequence of cells of financial transaction data in which the nodes have an associated data structure with data attributes describing a reorganizable tree hierarchy and at least one dimension for each node. In block 1915, a view of the node data is pivoted (e.g., by a node dimension such as department, subsidiary, etc.) in response to a user input.

Additional User Interface Examples

Figure 21:
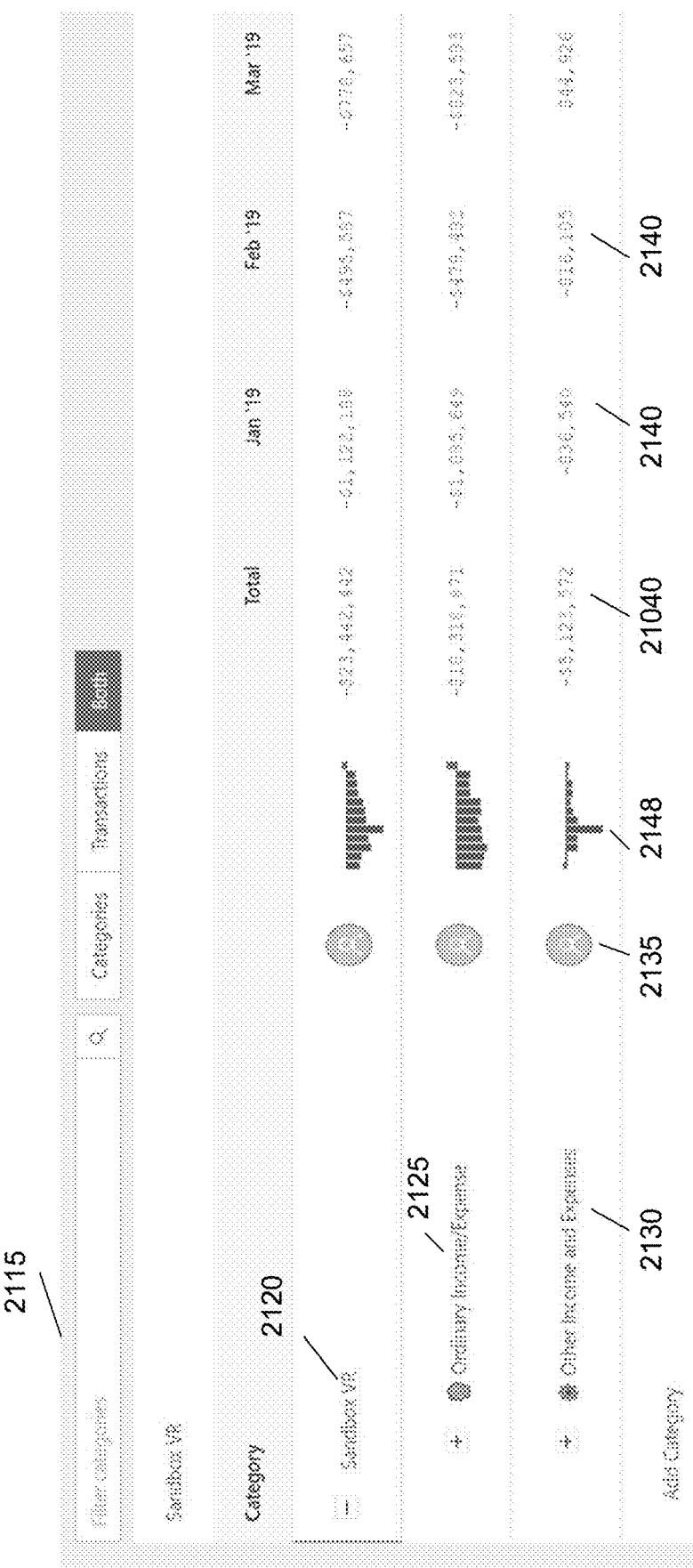
FIG. 21 illustrates an example of a financial data visualization UI displaying income and expense data for a user selected category in accordance with an implementation.
Figure 22:
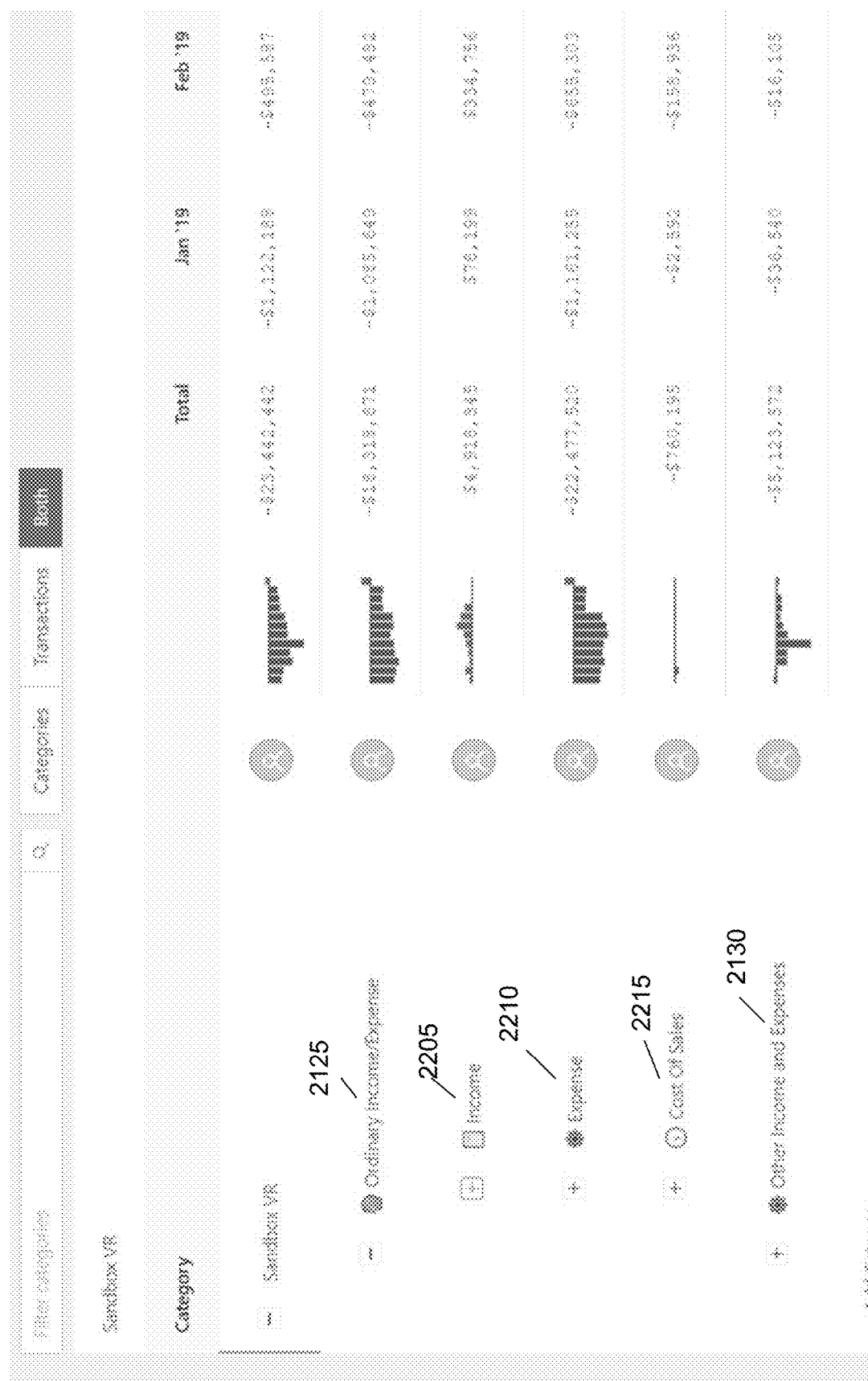
FIG. 22 illustrates an example of zooming into the ordinary income/expense node of FIG. 21 in accordance with an implementation.
Figure 23:
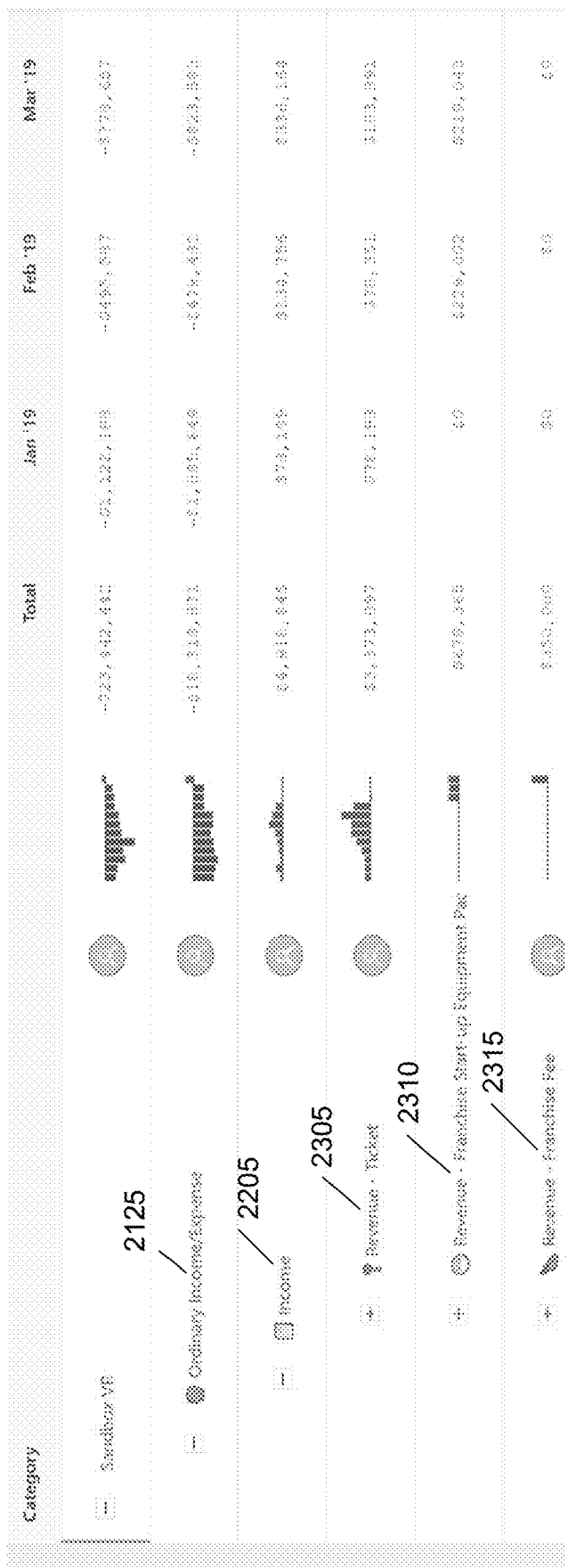
FIG. 23 illustrates an example of zooming into the income node of FIG. 22.

FIG. 21 illustrates an example of a user interface in accordance with an implementation. A search bar 2115 may be provided to search on categories transactions, or other parameters may be provided. In this example, a category 2120 is illustrated with ordinary income and expenses 2125 and other income and expenses 2130. The user interface may have a placeholder 2135 for a DRI (e.g., such as a photo placeholder). Instances of rows of cell data 1940 are illustrated, along with a trend graph 2148. In the illustrated example, each row of cell data corresponds to a sequence of monthly instances of financial transaction data. FIG. 22 shows a partial zoom in on ordinary income and expenses to reveal income 2205, expense 2210, and cost of sales 2215. FIG. 23 illustrate zooming deeper in the income 2205 to reveal revenue from tickets 2305, revenue from a franchise start up equipment 2310, and revenue from franchise fee 2315.

One aspect of FIGS. 21, 22, and 23 is that it shows how the view of financial data may be zoomed in and out. Moreover, the particular grouping of rows of cell data in a node data may be grouped by user preferences and given user-defined category name.

Figure 24:
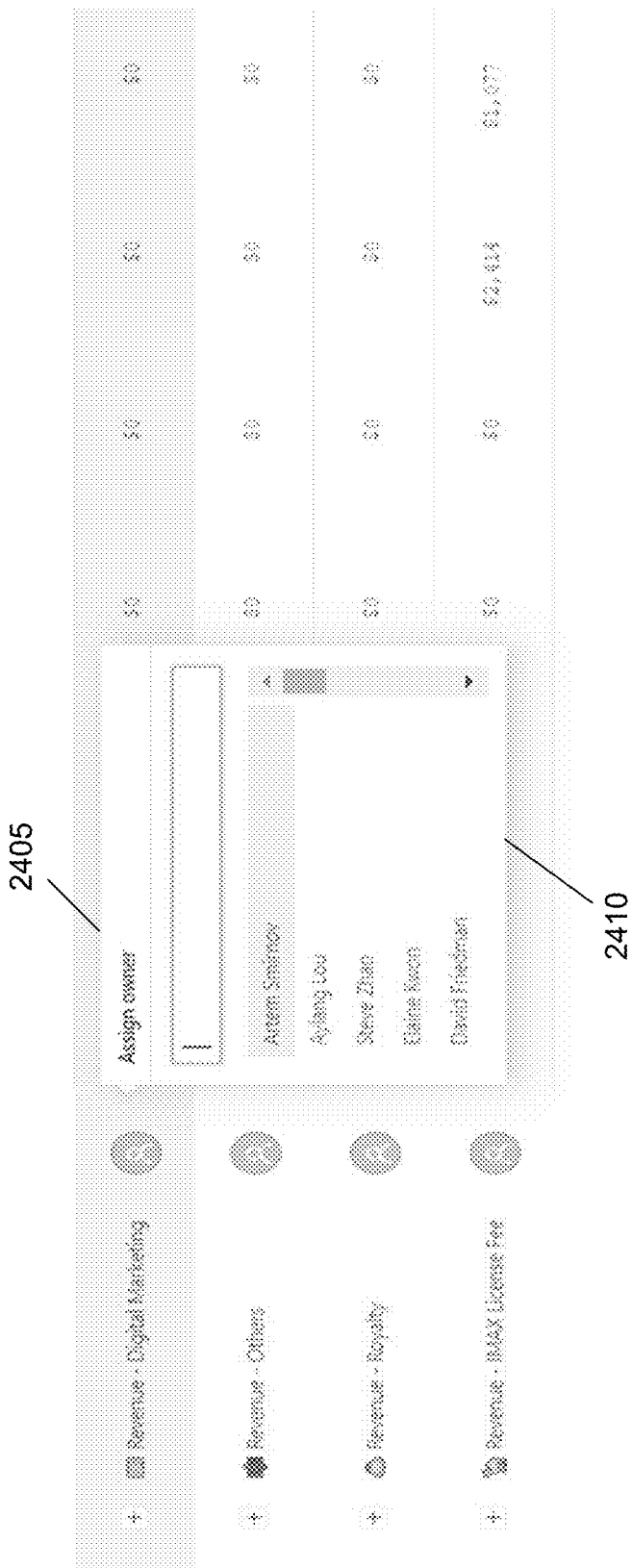
FIG. 24 illustrates an example of a financial data visualization UI feature to assign an owner to a node in accordance with an implementation.

FIG. 24 illustrate an example in which a user interface 2405 supports assigning a node to a DRI from a list of users 2410.

Figure 25:
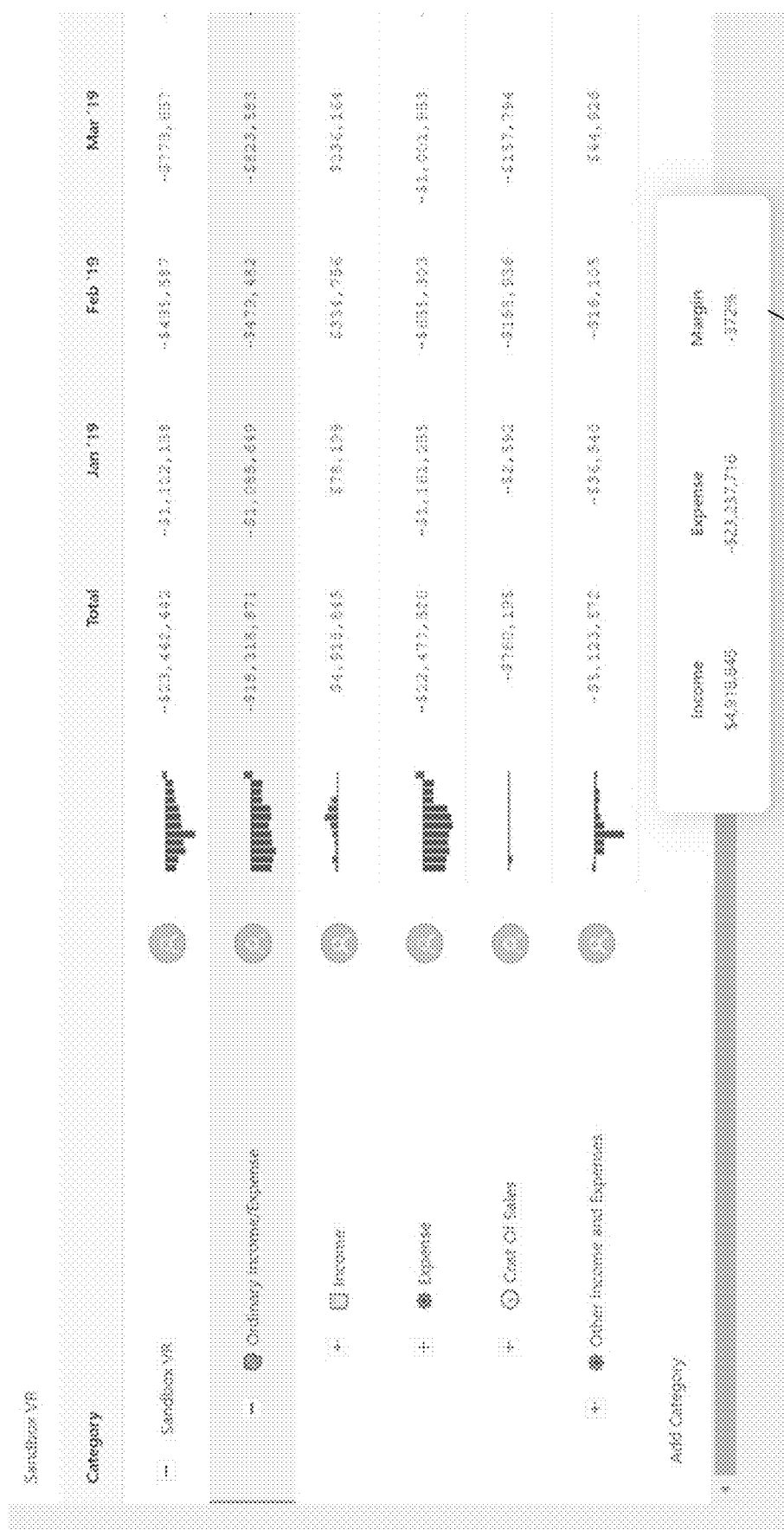
FIG. 25 illustrates an example of a financial data visualization UI with a calculation bar feature in accordance with an implementation.

FIG. 25 illustrates an example of a user interface having a calculation bar 2505 displaying financial calculations of income, expenses, margin, or other financial metrics for selected nodes.

Figure 26:
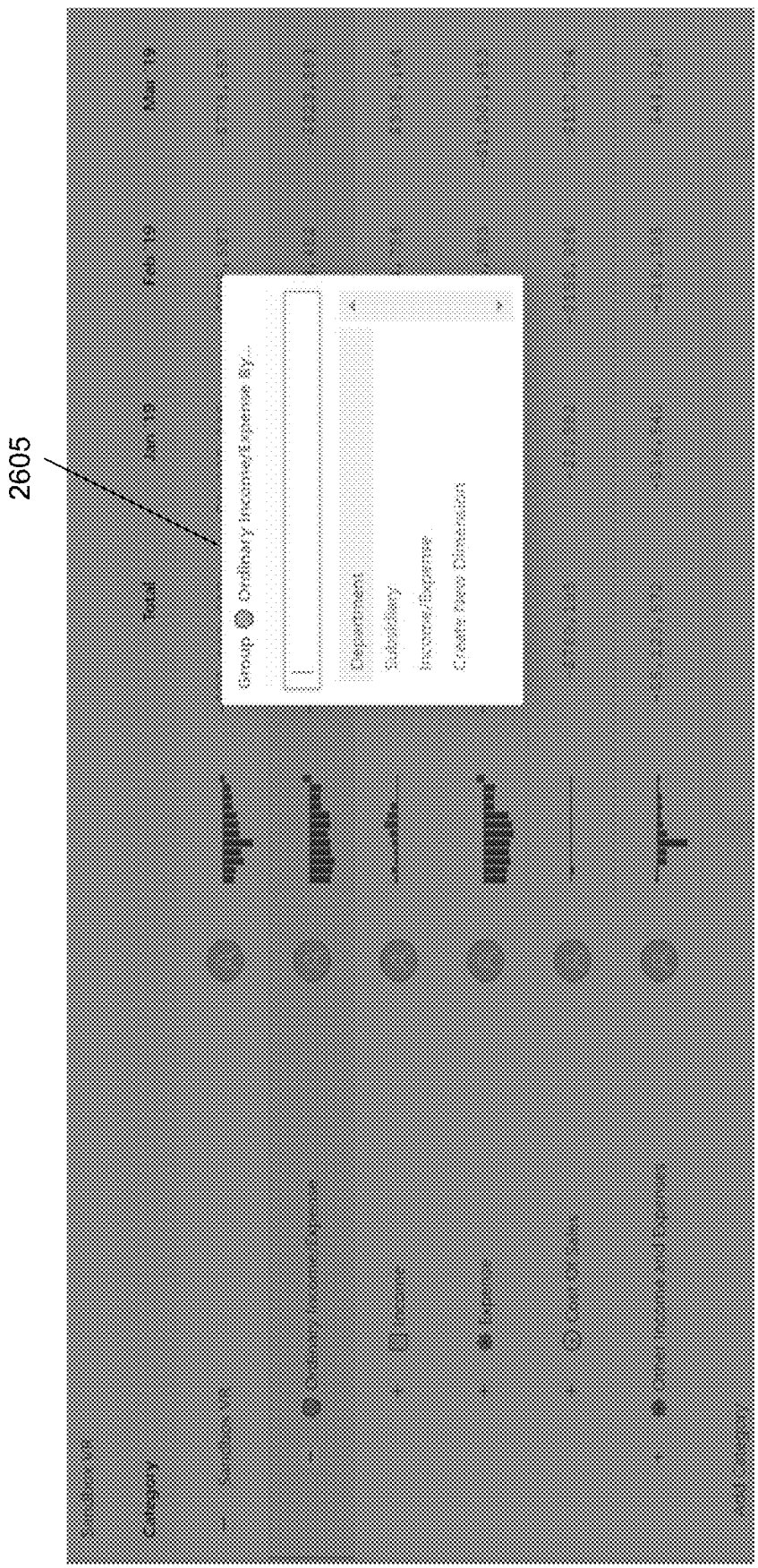
FIG. 26 illustrates an example of a financial data visualization UI with a feature to group rows of node data by dimension in accordance with an implementation.

FIG. 26 illustrates a user interface feature 2605 to aid a user to group financial transaction data by a dimension such as department, subsidiary, income/expense, or a custom dimension. That is, the user interface may include features to assist a user to regroup financial transaction data.

Figure 27:
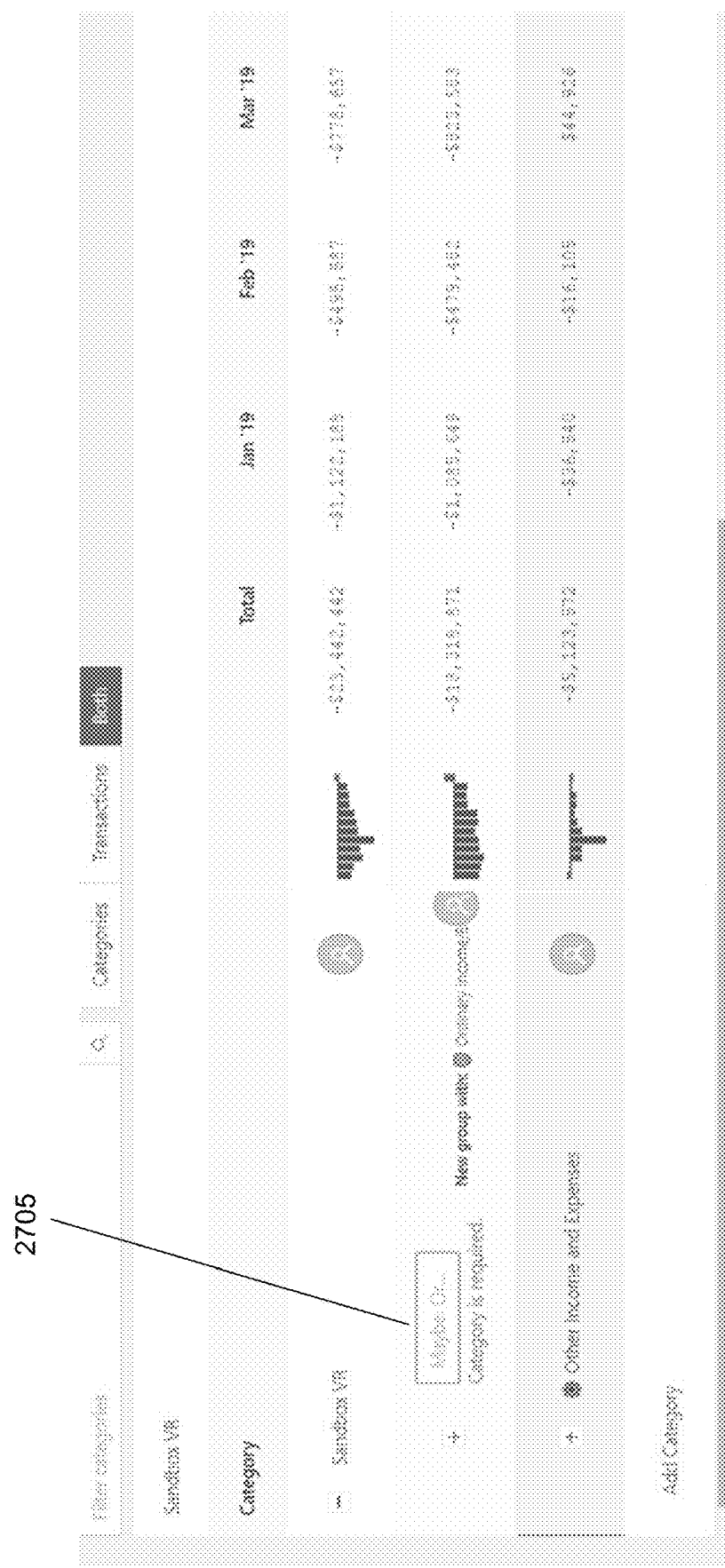
FIG. 27 illustrates an example of a financial data visualization UI with features to aid a user to input a category in accordance with an implementation.

FIG. 27 illustrates how the user interface may include features to aid a user to create new dimensions, such as a reminder feature 2705 to create a category name. Comparing FIGS. 26 and 27, the regroup is performed for the selected node.

Figure 28:
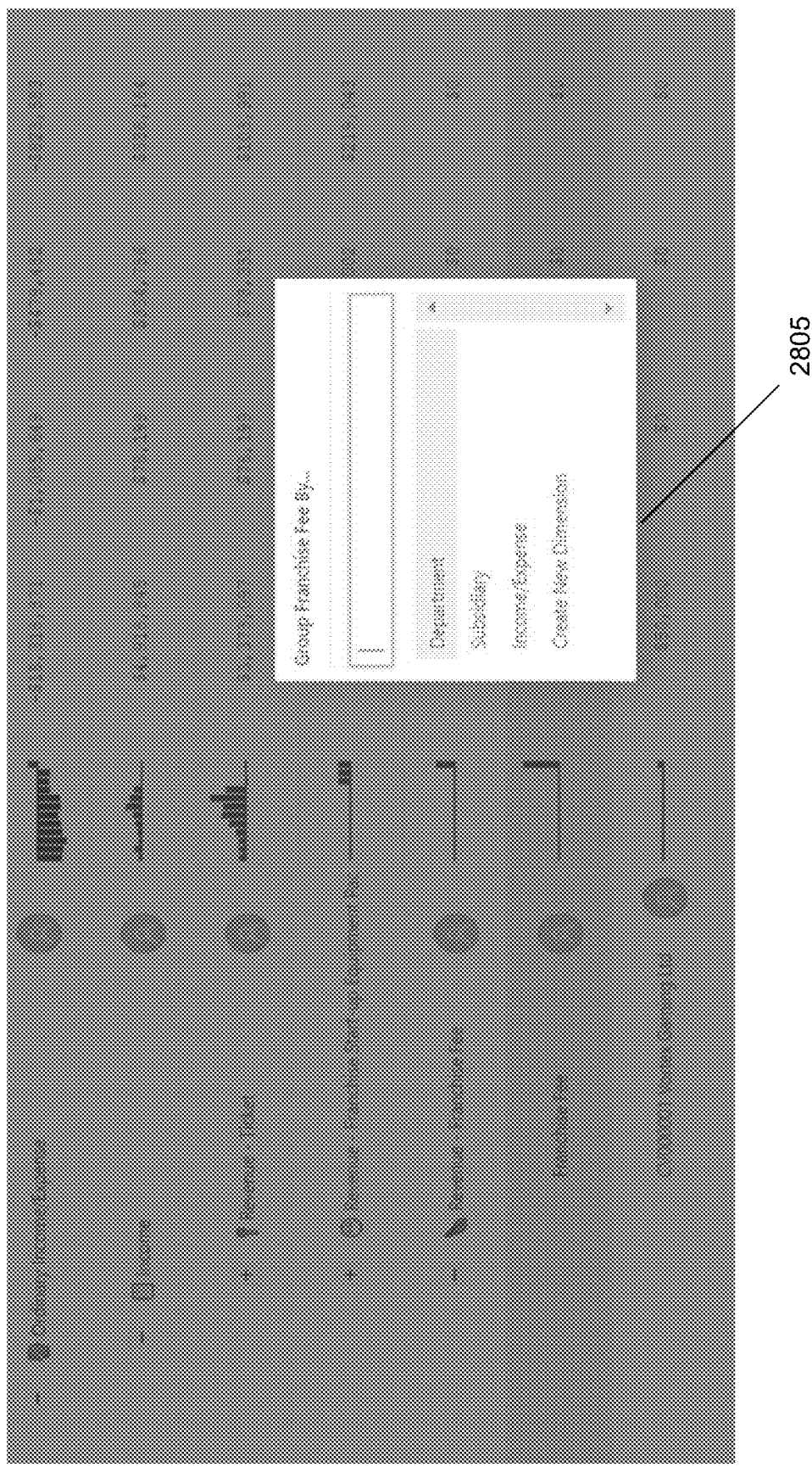
FIG. 28 illustrates another example of a financial data visualization UI having a feature to group node data by dimension in accordance with an implementation.

FIG. 28 illustrates another example of a user interface feature 2705 to aid a user to group financial transaction by dimension.

Figure 29:
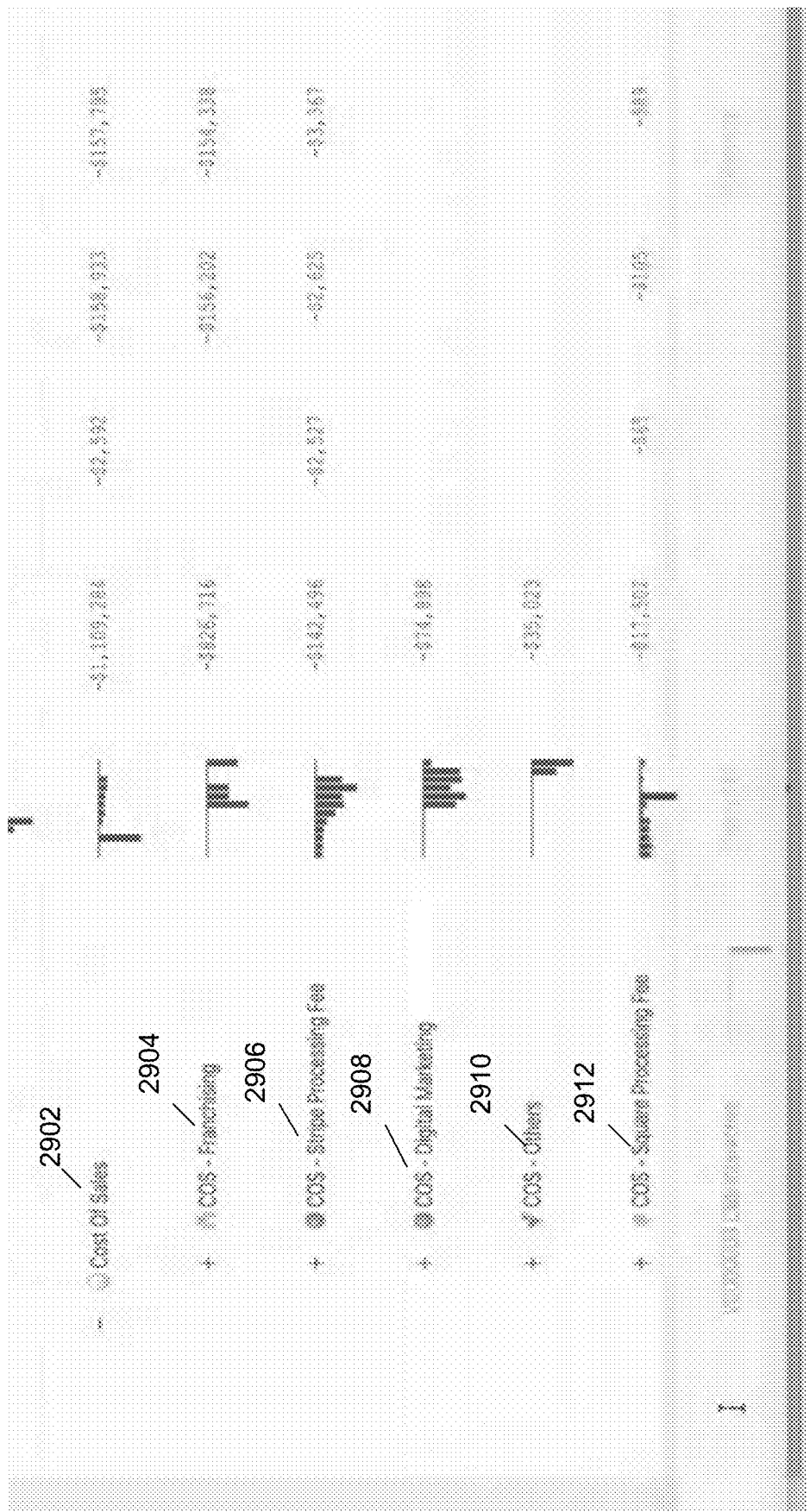
FIG. 29 illustrates an example of a financial data visualization UI displaying cost of sales nodes. in accordance with an implementation

FIG. 29 illustrates an example of a user interface showing cost of sales 2902 for costs such as franchising 2904, a Stripe payment processing fee 2906, digital marketing 2908, other COS fees 2910, and a Square processing fee 2912.

Figure 30:
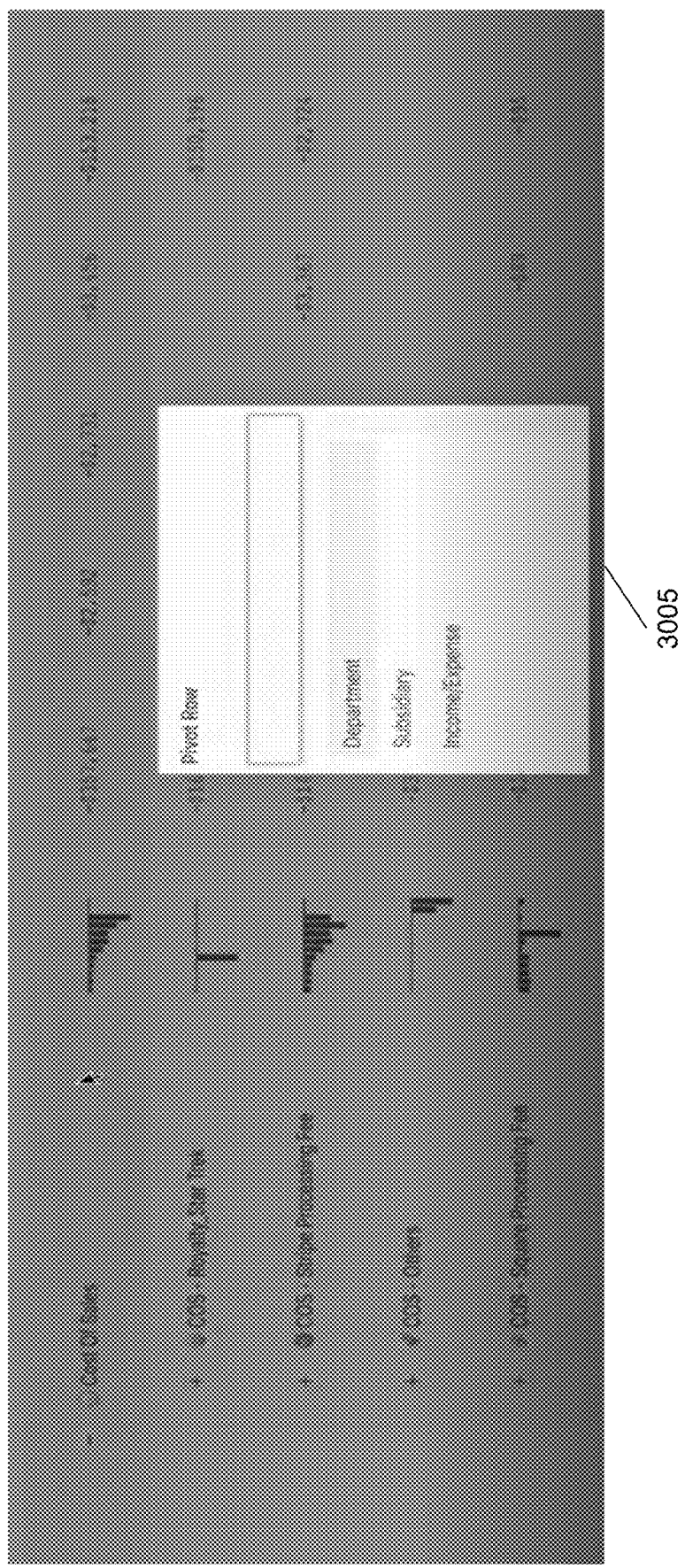
FIG. 30 illustrates a UI feature to pivot rows of the UI of FIG. 29 in accordance with an implementation.
Figure 31:
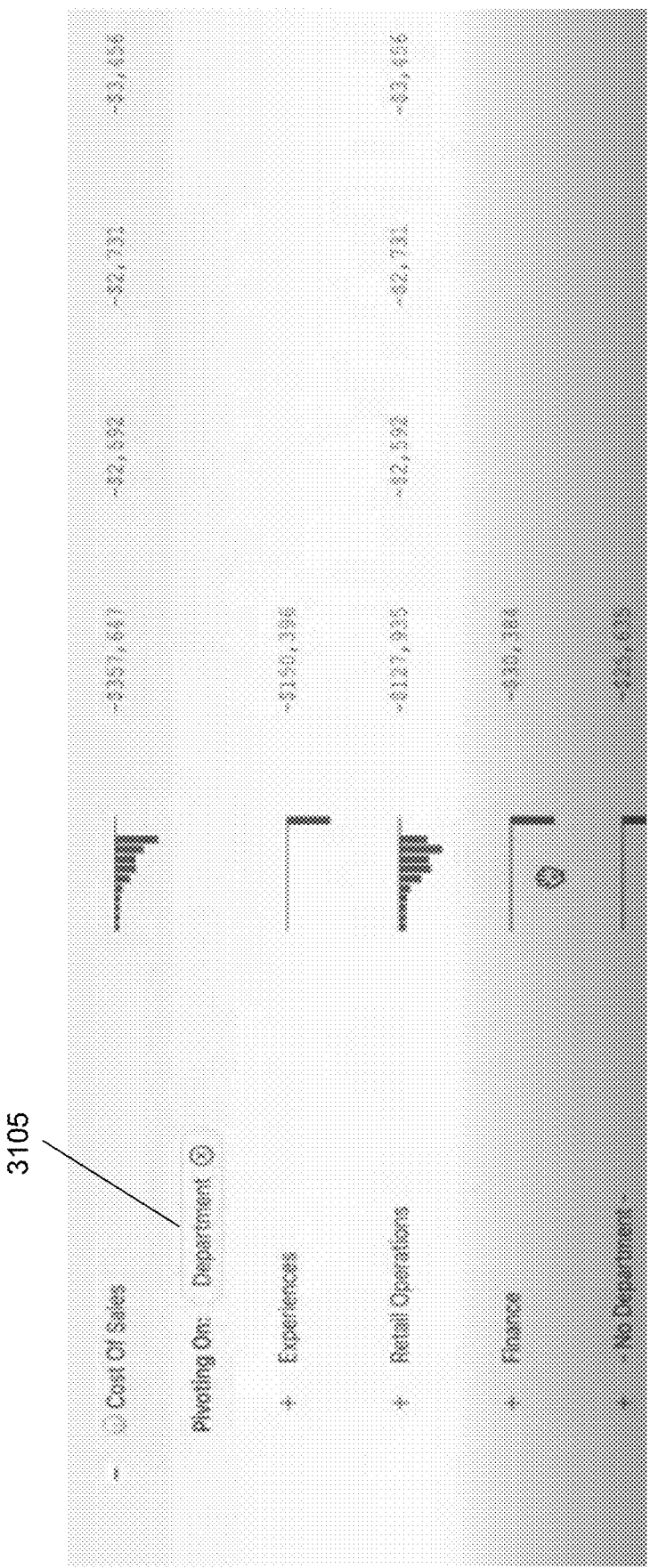
FIG. 31 illustrates the UI of FIG. 29 pivoted by department in accordance with an implementation.
Figure 32:
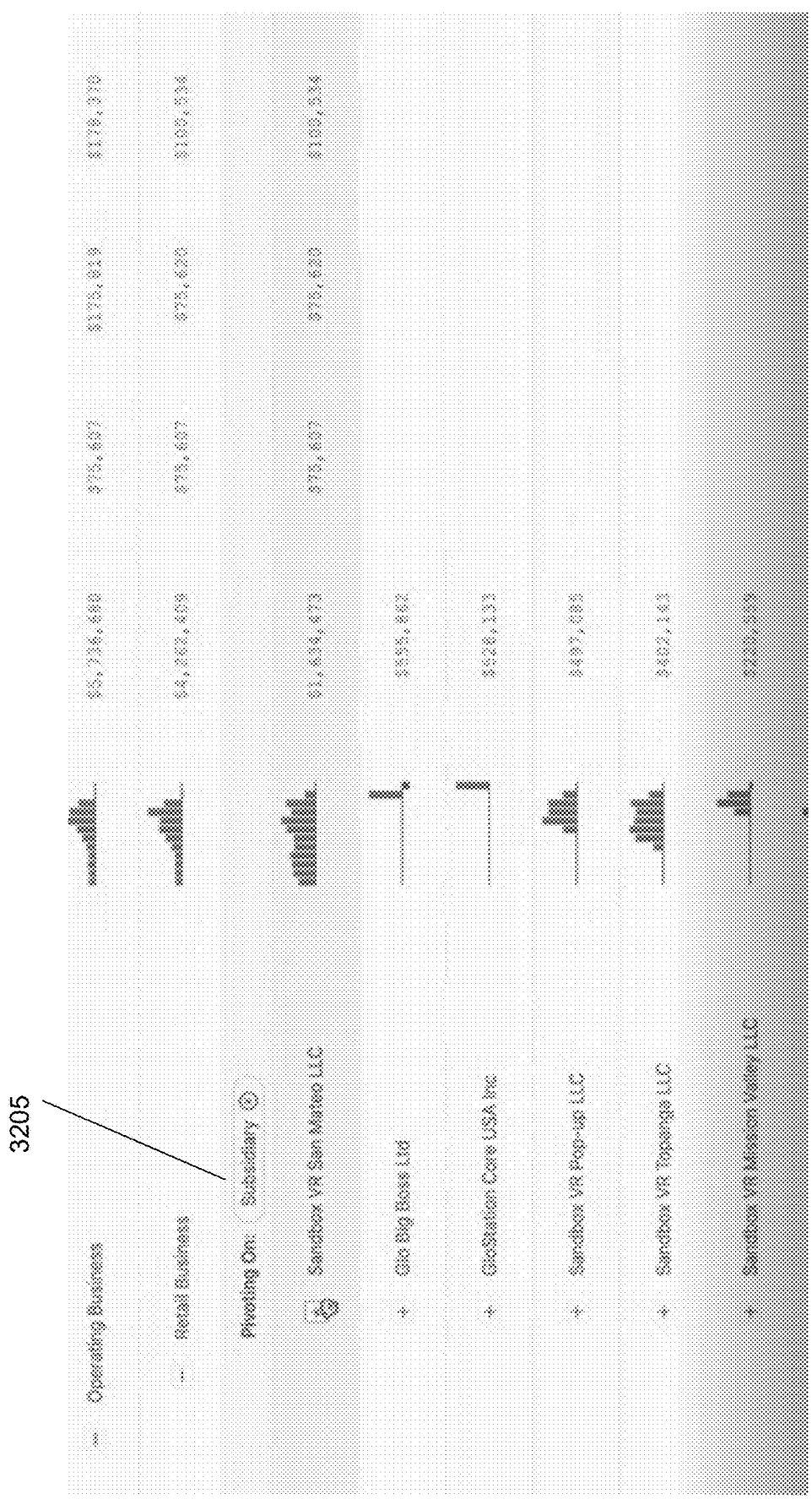
FIG. 32 illustrates the UI of FIG. 29 pivoted by subsidiary in accordance with an implementation.

FIG. 30 illustrates a user interface feature 3005 to pivot a row in the nodes of FIG. 27. In this example, the pivoting may be on department, subsidiary, income/expense, although other options for pivoting may be provided that those listed in FIG. 28. FIG. 29 illustrates pivoting on department 2905. FIG. 30 illustrates pivoting on subsidiary 3005. FIG. 31 illustrates an example of pivoting the cost of sales on department 3105. FIG. 32 illustrates pivoting the cost of sales on subsidiary 3205.

Figure 33:
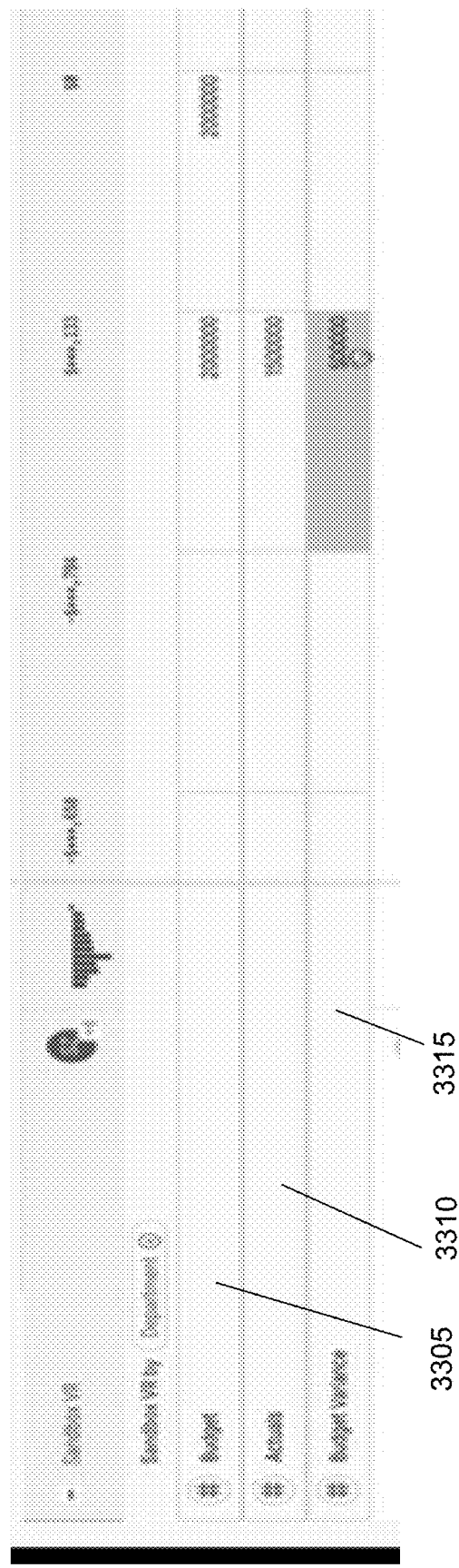
FIG. 33 illustrates an example of a financial data visualization UI displaying examples of annotations in accordance with an implementation.

FIG. 33 illustrates an example of three annotations attached to a row of cell data to calculate a budget 3305, actuals 3310, and a budget variance 3315. One aspect illustrated in FIG. 33 is that a node can have an arbitrary number of different annotations appended to it.

Figure 34:
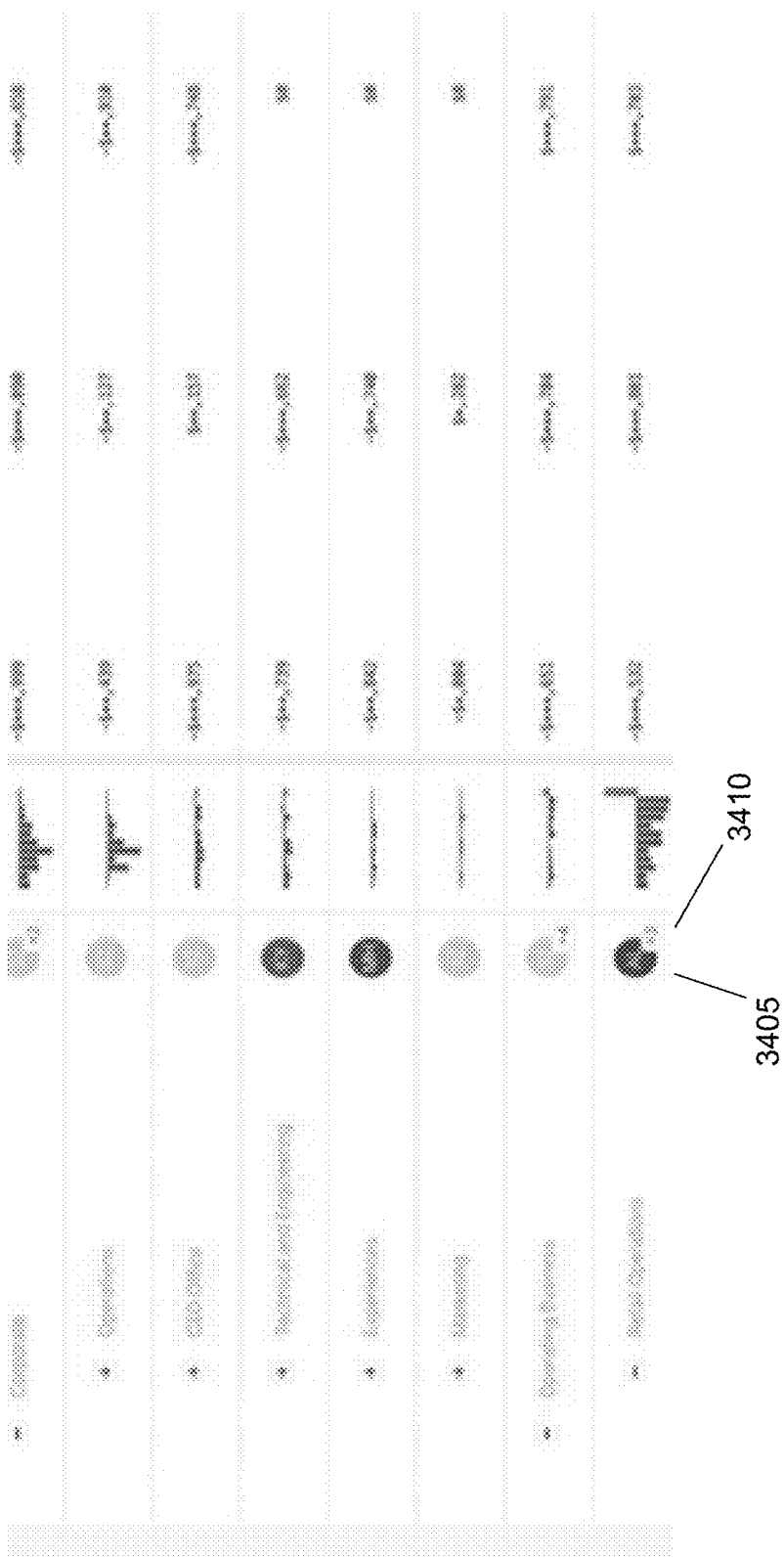
FIG. 34 illustrate an example of a financial data visualization UI displaying a DRI by a node in accordance with an implementation.
Figure 35:
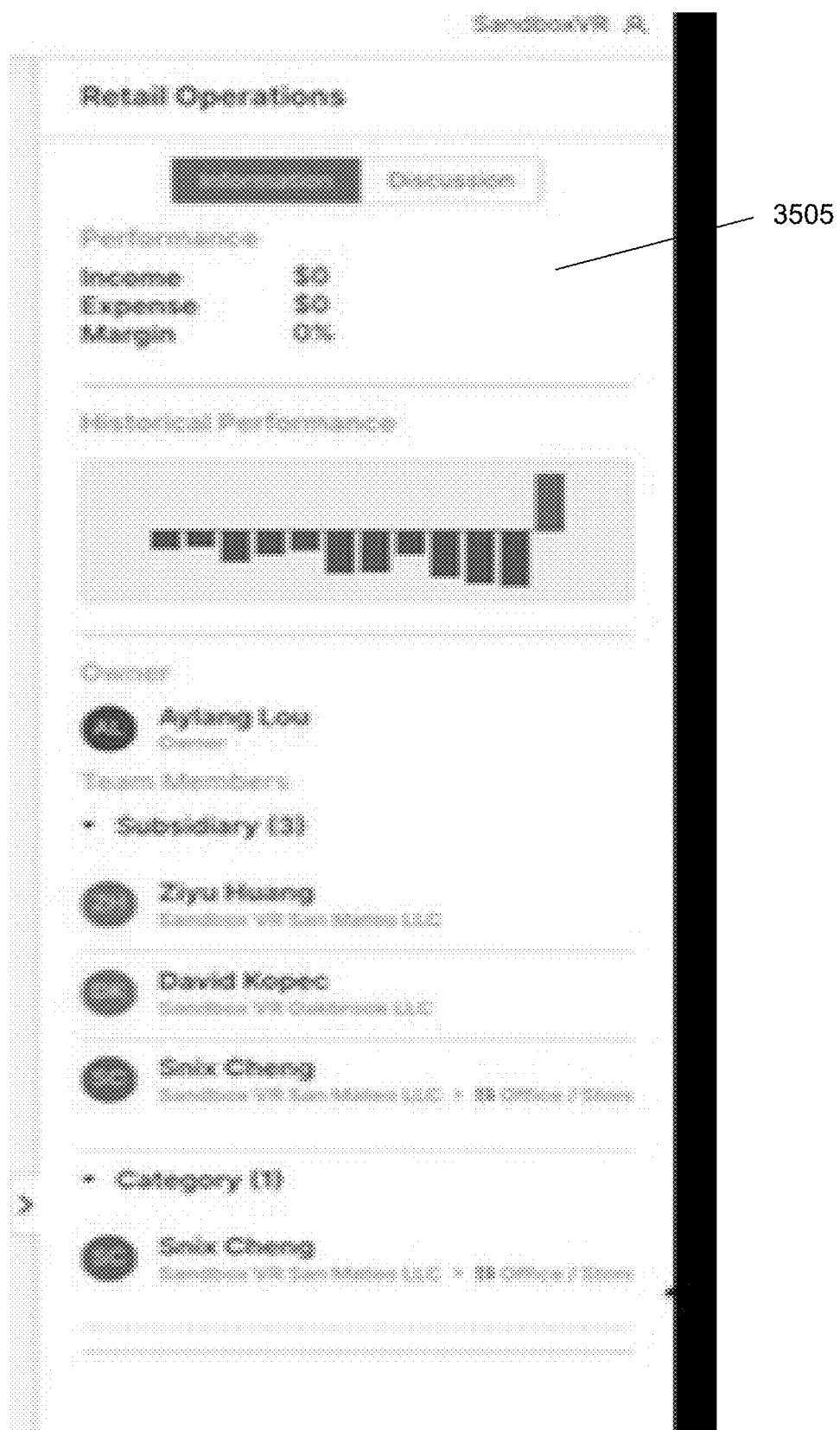
FIG. 35 illustrates an example of a UI for hosting information and discussions for a node in accordance with an implementation.

FIG. 34 illustrates an example of a user interface with a DRI 3405 feature and a message indicator 3410. FIG. 35 shows a view of an information and discussion forum associated with the same node.

Additional Examples

Figure 36:
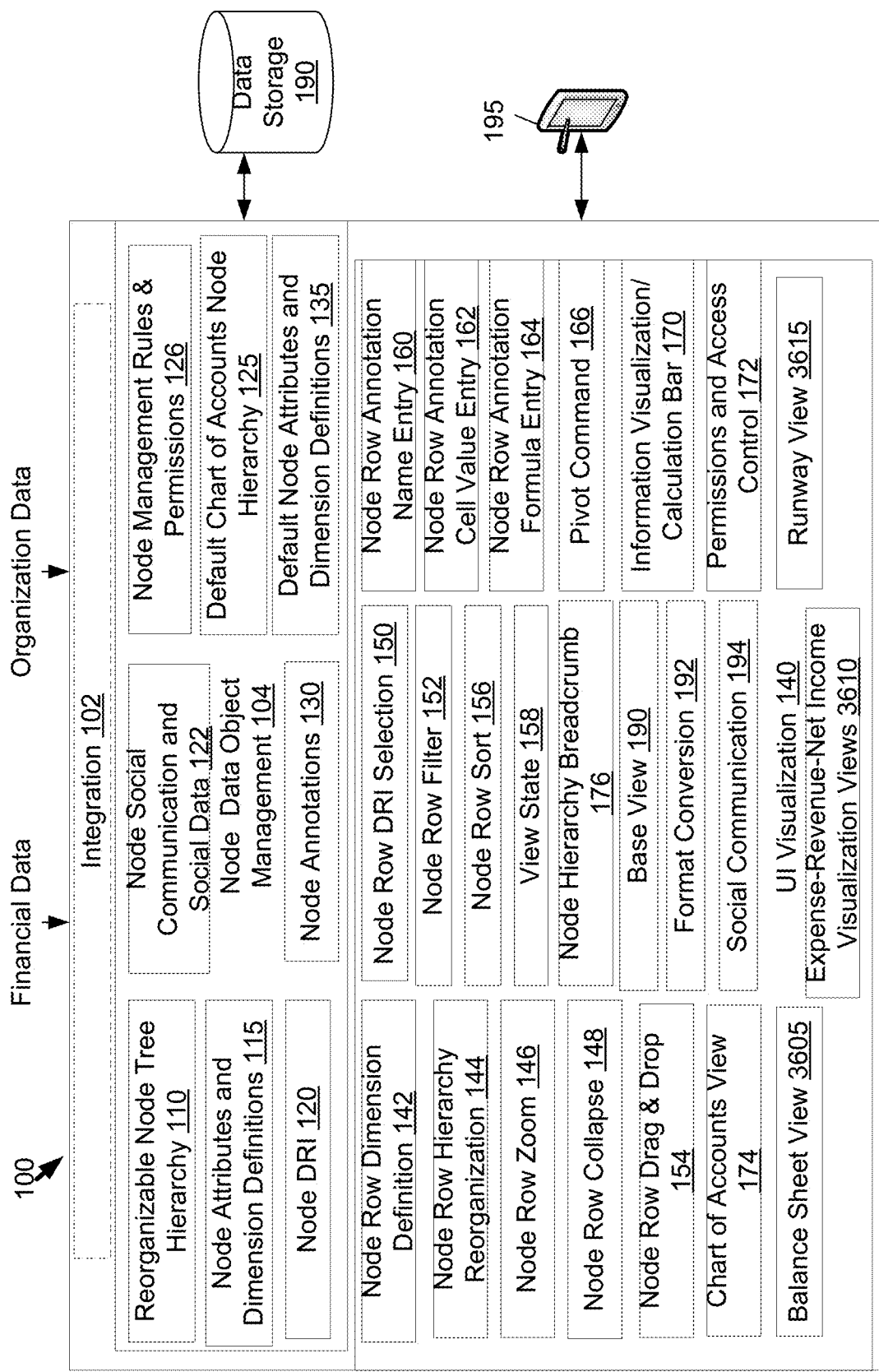
FIG. 36 illustrates an example of a system in accordance with an implementation.

FIG. 36 illustrates a variation of the system of claim 1. In some implementations, the system 100 include a balance sheet view module 3605 to generate interactive visualizations corresponding to a balance sheet view or a cash value view. The balance sheet view may be based on a default node tree hierarchy. However, more generally, it may be based on a customizable node tree hierarchy using, for example, a reorganizable node tree hierarchy as previously discussed. Various customizations may be performed to assign assets to an asset node.

In some implementations, an expense-revenue-net income view module 3610 generates visualizations that support different views of expenses, revenue, and net income. In some implementations, net income is represented visually as a difference between a graph of revenue and a graph of expenses, revenue is represented visually as a difference between a graph of net income and expenses, and expenses is represented as a difference between a graph of net income and a graph of revenue.

In some implementations, the net income, revenue, and expense graphs are generated versus time based on information in a balance sheet. In some implementations, the balance sheet upon which these visualizations are based on a default node hierarchy. However, more generally, these visualizations are based on a customizable node tree hierarchy using, for example, a reorganizable node tree hierarchy as previously discussed.

In some implementations, a runway view module 3615 supports visualizations of a financial runway in terms of an estimated remaining time before financial assets are used up in view of expenses and revenues. In some implementations, these visualization are based on a default node tree hierarchy. However, more generally, these visualizations are based on a customizable node tree hierarchy using, for example, a reorganizable node tree hierarchy as previously discussed.

The balance sheet view module 3605, expense-revenue-net income visualization views module 3610, runway view module 3615 may leverage off of features and functionalities previously discussed and be implemented as computer program instructions executable by a processor. For example, each node may have node attributes and node dimensions. Nodes may have permissions and access privileges. Nodes may be zoomed into or collapsed. Drag and drop operations may be used reorganize a hierarchy of rows of cell data. Each node may include a least one row of cell data. Nodes may be filtered and sorted. View states may be saved and persisted to generate a given view.

FIG. 37A is a high level diagram of a node structure for income expenses, and a balance sheet. Each node in this example corresponds to at least one row of cells of financial transaction data. For example, there may be cell data corresponding to monthly entries, although more generally the cell data could be on some other basis (e.g., daily, weekly, etc.). There is an associated node tree hierarchy, which may be a default node tree hierarchy, such as a chart of accounts hierarchy. More generally the node tree hierarchy may be a reorganizable node tree hierarchy.

The balance sheet view may be based on a default hierarchy or a default view state. However, more generally a user may reorganize the nodes and define dimensions to customize the node organization in the balance sheet view.

In some embodiments, the balance sheet view includes cash balances and assets. It may also include liabilities. The cash balances may, for example, include liquid checking accounts. In this example, there may be more than one checking account and each checking account may be assigned a name/dimension.

The assets may, for example, include any conventional asset that has a cash value (e.g., growth assets such as money market certificate of deposits). For example, the assets may include current assets and non-current assets, where the current assets include (beyond cash and cash equivalents), marketable securities, prepaid expenses, accounts receivable, inventory, etc.

The balance sheet view may also include nodes for cash flow sources that are assigned to a balance sheet view. In this example, cash flow from product and engineering nodes is illustrated, although more generally other sources of cash flow may be assigned to the balance sheet view. For example, the cash flow nodes may correspond to accounting categories that correspond to a balance sheet items. This may include, for example, assets determined on an accrual basis or a depreciation basis.

In some implementations, the assets also include long-term assets, such as tangible fixed assets (e.g., buildings, equipment, furniture, land, and vehicles) and intangible fixed assets. The liabilities may include a variety of conventional accounting liability types.

FIG. 37B illustrates a variation of FIG. 37A in which the nodes include a profit node that represents a net income. That, is the organization and dimension(s) of the node are selected to support a convenient exploration and visualization of the relationships between revenue, expenses, and net income.

As illustrated in FIG. 37C, a default node hierarchy may be used, such as a chart of accounts node hierarchy. However, as illustrated in FIG. 37D, user customizable node row hierarchy may be used. Thus, for example, in a user customizable node row hierarchy, a user has great freedom to define the rows of data and their hierarchy for income and expenses. Similarly, a user has great freedom to define the rows of data and their hierarchy for the balance sheet view.

As illustrated in FIG. 37E, a visualization window may also be included to display visualizations of expense, revenue, and net-income/net loss. These three financial metrics are related to each other (e.g., revenue-expense=net profit/net loss). In some implementations, three different visualizations are supported. In a first mode, graph lines for expenses and revenue are plotted versus time to illustrate net profit/net loss as the difference between these two lines. In a second mode, graph lines for net income and expenses are plotted to illustrate revenue as the difference between these two lines. In a third mode, graph lines for revenue and net income are plotted to illustrate expenses as the difference between these two lines. In some implementations, a user can toggle between these three different visualization modes.

While solid graph lines could be plotted to illustrate revenue, expenses, or net income as a difference between solid graph lines, other presentation mode are possible. For example, the upper and lower graph lines may be dashed instead of solid. The graph lines may be color-coded or have shading or textures. The inner and outer graph lines may also be defined invisible boundaries for bar graphs as another example. For example, a bar graph of expenses may be generated that is bounded between inner and outer limits corresponding to revenue and net income.

In some embodiments, a user may reorganize the hierarchy of nodes to select the node data used in the visualizations of revenue, expenses, and income.

While the visualization of revenue, expenses, and net income may be based directly on cells of financial transaction data, more generally the visualization could also be based on cells from annotations performing one or more financial calculations or implementing a percentage conversion as examples. For example, an annotation for a currency conversion may be used for currency conversions. As another example, an annotation may be used to ask a "What if?" question regarding a factor related to revenue, net income, or expense, such as exploring how difference in long-term vs. short term currency conversion rates impact expenses, revenue, and net income as one example, In some implementations, a runway calculation can be launched from the user interface to generate information regarding how one or more cells in an individual node contributes to a financial runway. This provides a tool for users to understand how different sources of revenue and expenses contribute to a financial runway. In one embodiment, a monthly cash burn is defined. For example, this may be an average monthly cash burn over a number of months (e.g., 3 months). A total number of months of runway is based on the cash value of liquid assets (e.g., money in the bank in checking accounts, savings accounts, etc.). An impact on an individual selected cell (or group of cells) on the runway may be calculated as a differential runway time. This permits, for example, a user to understand the impact of one or more cells on the financial runway.

Financial runway is very important for many companies, particularly startups. The ability to quickly understand how individual cells of revenue or expenses (or changes to revenues or expenses) impacts runway is valuable in making informed decisions to manage a company. The ability to quickly and easily understand factors related to runway and potential changes to runway is invaluable in managing a company.

The runway view module 3615 may build off of other features previously described, such as the ability to collapse rows, zoom, define dimensions, reorganize nodes, define permissions and access privileges, etc. For example, in some implementation a user may reorganize the node hierarchy and select a view to permit node cell data for particular dimensions to be examined for their runway implications.

The financial runway calculation may also be performed in combination with other operations. The financial runway calculations may be based directly on cell data for financial transactions but more generally may also be based on calculations from annotations. For example, an annotation may include a currency conversion estimates, budget analysis, or other mathematical operations to generate a financial estimate. For example, the impact on runway of an actual or potential change in a currency conversion (e.g., a rise in the value of the Euro relative to the dollar for European revenues or European expenses) may be used to generate cell data from which questions on runway can be explored, such as the impact of a current or potential currency conversion rate change to runway.

Figure 38A:
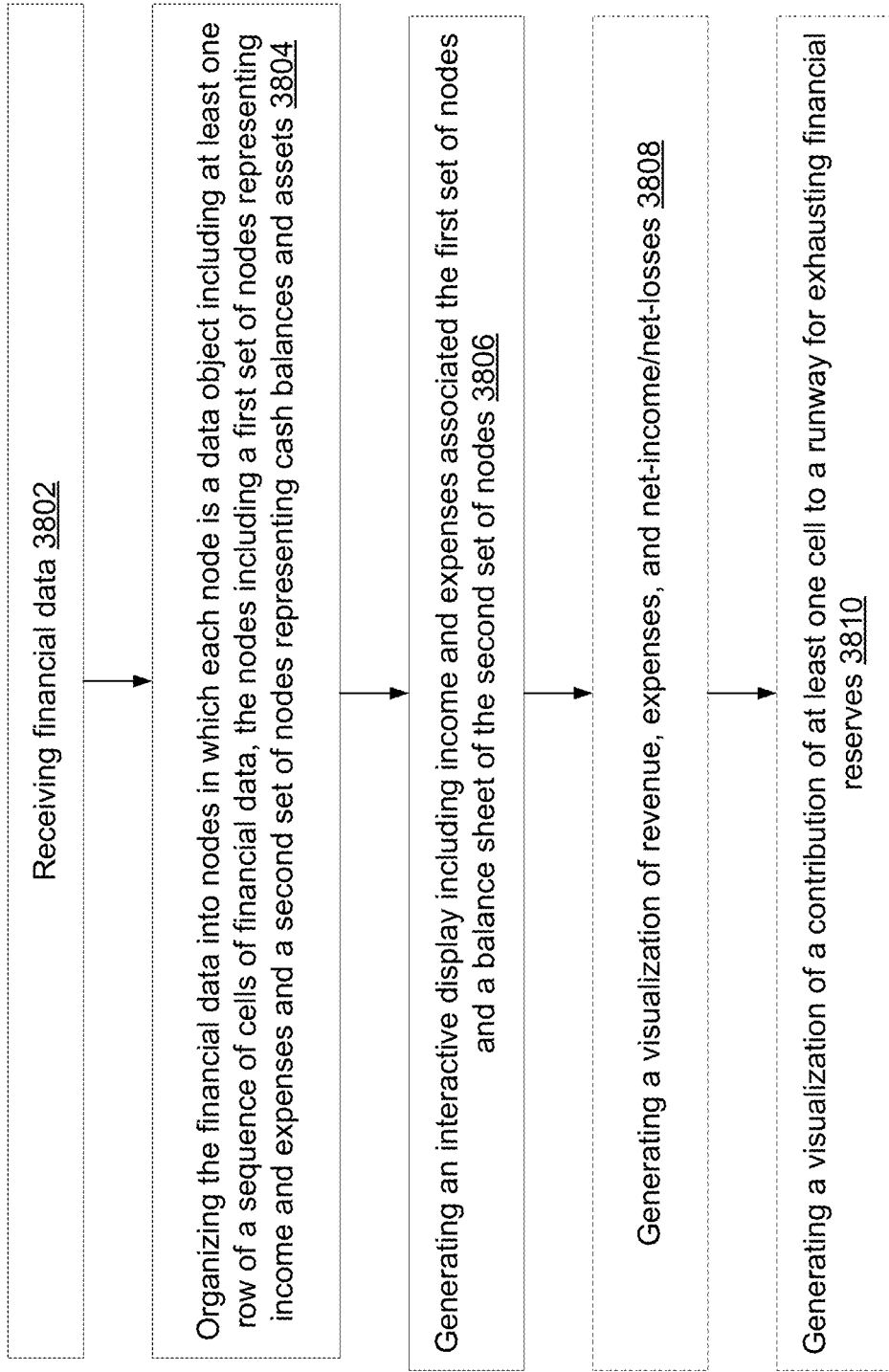
FIG. 38A is a flow chart of a method of generating a balance sheet view in accordance with an implementation.

FIG. 38A is a flowchart of a general method of generating and using a balance sheet visualization in accordance with an implementation. In block 3802, financial data is received. In block 3804, financial data is organized into nodes, in which node is a data object including at least one row of a sequence of cells of financial data. For example, an individual row may have a sequence of cells of financial data on a monthly, weekly, or other time basis. The nodes include a first set of nodes representing income and expenses and a second set of nodes representing cash balances and assets. In block 3806, an interactive display visualization is generated that includes income and expenses associated with the first set of nodes and a balance sheet associated with the second set of nodes.

Additional optional operations may be performed based on the interactive display visualization. In block 3808, an optional visualization is generated of revenue, expenses, and net-income/net losses. For example, a command shortcut or mousing over a portion of the user interface may open up a window to generated a graphical representation of revenue, expenses, and net-income/net losses. In block 3810, an optional visualization is generated to provide information regarding how at least one cell of a node impacts a financial runway for exhausting financial reserves. For example, in some implementations a user may select a cell of a row and a visualization is generated of a contribution of the cell to a financial runway.

Figure 38B:
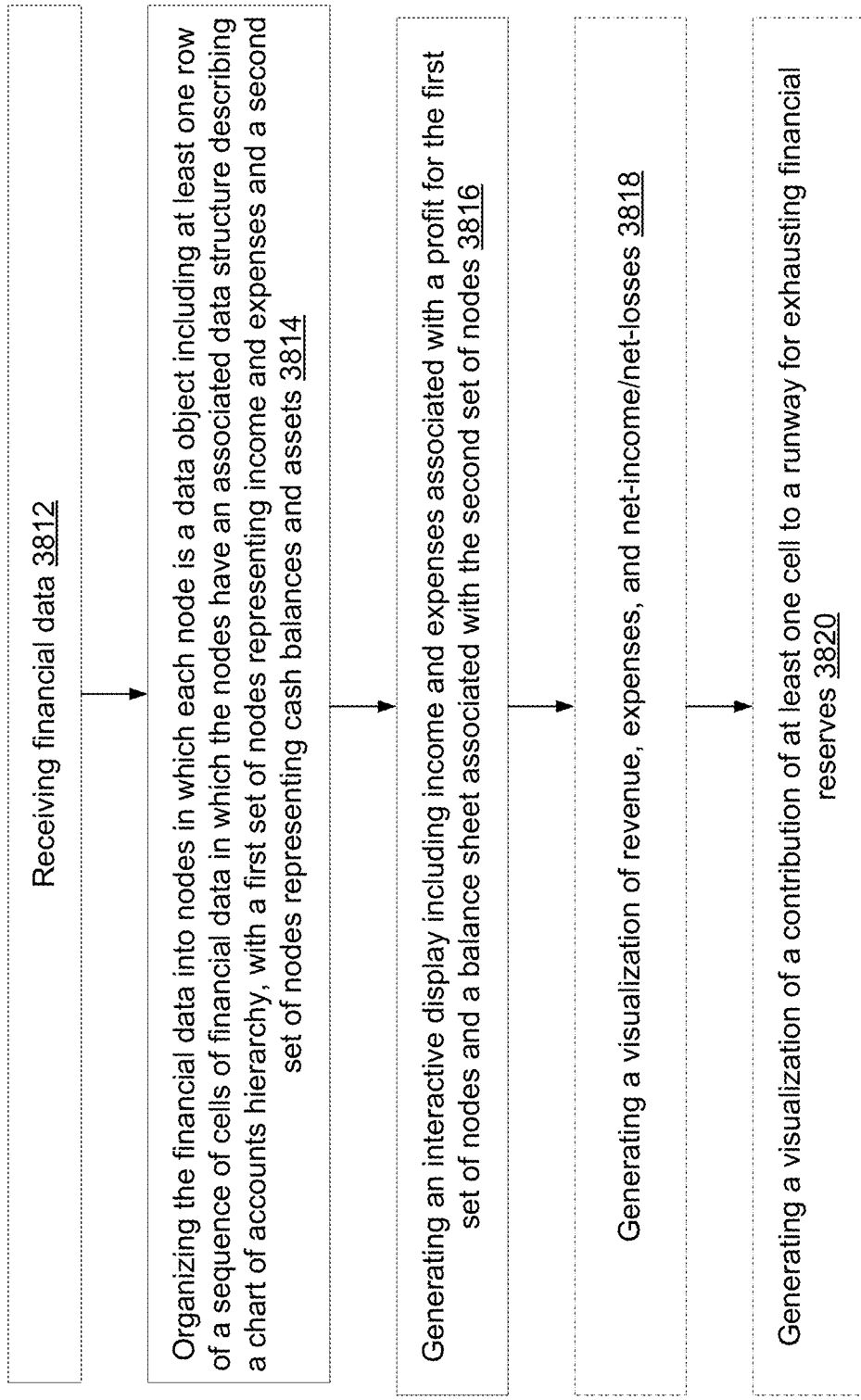
FIG. 38B is a flow chart of a method of generating a balance sheet view in accordance with an implementation.

FIG. 38B is flowchart of a method of generating and using a balance sheet view using nodes defined by a default node tree hierarchy, which may for example be a chart of accounts hierarchy. In block 3812, financial data is received. In block 3814, financial data is organized into node in which each node is a data object including at least one row of a sequence of cells of financial data. The nodes have an associated data structure describing a default hierarchy, such as a chart of accounts hierarchy. A first set of nodes represents income and expenses. A second set of nodes represents cash balances and assets, although in some case it may also include nodes representing liabilities. In block 3816, an interactive visualization display is generated that includes income and expenses associated with a first set of nodes and a balance sheet view associated with a second set of nodes. Other optional operations may also be performed. In block 3818, an optional operation may be performed to generate a visualization of revenue, expenses, and net-income/net-losses. In block 3820, an optional operating may be performed to generate a visualization of a contribution of at least one cell to a runway for exhausting financial reserves.

Figure 38C:
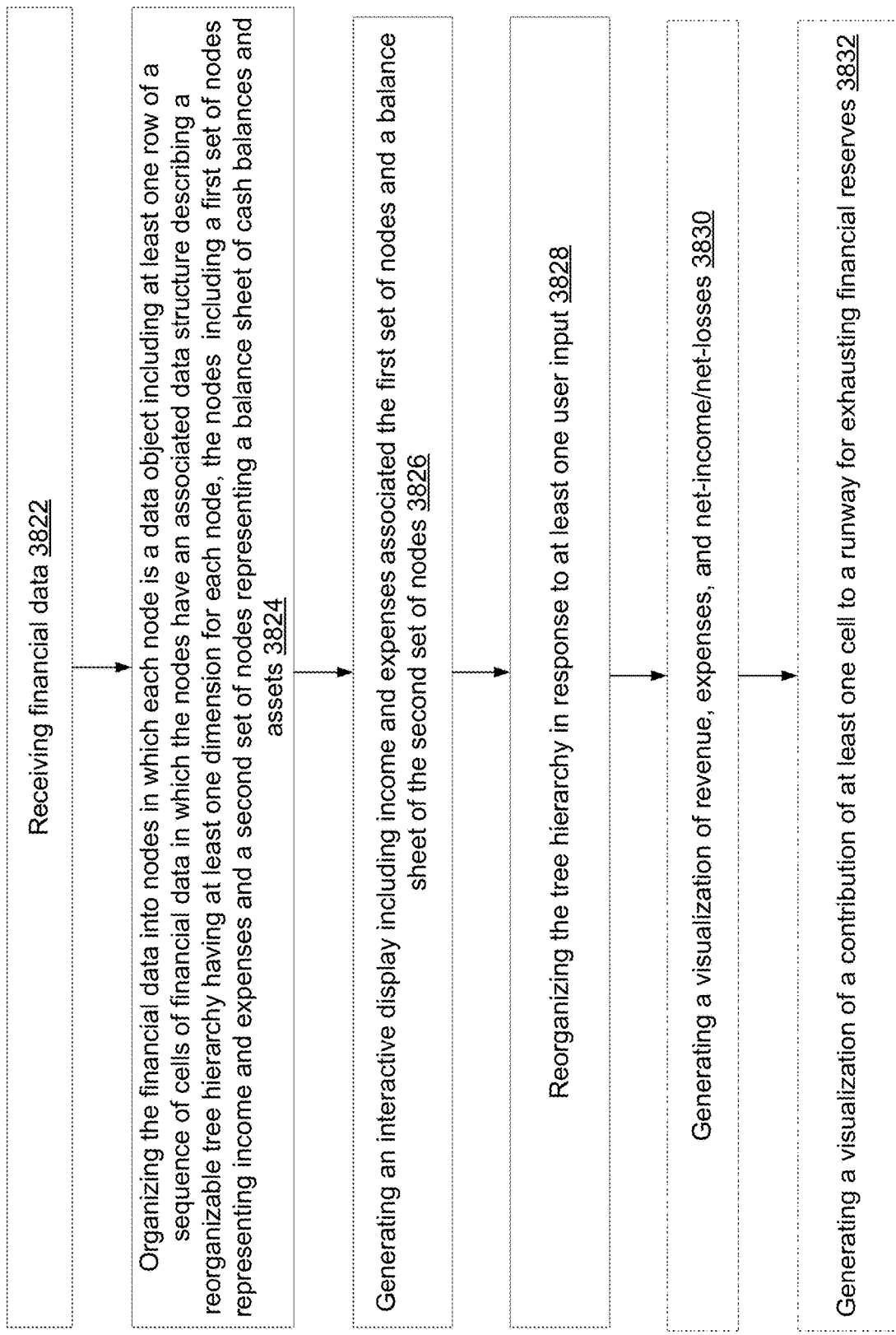
FIG. 38C is a flow chart of a method of generating a balance sheet view in accordance with an implementation.

FIG. 38C is a flow chart of a method of generating and using a balance sheet view in the context of a reorganizable node tree hierarchy in accordance with an implementation. In block 3822, financial data is received. In block 3824, financial data is organized into nodes in which each node is a data object including at least one row of a sequence of cells of financial data. The nodes have an associated data structure describing a reorganizable tree hierarchy having at least one dimension for each node. The nodes include a first set of nodes representing income and expenses and a second set of nodes representing a balance sheet of cash balances and assets. In block 3826, an interactive visualization display is generated that includes income and expense associated with the first set of nodes and a balance sheet view associated with the second set of nodes. In block 3828, the node tree hierarchy is reorganized in response to at least one user input. For example, the node tree hierarchy could be reorganized by subsidiary or by department. As another example, individual rows of financial data for income, expenses, or assets could be reorganized in the hierarchy. In some implementations, a user may also assign rows as assets (e.g., certain accruals, account receivables, etc.). In block 3830, an optional visualization of revenue, expenses, and net-income/net-losses. In block 3832 an optional visualization is generated of a contribution of at least one cell to a runway for exhausting financial resources.

Figure 39A:
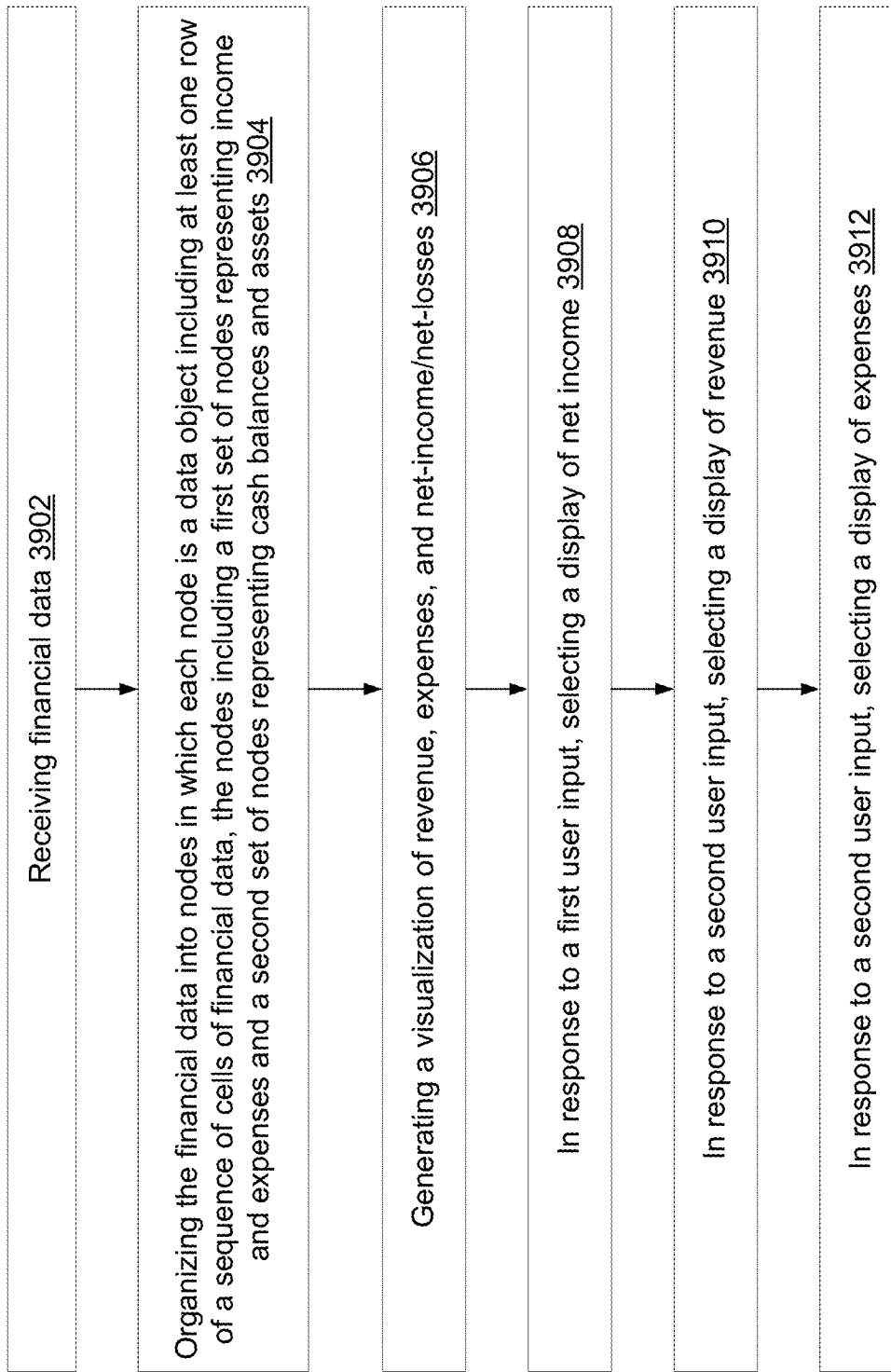
FIG. 39A is a flow chart of a method of generating a visualization of revenue, expenses, and net-income/net losses in accordance with an implementation.

In FIG. 39A, a flow chart is illustrated for a method of a method displaying visualizations of revenue, expenses, and net-income/net-losses in accordance with an implementation. In this example, a user may select any one of three different visualization of revenue, income, or net-income/net-losses. In block 3902, financial data is received. In block 3904, the financial data is organized into nodes in which each node is a data object including at least one row of cells of financial data. The nodes include a first set of nodes representing income and expenses and a second set of nodes representing cash balances and assets. In block 3906, a visualization is generated of revenue, expenses, and net-income/net-losses. In one implementation, a user may toggle between different representations. In block 3908, in response to a first user input, a display of net income is displayed. In block 3910, in response to a second user input, a display of revenue is selected. In block 3912, a display of expenses is selected.

Figure 39B:
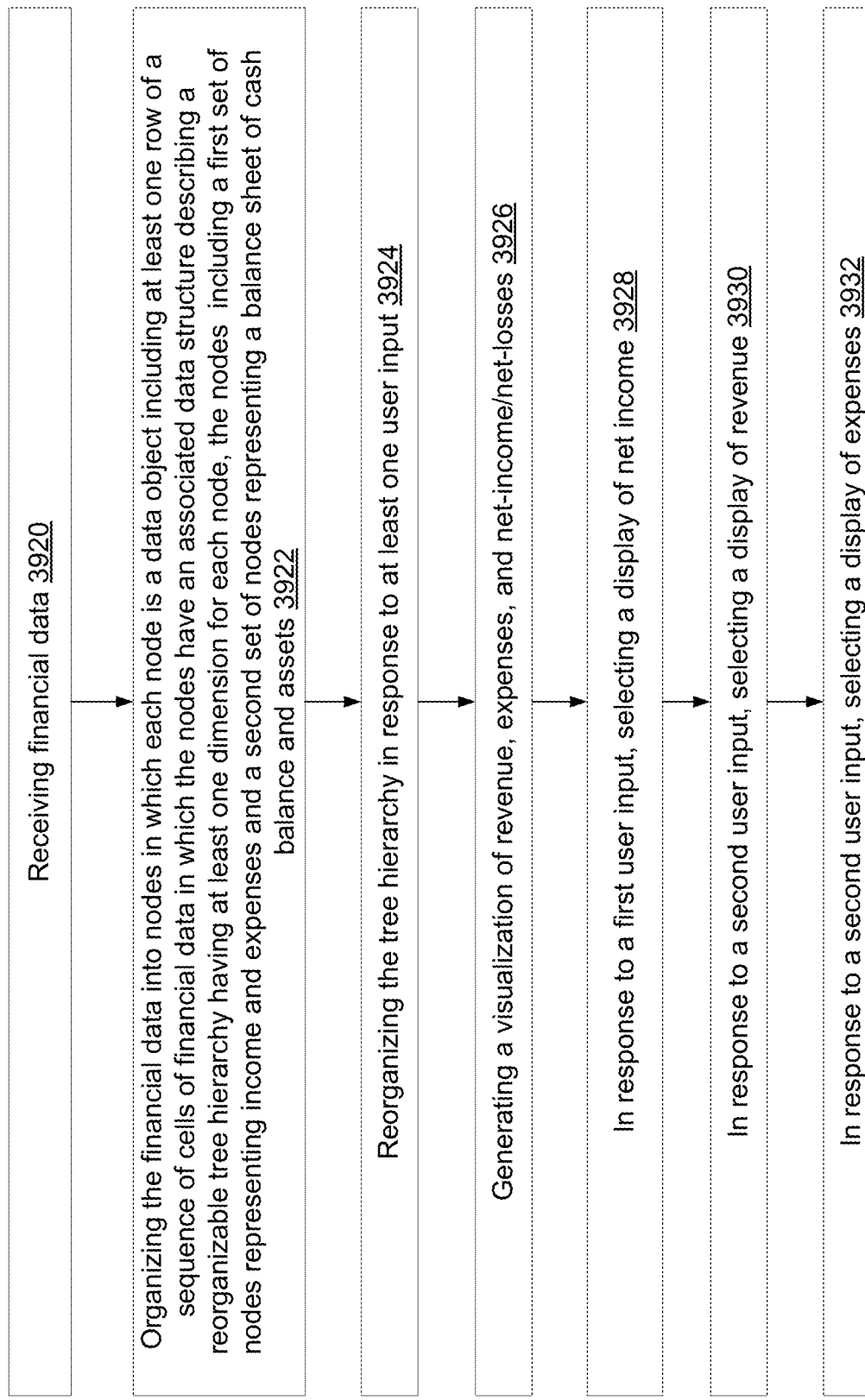
FIG. 39B is a flow chart of a method of generating a visualization of revenue, expenses, and net-income/net losses in accordance with an implementation.

FIG. 39B shows a variation of a method of display visualization of revenue, expenses, and net-income/net-losses with a reorganizable node tree hierarchy in accordance with an implementation. In block 3920, financial data is received. In block 3922, financial data is organized into nodes in which node is a data object having an associated data structure describing a reorganizable tree hierarchy having at least one dimension for each node. The nodes include a first set of nodes representing income and expenses and a second set of nodes representing a balance sheet of cash balances and assets. In block 3924, the tree hierarchy is reorganized in response to at least one user input. For example, nodes may be reorganized into a different order. In block 3926, a visualization is generated of revenue, expenses, and net-income/net-losses. In one implementation, a user may toggle between different representations. In block 3928, in response to a first user input, a display of net income is displayed. In block 3930, in response to a second user input, a display of revenue is selected. In block 3932, a display of expenses is selected.

Figure 40A:
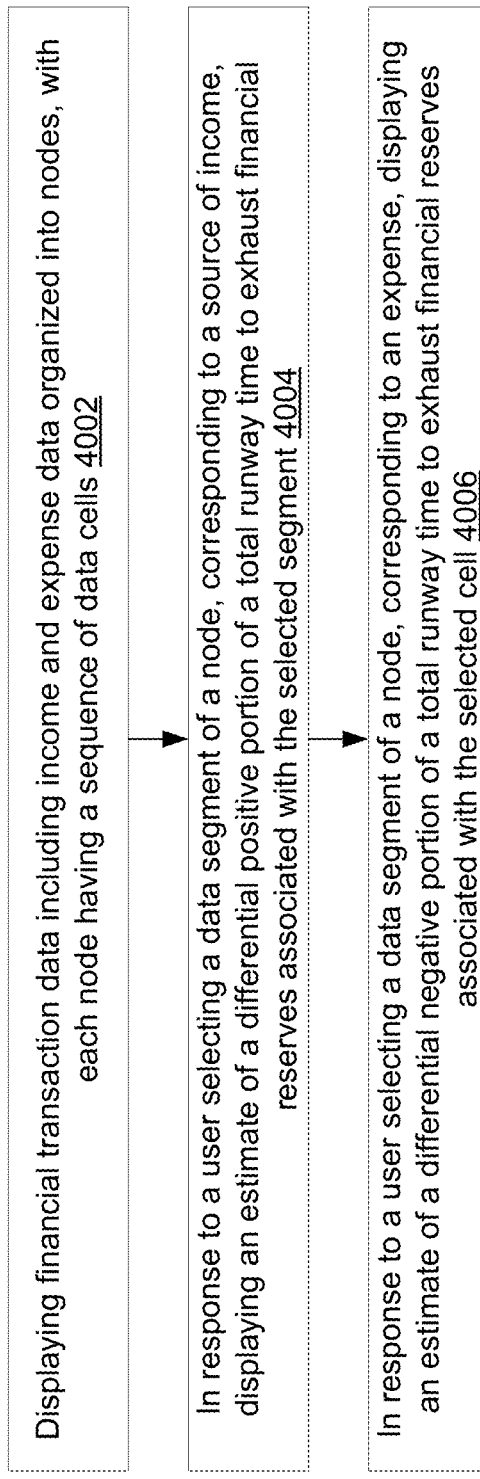
FIG. 40A is a flow chart of a method o generating a visualization of a financial runway in accordance with an implementation.

FIG. 40A is a flowchart of a method displaying runway information in accordance with an implementation. In block 4002, financial transaction data is displayed that includes income and expense data organized into node. Each node includes a sequence of data cells. In some implementations, a user selects an individual cell, or more generally a user could select two or more cells. In block 4004, an estimate of a differential positive portion of total runway time to exhaust revenues associated with a selected data cell (or a selected group of cells in some implementations) of a source of income is displayed. In block 4006, an estimate of a differential negative portion of total runway time to exhaust revenues associated with a selected data cell (or selected group of cells) of a source of expenses is displayed.

Figure 40B:
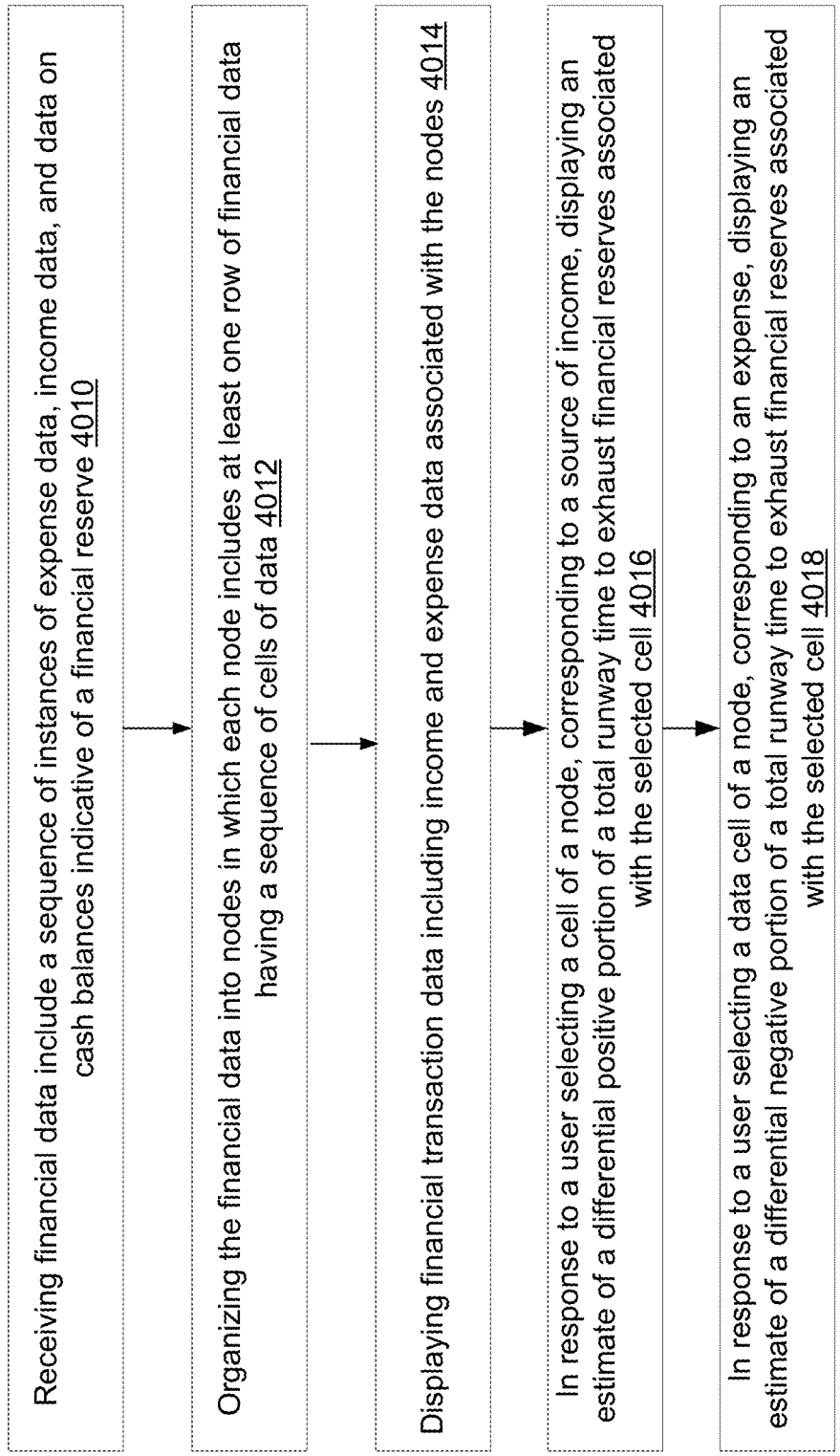
FIG. 40B is a flow chart of a method o generating a visualization of a financial runway in accordance with an implementation.

FIG. 40B is a flowchart of a method of displaying runway information in accordance with an implementation. In block 4010, financial data is received that includes a sequence of instances of expense data, income data, and data on cash balances indicative of a financial reserve. In block 4012, the financial data is organized into nodes in which each node includes at least one row of financial data having a sequence of cells of data. In block 4014, financial transaction data is displayed that includes income and expense data associated with the nodes. In block 4016, an estimate of a differential positive portion of a total runway time to exhaust financial reserves associated with at least one cell of a node corresponding to a source of income. In block 4018, an estimate of a differential negative portion of a total runway time to exhaust financial reserves associated with at least one selected cell of a node corresponding to expenses.

Figure 40C:
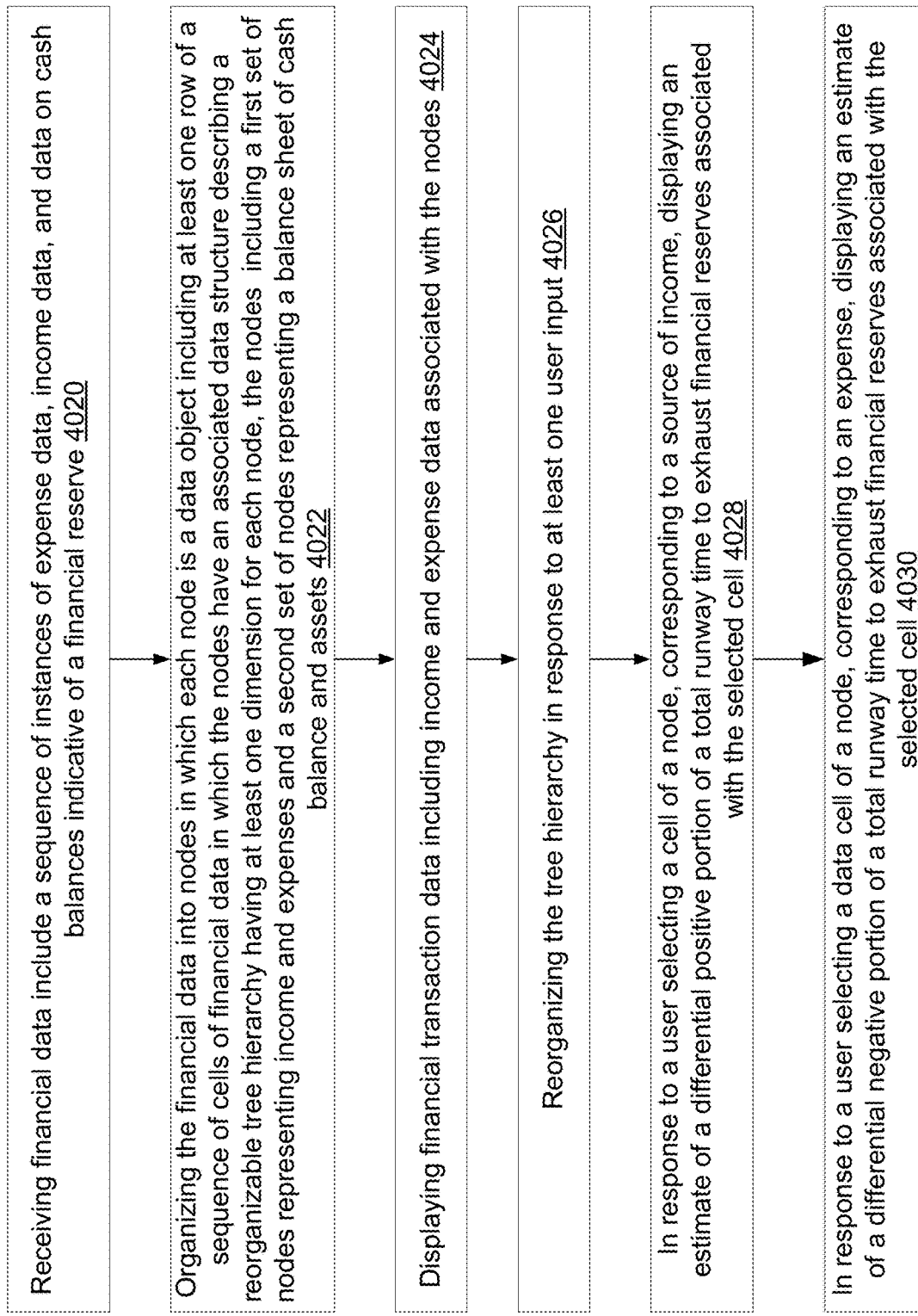
FIG. 40C is a flow chart of a method o generating a visualization of a financial runway in accordance with an implementation.

FIG. 40C is a flow chart of a method of displaying runway information with a reorganizable node tree hierarchy in accordance with an implementation. In block 4020, financial data is received that included a sequence of instances of expense data, income data, and data on cash balances indicative of a financial reserve. In block 4022, financial data is organized into nodes in which each node is a data object including at least one row of a sequence of cells of financial stat in which the nodes have an associated data structure describing a reorganizable node tree hierarchy having at least one dimension for each node. The nodes have a first set of nodes representing income and expenses and a second set of nodes representing a balance shee view of cash balances and assets. In block 4024, financial transaction data is displayed including income and expense data associated with the nodes. In block 40246, the node tree hierarchy is reorganized in response to at least one user input. For example, a user may reorganize one or more nodes of income or expense data. In block 4028, an estimate of a differential positive portion of a total runway time to exhaust financial reserves associated with a selected segment, where a segment includes one or more cells of data of a node corresponding to a source of income. In block 4030, an estimate of a differential negative portion of a total runway time to exhaust financial reserves associated with a selected segment, where a segment includes one or more cells of data of a node corresponding to an expense.

Figure 40D:
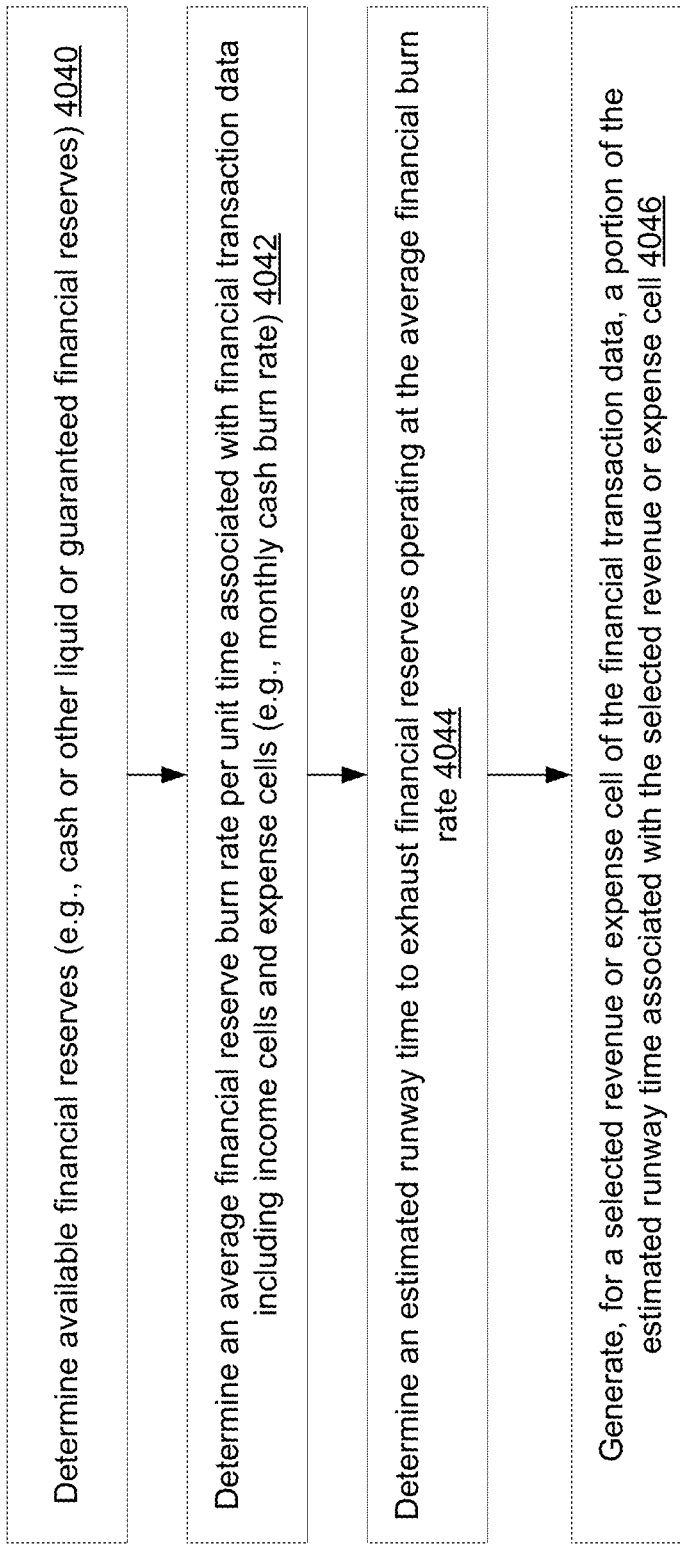
FIG. 40D is a flow chart of a method o generating a visualization of a financial runway in accordance with an implementation.

The differential runway time for an individual cell or group of cells may be calculated in various ways. FIG. 40D illustrates a high level method in accordance with an implementation. In block 4040, a determination is made of available financial reserves, which may include cash balances or other liquid or guaranteed financial reserves. In block 4042, a determination is made of an average financial reserve burn rate per unit time including income segments and expense segments. For example, an average monthly cash burn rate can be determined over a selected number of months, such an average burn rate over 3 months. In block 4044, a determination is made of an estimated runway time to exhaust financial reserves at the average financial burn rate. In block 4046, a portion of the estimated runway time associated with a selected revenue or expense statement is generated. For example, a user may select an income cell for a selected month or an expense cell for a given month. The differential runway time associated with an individual segment may be displayed.

Figure 41A:
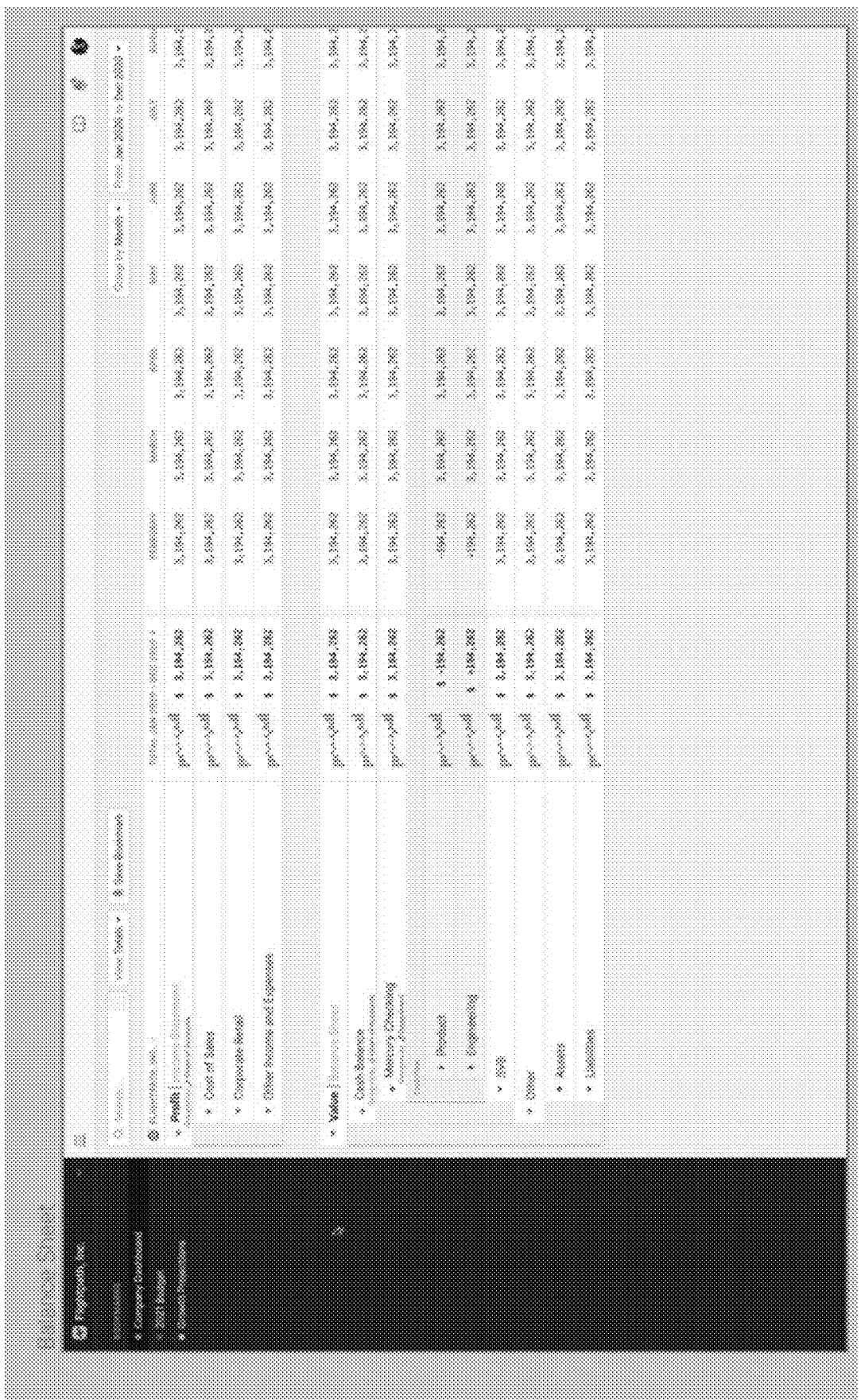
FIG. 41A is a screen shot of an example user interface for displaying a balance sheet view in accordance with an implementation.

FIG. 41A illustrates an example of a user interface having a balance sheet view that includes node for checking, cash flow, product cash flow, and engineering, assets, and liabilities. A profit node may include nodes such as cost of sales, corporate rental, other sources of income and expenses. In this example, each row had data cells with monthly transaction data and a total cell.

Figure 41B:
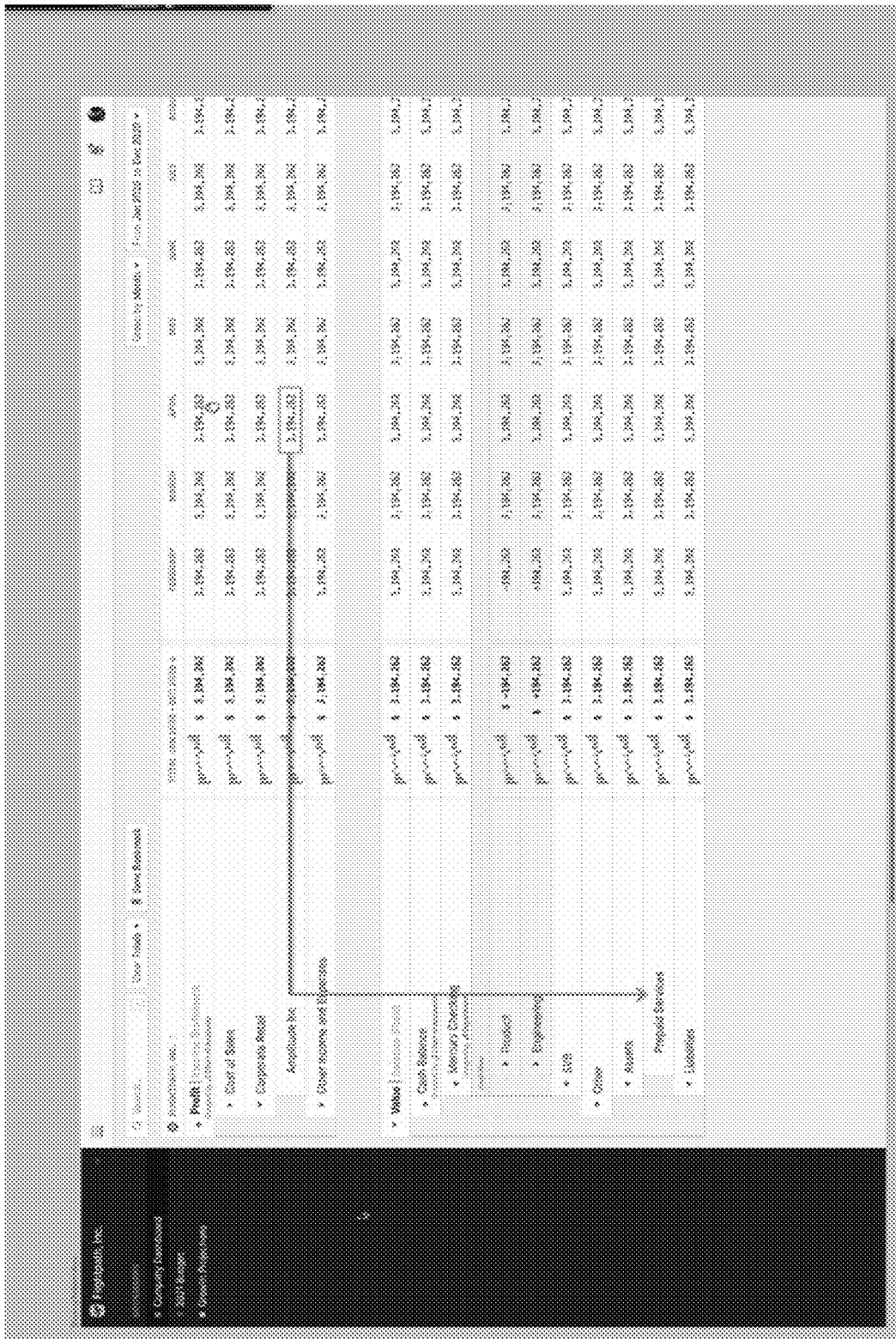
FIG. 41B illustrates an example of asset allocation in a balance sheet view in accordance with an implementation.

FIG. 41B illustrates the example of FIG. 41A zoomed in to illustrate additional sub-nodes. The arrow indicates how prepared services associated with corporate rental may be assigned as an asset.

Figure 41C:
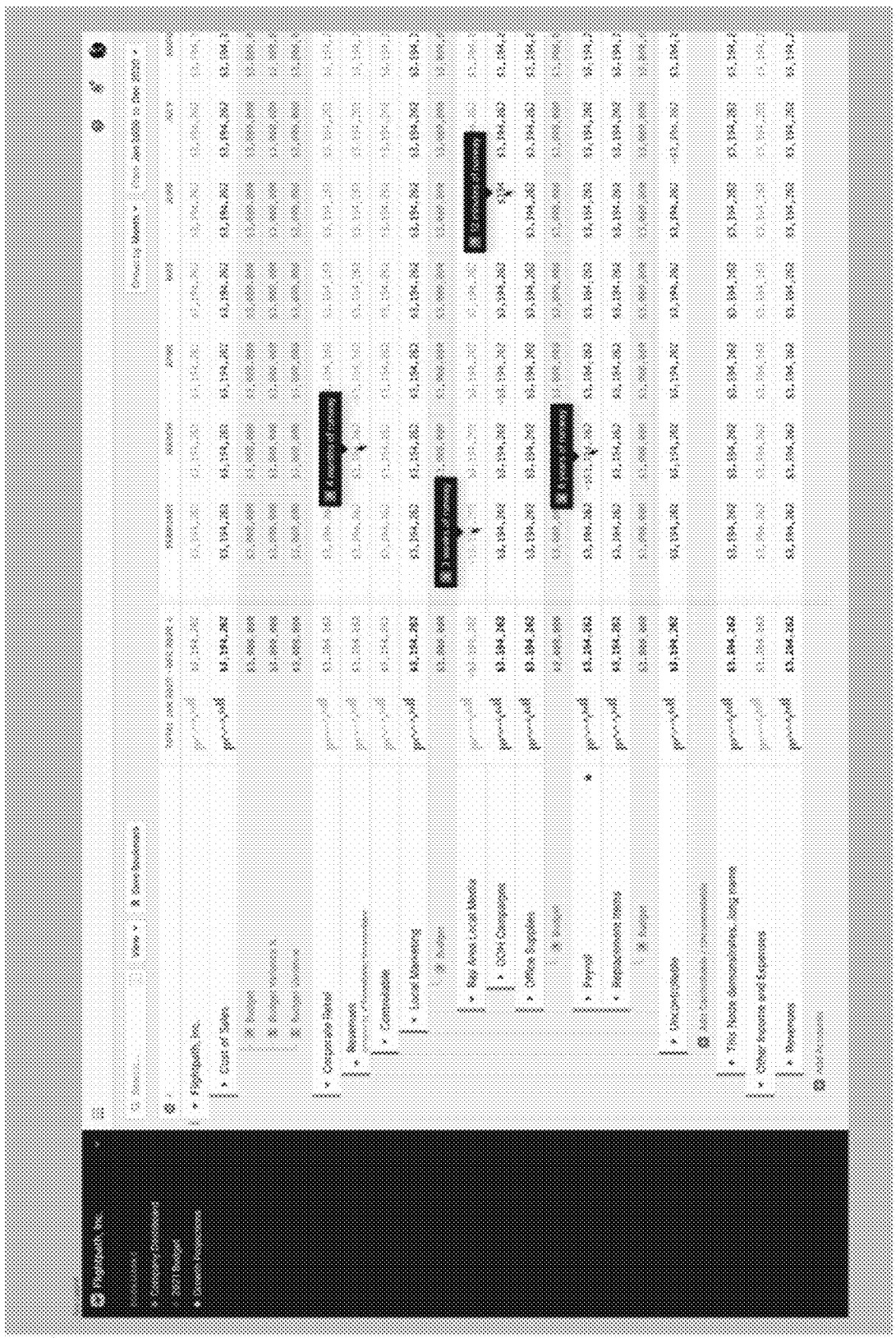
FIG. 41C illustrates an example of a user interface illustrate portions of a runway associated with individual cells in accordance with an implementation.

FIG. 41C, a user interface is illustrated in which mousing over a cell entry opens up a pop-up showing a differential contribution of a cell entry to a financial runway. For example, mousing over a revenue opens up a pop-up showing how much a revenue entry increases a financial runway. Mousing over a payroll entry (an expense0 opens up a pop-up showing how much the entry decreases the financial runway.

Figure 41D:
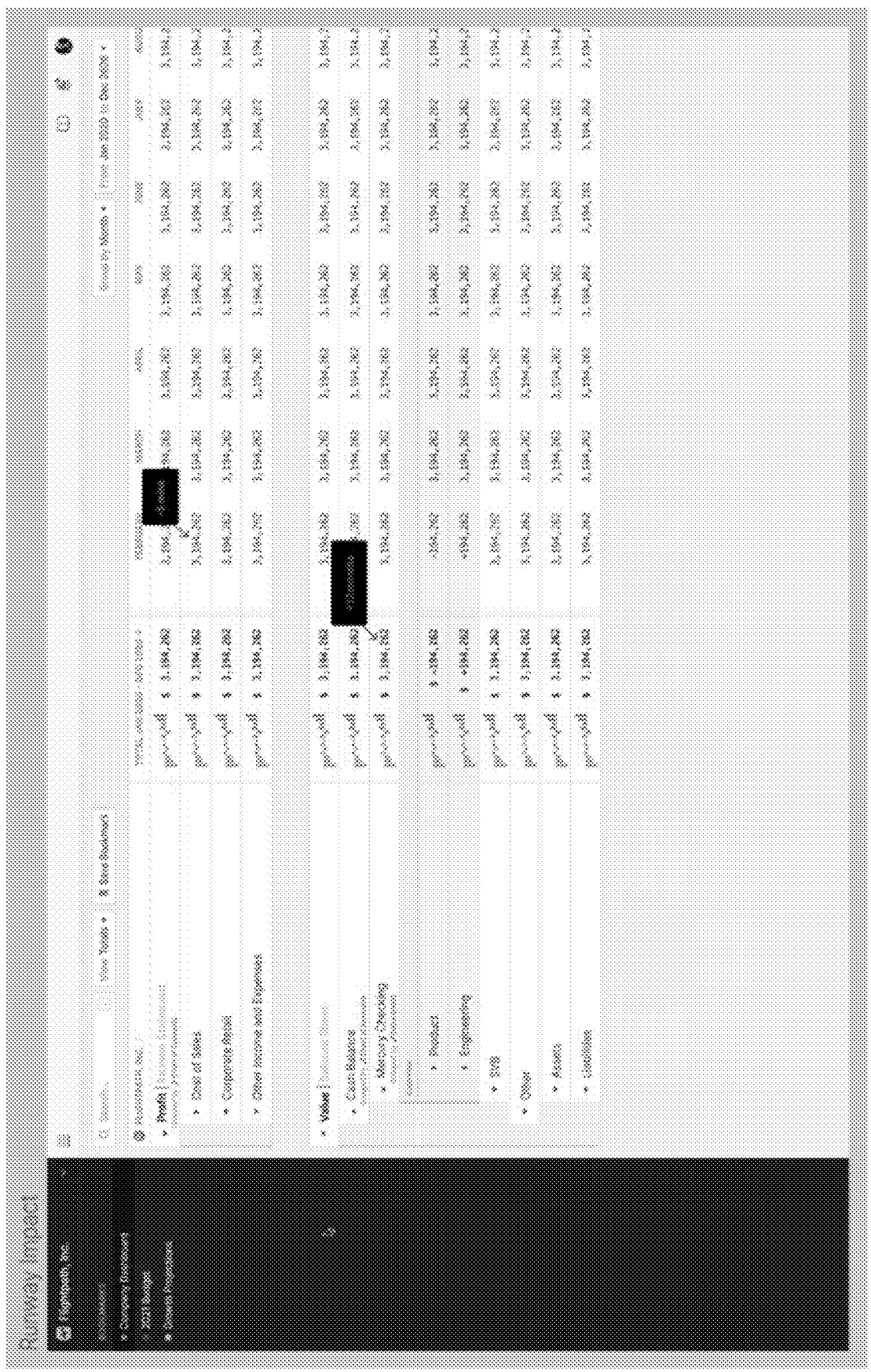
FIG. 41D illustrates an example of a user interface illustrate portions of a runway associated with individual cells in accordance with an implementation.
Figure 42A:
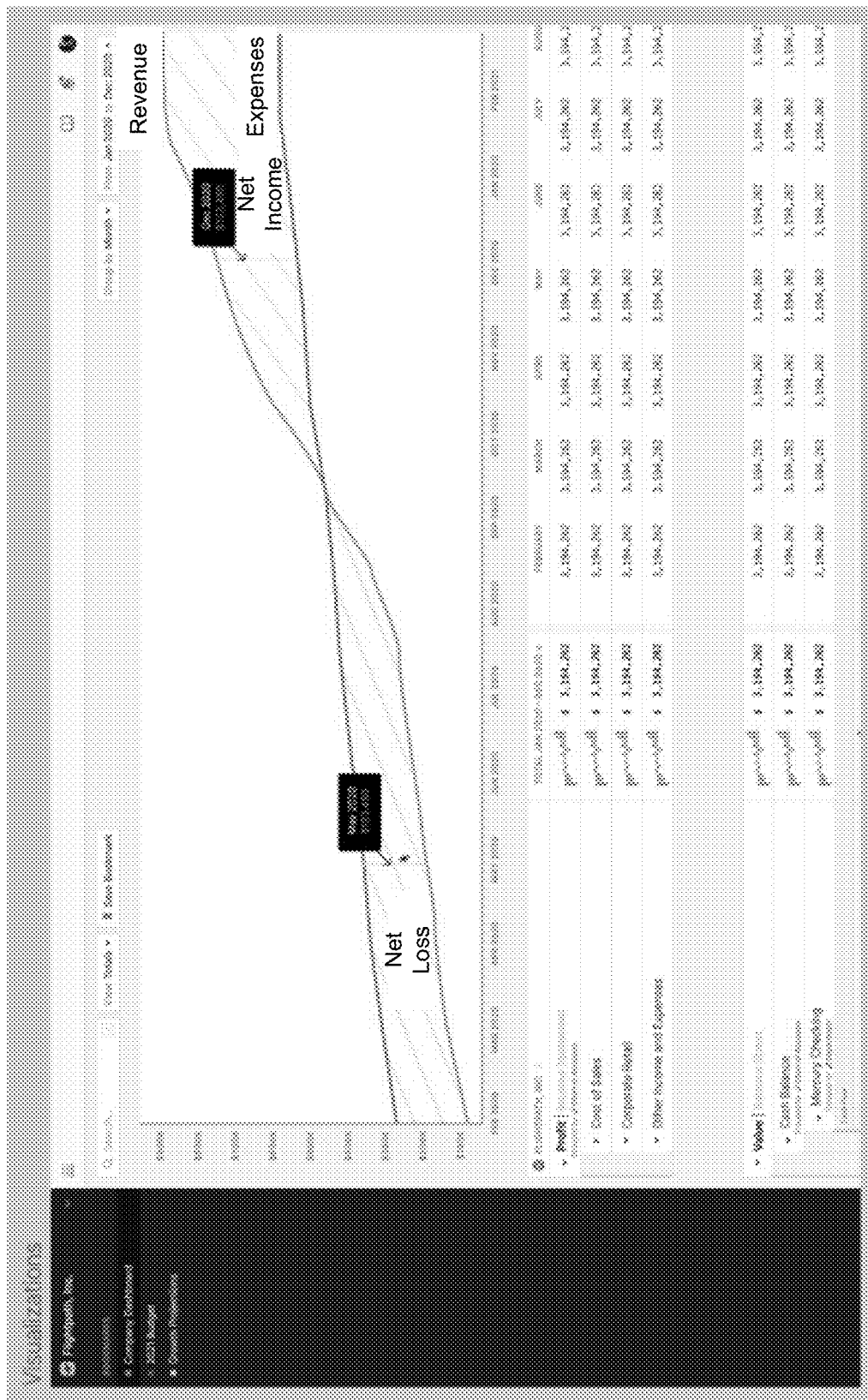
FIG. 42A illustrates an example of a user interface for displaying a graph of net profit/net loss in accordance with an implementation.
Figure 42B:
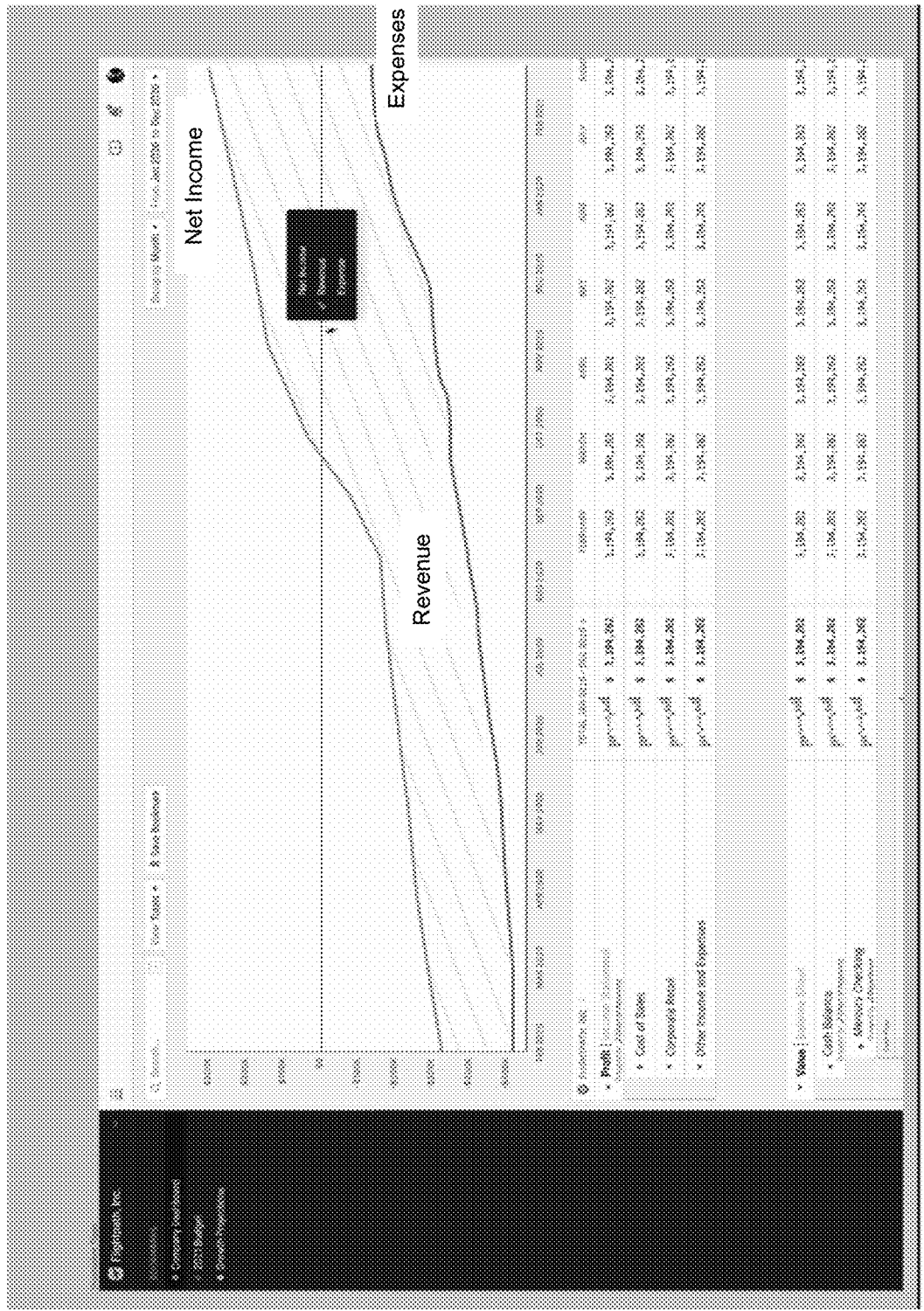
FIG. 42B illustrates an example of a user interface for displaying a graph of revenue in accordance with an implantation.
Figure 42C:
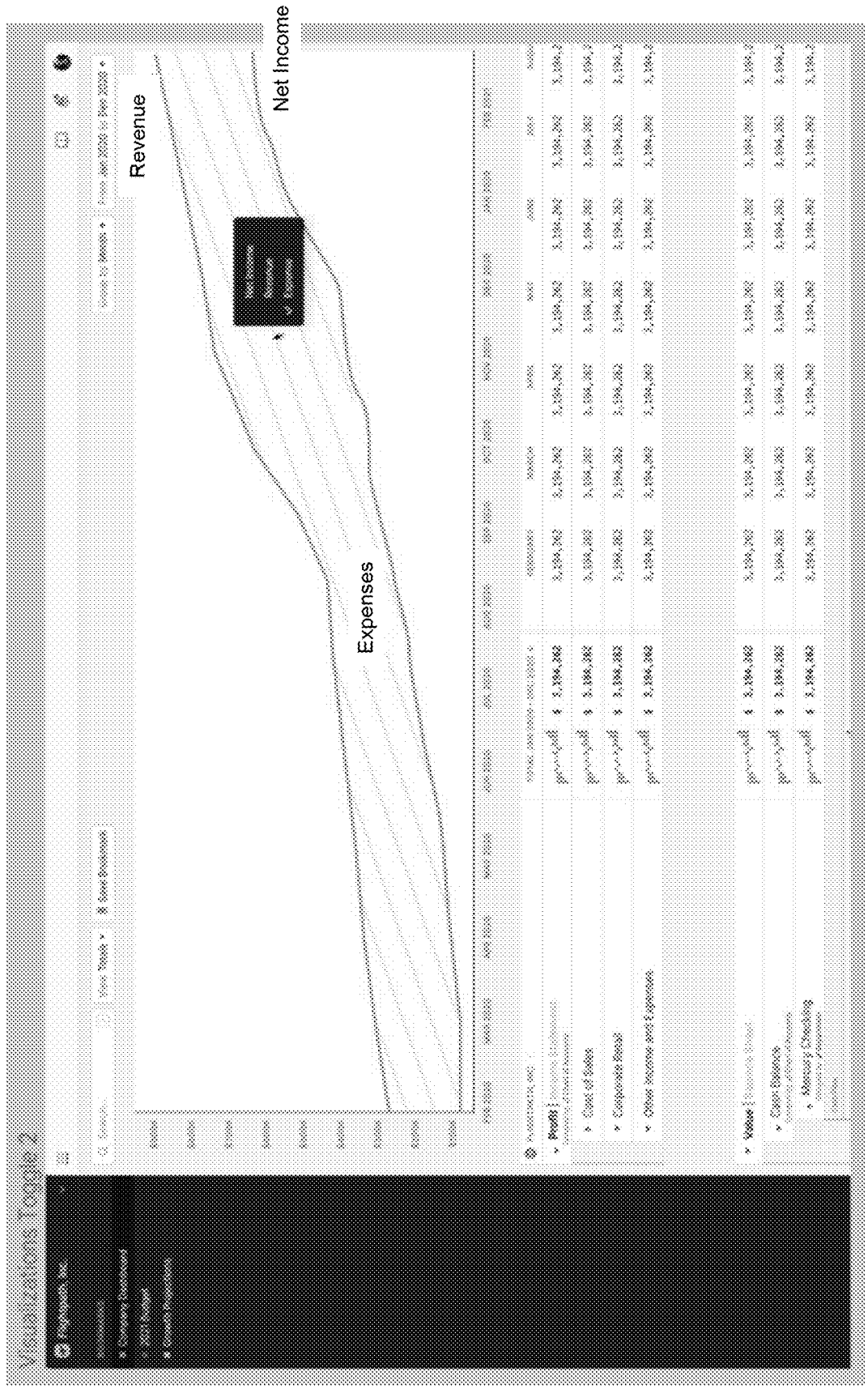
FIG. 42C illustrates an example of a user interface for displaying a graph of expenses in accordance with an implantation.

FIG. 41D illustrates another example of a user interface in which mousing over a cell opens up pop-up regarding a cell entry. In this example, a user moused over a cell for a yearly checking value.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer implemented method, comprising, with a processing system:

managing financial data as a set of nodes, in which each node is a data object representing at least one row of a sequence of cells of financial data in which each node has a data structure with node attributes describing a reorganizable tree hierarchy of nodes, wherein each node represents a variable and is related to another node by a user defined formula;

calculating a cell value for each cell in the respective sequence of cells for a given node, based on the respective node formula and a time associated with the cell;

generating a user interface visualization representing rows of the financial data based on a node tree hierarchy including nodes for profit, revenue, and expenses; and in response to a user input, displaying a visualization of the cell values for at least a subset of the set of nodes, wherein the subset of nodes represent at least one of net-income, revenue, and expenses.

2. The method of claim 1, further comprising toggling between a visualization of net-income, revenue, and expenses in response to user input.

3. The computer implemented method of claim 1, wherein the visualization comprises generating two graphs of at least a respective two of net-income, revenue and expense to display a remaining one of net-income, revenue, and expense as a difference between two graphs.

4. The computer implemented method of claim 1, wherein the visualization comprises generating a first graph of revenue and a second graph of expenses to represent net-income as a difference of the first graph and the second graph.

5. The computer implemented method of claim 1, wherein the visualization comprises generating a first graph of net income and a second graph of expenses to represent revenue as a difference of the first graph and the second graph.

6. The computer implemented method of claim 1, wherein the visualization comprises generating a first graph of revenue and a second graph of net income to represent expenses as a difference of the first graph and the second graph.

7. The computer implemented method of claim 1, further comprising performing at least one mathematical operation on a row of cell data for income or expense data, including performing at least one of a currency conversion, a percentage, a number, a formula, or a forecast.

8. The computer implemented method of claim 5, wherein the visualizations of net income, revenue, and expenses are based on a grouping of revenue rows and expense rows selected by a user.

9. A system comprising:

a processor; and a memory storing instructions that, when executed, cause the processor to perform operations including:

managing financial data as a set of nodes, in which each node is a data object representing at least one row of a sequence of cells of financial data in which each node has a data structure with node attributes describing a reorganizable tree hierarchy of nodes, wherein each node represents a variable and is related to another node by a user defined formula;

calculating a cell value for each cell in the respective sequence of cells for a given node, based on the respective node formula and a time associated with the cell;

generating a user interface visualization representing rows of the financial data based on a node tree hierarchy including nodes for profit, revenue, and expenses; and in response to a user input, displaying a visualization of at least one of net-income, revenue, and expenses.

10. The method of claim 9, further comprising toggling between visualization of net-income, revenue, and expenses in response to user input.

11. The computer implemented method of claim 9, wherein the visualization comprises generating two graphs of at least a respective two of net-income, revenue and expense to display a remaining one of net-income, revenue, and expense as a difference between two graphs.

12. The computer implemented method of claim 9, wherein the visualization comprises generating a first graph of revenue and a second graph of expenses to represent net-income as a difference of the first graph and the second graph.

13. The computer implemented method of claim 9, wherein the visualization comprises generating a first graph of net income and a second graph of expenses to represent revenue as a difference of the first graph and the second graph.

14. The computer implemented method of claim 9, wherein the visualization comprises generating a first graph of revenue and a second graph of net income to represent expenses as a difference of the first graph and the second graph.

\* \* \* \* \*